United States Patent
Rhoads

(10) Patent No.: US 9,629,118 B2
(45) Date of Patent: Apr. 18, 2017

(54) LOCATION BASED ROUTER

(71) Applicant: Digimarc Corporation, Beaverton, OR (US)

(72) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 587 days.

(21) Appl. No.: 13/892,079

(22) Filed: May 10, 2013

(65) Prior Publication Data

US 2014/0164124 A1 Jun. 12, 2014

Related U.S. Application Data

(60) Provisional application No. 61/645,589, filed on May 10, 2012, provisional application No. 61/745,501, filed on Dec. 21, 2012.

(51) Int. Cl.
*G06Q 30/02* (2012.01)
*H04W 64/00* (2009.01)
(Continued)

(52) U.S. Cl.
CPC ...... *H04W 64/003* (2013.01); *G06Q 30/0261* (2013.01); *H04W 4/02* (2013.01); *H04W 4/20* (2013.01); *H04W 84/18* (2013.01)

(58) Field of Classification Search
None
See application file for complete search history.

(56) References Cited

U.S. PATENT DOCUMENTS 8,045,995 B2 * 10/2011 King .................. G01S 5/02
455/404.2
8,666,376 B2 * 3/2014 Ramer et al. .......... 455/414.3
(Continued)

FOREIGN PATENT DOCUMENTS

| EP | 1134940 | | 9/2001 |
| EP | 1134940 | A1 * | 9/2001 |
| EP | 1436949 | | 7/2009 |

OTHER PUBLICATIONS

Jim Youll, Joan Morris, Raffi Krikorian, Pattie Maes, Impulse: Location-based Agent Assistance, Proceedings of the Fourth Int'l Conf. on Autonomous Agents 1 (2000), available at https://web.archive.org/web/20150526163639/http://citeseerx.ist.psu.edu/viewdoc/summary?doi=10.1.1.38.2649.*

(Continued)

*Primary Examiner* — David Stoltenberg
*Assistant Examiner* — Shawn Lillemo
(74) *Attorney, Agent, or Firm* — Digimarc Corporation

(57) ABSTRACT

A location based router system comprises a router in communication with an ad hoc network of devices, including at least one mobile device. The router directs packets from the network to associated agents. The router receives queries from requesting clients, such as the mobile device, and provides location to the requesting client. Additionally, depending on preferences of the client, it also routes market packets for location based services back to the mobile device dependent on its location.

A method of providing location based service to a mobile device in a wireless network. The method receives a query for location in the wireless network from the wireless device. The query includes an opt-in level for participating in offers for location based services. Mobile device location computed from packets transmitted between the mobile device and nodes in the wireless network is determined. The (Continued)

method provides a data structure comprising location, opt in level, and mobile device user information to a market for services, where the market for services determines an associated service based on the location, opt in level and mobile device user information and adds metadata for the associated service to the data structure to produce a response structure, enabling the user device to obtain the associated service.

14 Claims, 29 Drawing Sheets

(51) Int. Cl.
    *H04W 4/02* (2009.01)
    *H04W 4/20* (2009.01)
    *H04W 84/18* (2009.01)

(56) References Cited

U.S. PATENT DOCUMENTS

| | | | | |
|---|---|---|---|---|
| 8,943,415 B2 * | 1/2015 | Meola | G06F 21/6218 | 715/736 |
| 2003/0182394 A1 * | 9/2003 | Ryngler | G06Q 10/10 | 709/217 |
| 2005/0204014 A1 * | 9/2005 | Yao | H04W 4/003 | 709/217 |
| 2008/0151841 A1 | 6/2008 | Yi et al. | | |
| 2008/0176582 A1 * | 7/2008 | Ghai et al. | | 455/456.2 |
| 2008/0214166 A1 * | 9/2008 | Ramer et al. | | 455/414.3 |
| 2009/0177730 A1 | 7/2009 | Annamalai et al. | | |
| 2009/0275348 A1 * | 11/2009 | Weinreich et al. | | 455/456.3 |
| 2012/0075141 A1 | 3/2012 | Kosolobov et al. | | |

OTHER PUBLICATIONS

Fariba Sadri, Ambient Intelligence: A Survey, 43:4 ACM Computing Surveys 36:5 (Oct. 2011).*
FCC, Location-Based Services: An Overview of Opportunities and Other Considerations (May 2012), available at https://apps.fcc.gov/edocs_public/attachmatch/DOC-314283A1.pdf.*
Woojo Kim, SungKyu Lee, DeaWoo Choi, Semantic Web Based Intelligent Product and Service Search Framework for Location-Based Services, ICCSA 2005, LNCS 3483, pp. 103-112 (2005).*
International Search Report and Written Opinion mailed Jul. 24, 2013, in PCT/US2013/040643.

* cited by examiner

The Open TriQuad Data Structure:

FIGURE 4

```
Plumbing_ID = PlumbingStruct {
    who
        .data
        .links
    session
        .data
        .links
    action
        .data
        .links
    pung
        .data
        .links
    LBR
        .data
        .links
}
```

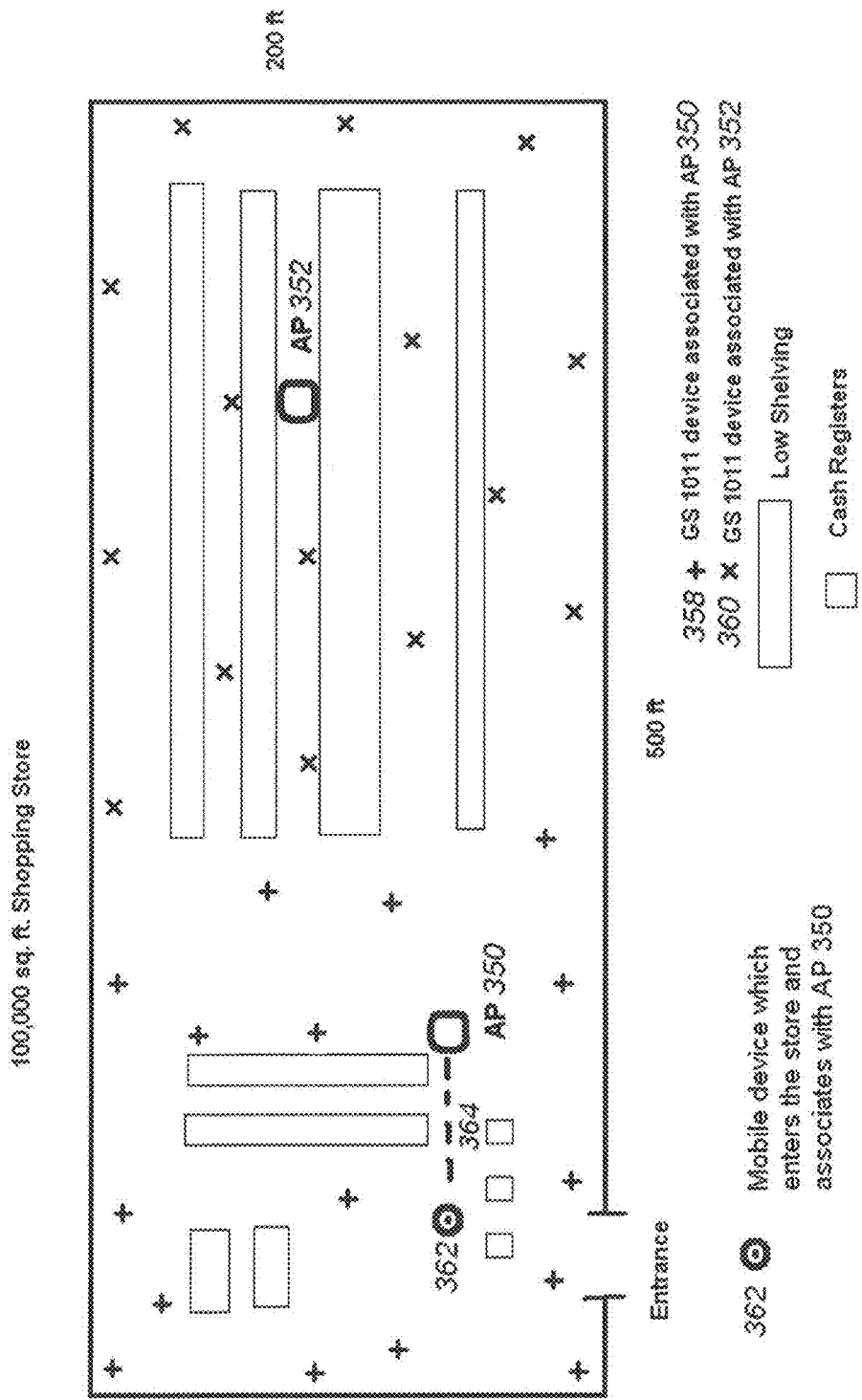

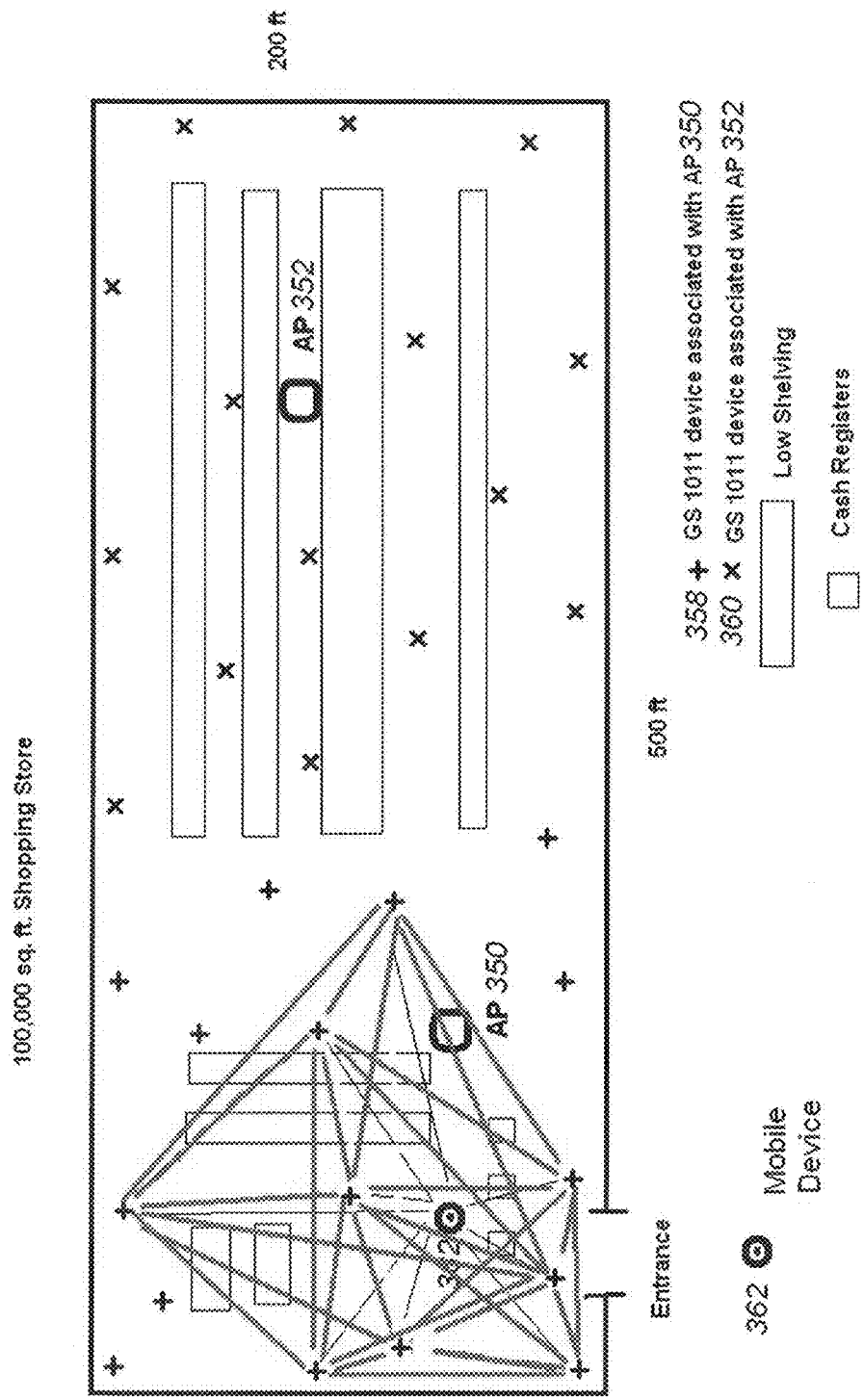

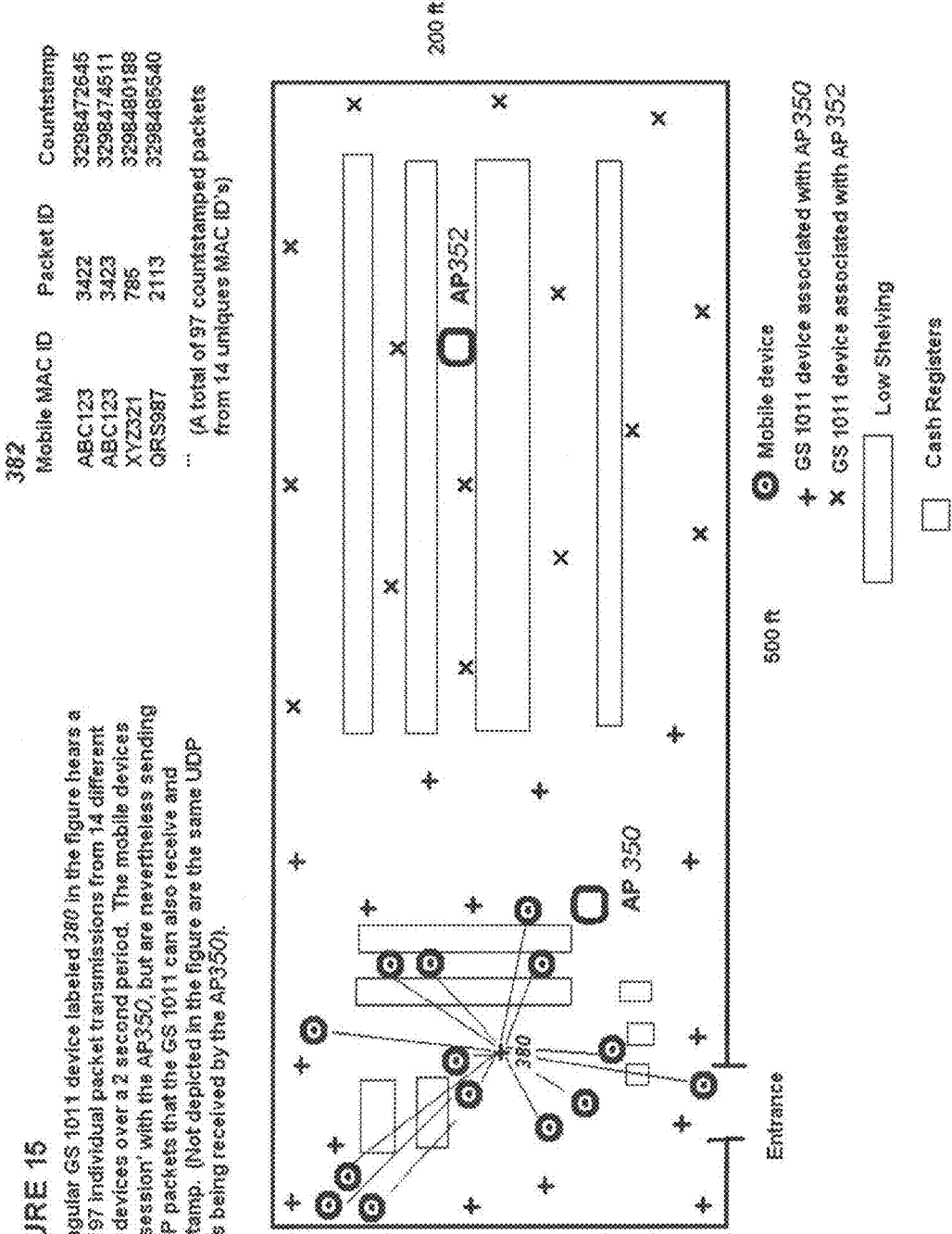

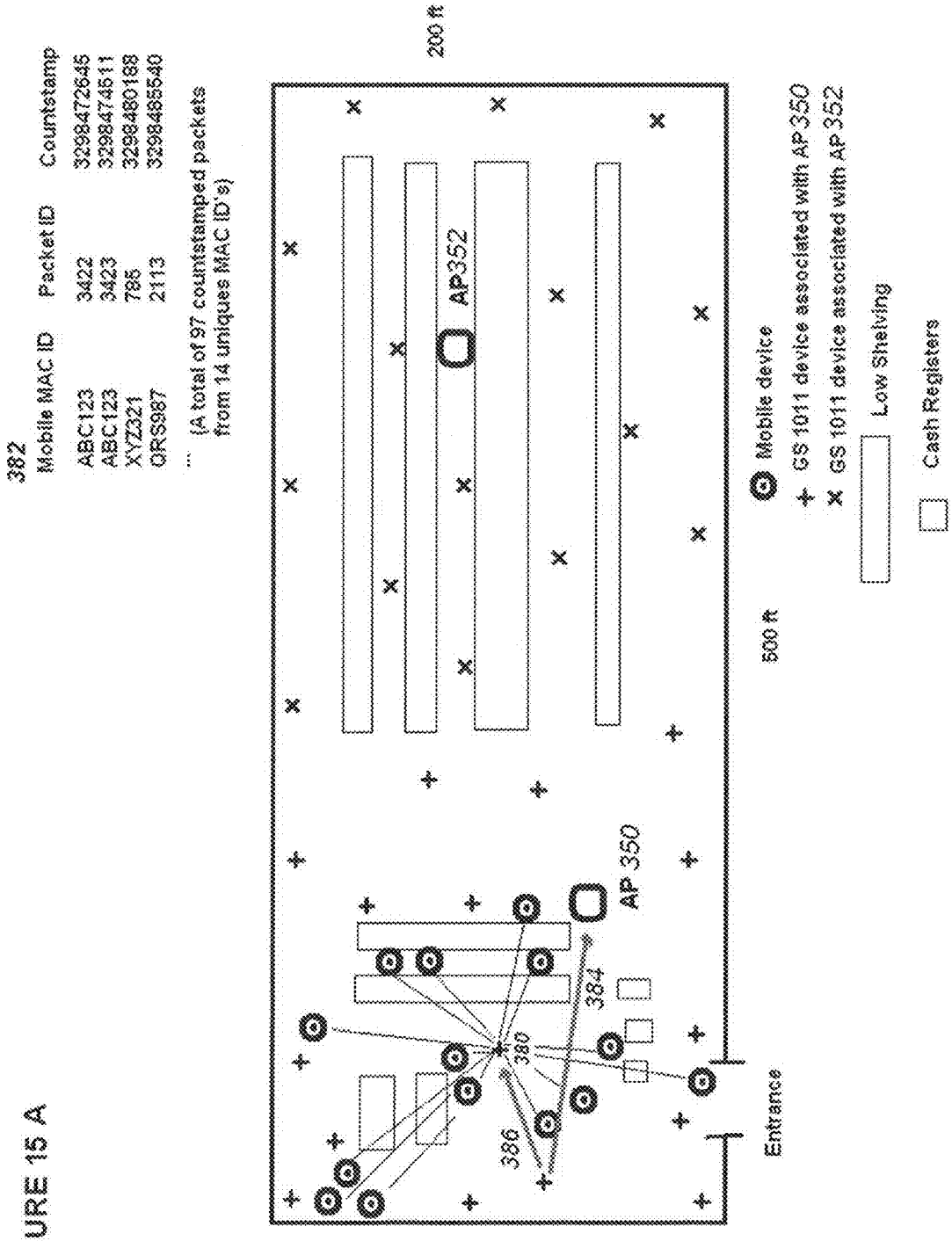

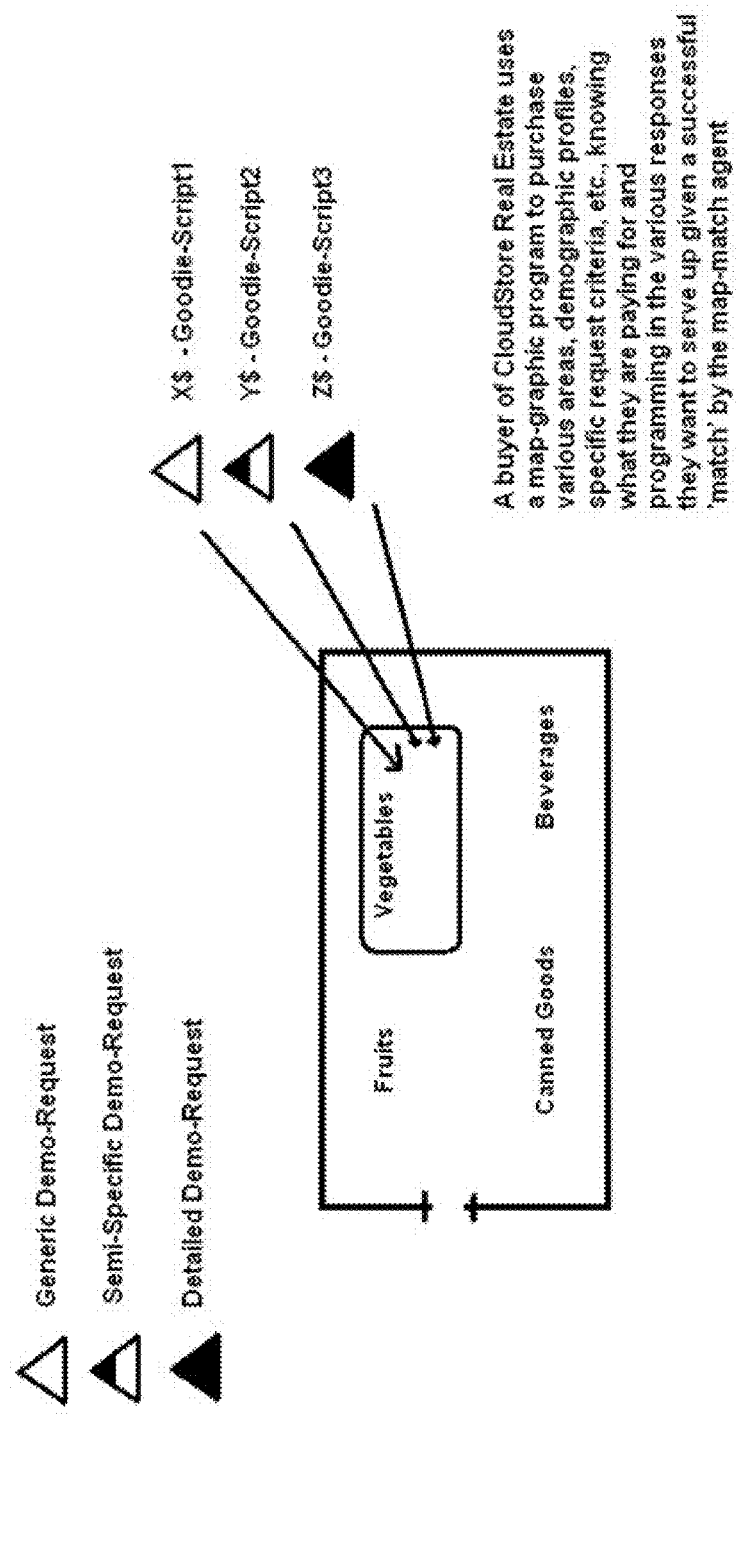

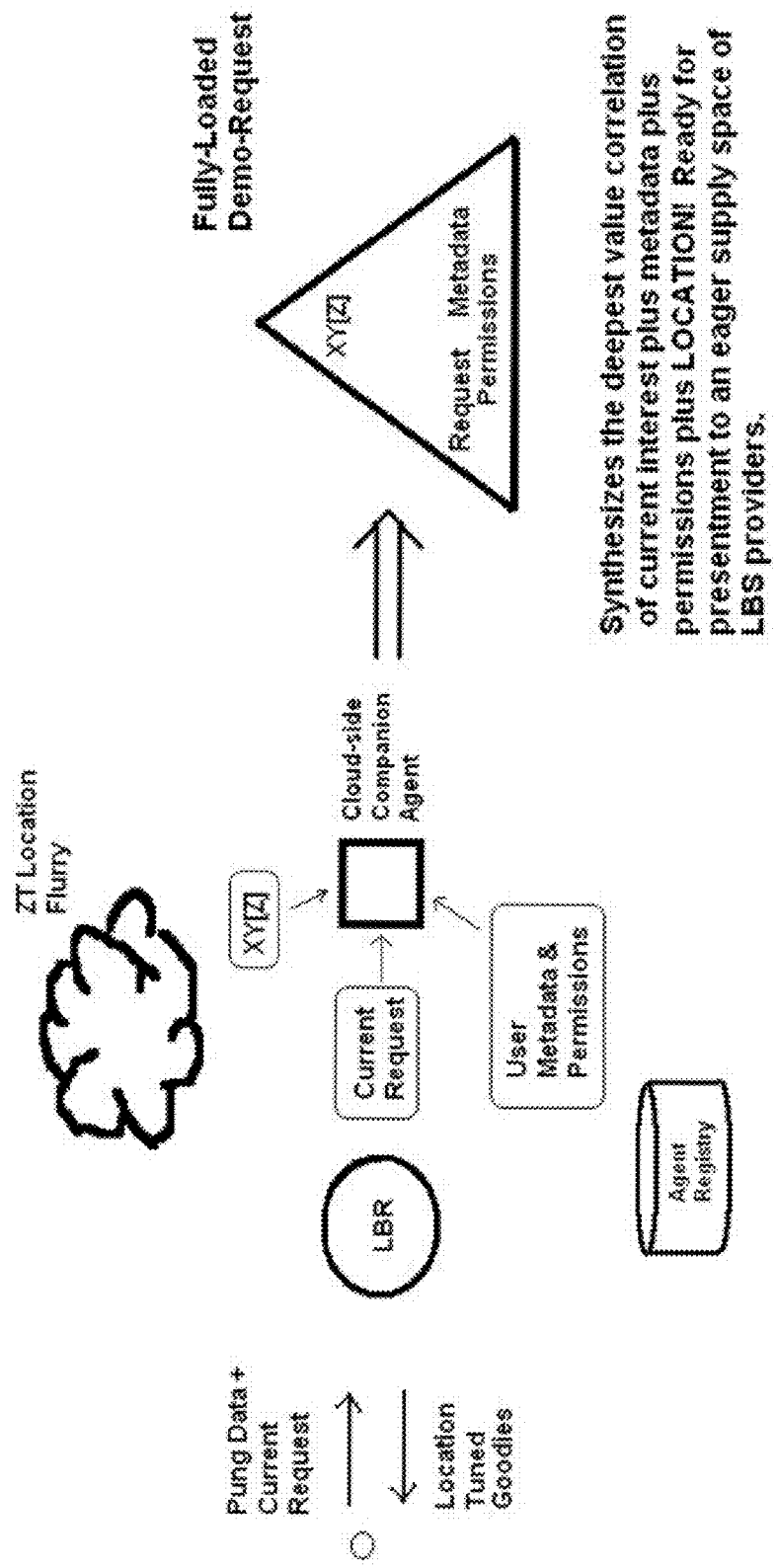

Fig. 27

```
TriQuad_ID = TriQuadStruct{
    who       .data
              .links
    search    .data
              .links
    permissions .data
                .links
    where     .data
              .links
    LBR       .data
              .links
}
```

ZIPS creates a TriQuad structure by the very act of locating a client, followed by baseline population of the data fields; from there, any external application or system can take the TriQuad and run with it...

ZIPS - Zulutime Interior Positioning System

As one example, ZIPS produces and routes baseline populated TriQuads with hooks and guidelines to any amount of open-community information...

- Who Am I?
- What are my Permissions?
- What am I looking for?

OPEN / OPEN / OPEN

ZIPS produces a current client location - X Y [Z T]

LOCATION BASED ROUTER

RELATED APPLICATION DATA

This application claims benefit of U.S. Application No. 61/645,589, filed May 10, 2012 and U.S. Application No. 61/745,501, filed Dec. 21, 2012, which are hereby incorporated by reference in their entirety.

TECHNICAL FIELD

The invention generally relates to location based services and more specifically relates to routing of location based queries and responses among mobile devices and network services (e.g., cloud based services).

BACKGROUND AND SUMMARY

Decades-mature Distributed Computing, largely based on wired communication paths, has warily and ominously witnessed a brash and brawny new sibling arrive in the household named Cloud Computing, largely borne of wireless communication paths, at least at the end-device. The core thrust of this disclosure is that timing and location of digitally-enabled nodes needs to become a central operational aspect of such networks, as specified functional components and network layers.

Previous disclosures have laid much of the groundwork for such components and layers. In particular, in our prior disclosures, we describe how to adapt networks to provide inherent positioning and timing calibration to devices within the network. These disclosures are provided in Assignee's U.S. Pat. Nos. 7,876,266, 7,983,185, Published US Patent Applications 20090233621 and 20090213828, and unpublished U.S. patent application Ser. No. 13/187,723 filed Jul. 21, 2011, entitled MULTI-PATH-COMPENSATION METHODS FOR LOCATION-DETERMINATION OF MOBILE DEVICES (published as 2012-0309415), Ser. No. 13/179,807 filed Jul. 11, 2011, entitled LOCATION AWARE INTELLIGENT TRANSPORTATION SYSTEMS (published as 2012-0309414), and 61/613,915, filed Mar. 21, 2012, entitled Positioning Systems for Wireless Networks (now filed in non-provisional form as Ser. No. 13/833,679), which are hereby incorporated by reference in their entirety (referred to as "space-time calibration patents").

As described in U.S. Pat. No. 7,876,266, the approaches described in the space time calibration patents are interoperable with current techniques for positioning and timing, and also can reside independent of these and provide location and timing for devices in a network. Examples of current techniques for positioning within the urban environment include the following: Cellular: GPS, A-GPS, Time of Arrival, Radio Fingerprinting, Cell Global Identity, and Enhanced Cell ID. Wi-Fi: Radio Fingerprinting, Wi-Fi TOA, and Wireless Access Point War-driving. GPS: DGPS, WAAS, A-GPS, and Laser Augmentation.

This disclosure will further describe the functional concept of a Location Based Router (LBR). Any and every node in a network can serve the LBR role. If it can communicate, it can take on the role of the LBR. Mesh Networks are particularly suited for operating LBR components and software layers—and the same principle applies with Mesh Networks: location and timing matter, so build them into the core of what Mesh Networks are.

A familiar prior art to LBR is what is commonly referred to as 'Routers' today, which duly receive digital packets from one IP address and do their best to route such packets to—or at least closer to—some destination IP address. The LBR of this disclosure uses and builds upon the simplified operations of this type of network router, while attempting to add the above elements of location and timing to the overall functional picture.

One aspect of the invention is a location based router system comprising a router in communication with an ad hoc network of devices, including at least one mobile device. The router directs packets from the network to associated agents. The router and its agents execute on one or more processing units within a device or distributed among different devices over a network. The router receives queries from requesting clients, such as the mobile device, and provides location to the requesting client. Additionally, depending on preferences of the client, it also routes market packets for location based services back to the mobile device dependent on its location.

The particular configuration of agents can vary. In one embodiment, the agents include a grouping agent, a packet processing agent, and a solution agent. The grouping agent manages an ad hoc network of nodes, including at least one mobile device. The packet processing agent receives packets originating from the ad hoc network of nodes, and prepares information from the packets for determining location of the mobile device node. The solution agent processes information prepared by the packet processing agent to determine location of the mobile device node.

Additional agents provide pre-processing of packets to manage the flow of packet data from ad hoc network to other agents that process the packets to determine location of devices. For example, in one embodiment, a pair filtering agent determines from packets coming from the network whether communication between a pair of nodes in the network is sufficient to use signal transmissions between the nodes to determine location solutions. This agent may be used by the packet processing agent or solution agent to pre-filter packets routed from the network to the solution agent for determining location.

Additional components of the router system may include an agent for managing active agents to which the router sends packets for determining location, as well as agents for providing location based services to a mobile device within the ad hoc network.

The router communicates directly or indirectly with the mobile device to receive its queries for location and services, to route packets for determining its location, and to route market packets to the mobile device to provide services dependent on its location.

The ad hoc network of nodes changes over time as the mobile device makes new connections with wireless network nodes. The grouping agent updates the wireless network nodes from which data is used to determine the location of the mobile device. In one particular Wi Fi device network embodiment, the mobile device is a Wi-Fi transmitting device, such as a cell phone or tablet, and the wireless network nodes comprise Wi-Fi modules that transmit and receive signals with each other in pairs, capture transmit and receipt data for these signals, and send the transmit and receive data in packets to the router for determining the location of the mobile device.

Another aspect of the invention is a method of providing location based service to a mobile device in a wireless network. The method comprises:

from the wireless device, receiving a query for location in the wireless network, the query including an opt-in level for participating in offers for location based services;

receiving location computed from packets transmitted between the mobile device and nodes in the wireless network;

providing a data structure comprising location, opt in level, and mobile device user information to a market for services, where the market for services determines an associated service based on the location, opt in level and mobile device user information and adds metadata for the associated service to the data structure to produce a response structure, enabling the user device to obtain the associated service.

There are several variants of this method, in terms of system architecture and alternative features, and methods, which are described in more detail below. Inventive features are not intended to be limited to various combinations of elements presently claimed in this patent application.

Further features will become apparent with reference to the following detailed description and accompanying drawings.

BRIEF DESCRIPTION OF THE DRAWINGS

FIG. 4 depicts one example of a Plumbing Packet used in the LBR.

FIG. 11 depicts an example of a mobile device node joining an ad hoc network, and becoming a market side client, which queries the LBR for its location and to which the LBR directs cloud-side, location based services.

FIG. 14 illustrates an example of good pairings between infrastructure nodes that are hearing transmissions from a mobile device, and as such, these nodes and the mobile device form an ad hoc network at a point in time for determining location of the mobile device.

FIG. 15 illustrates communications between a particular infrastructure node and several mobile devices, and a corresponding example of how the node builds a packet recording data about transmissions received from various mobile devices (which is a type of "pung" packet in embodiments described herein).

FIG. 15A illustrates the situation where an infrastructure node (386) hears a pung packet sent by another infrastructure node to an access point, and records that event as additional ping data, which in this case is a ping obtained from listening to transmissions (e.g., a pung packet to AP) of another infrastructure node.

FIG. 24 depicts an example of organizing location based queries in a venue into transaction opportunities that market side participants may bid for.

FIG. 25 depicts a graphical construct in which a market side provider can set the conditions for purchase or bidding for responses to these types of detailed requests within venues in terms of various conditions discerned during a shopping session (such as opt in, correlation of current interest, location, pricing, user intent, history, loyalty program, etc.).

FIG. 26 is a diagram further depicting roles of a cloud side companion agent corresponding to a mobile device session in terms of the construction of a fully loaded request to a market for services.

FIG. 27 provides another depiction of an extensible data structure which is used to construct a detailed request, submit it for bidding on a market based exchange, and then attach one or more winning responses.

DETAILED DESCRIPTION

Figure 1:
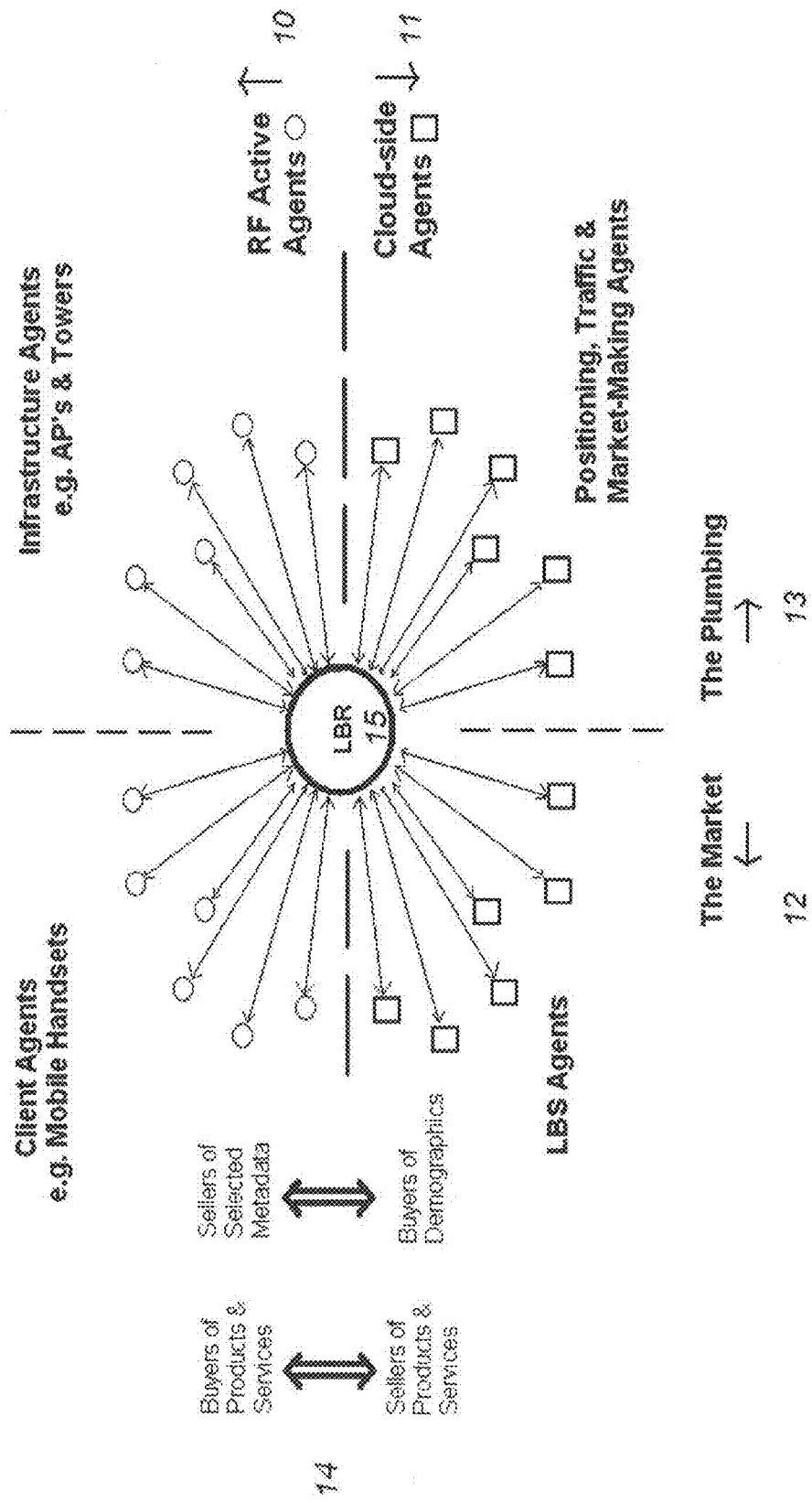
FIG. 1 is a diagram illustrating a LBR and its interrelationship with various types of agents.

FIG. 1 graphically introduces LBR in a holistic, unavoidably abstract manner. This disclosure will make liberal use of the categorical distinctions illustrated in this figure. Many later figures will provide technical implementation details.

FIG. 1 lays out certain distinctions starting with wireless nodes/agents, 10, in the upper part of the figure in distinction to cloud-side nodes/agents, 11, in the lower part of the figure, and then using the left side of the figure to indicate nodes/agents, 12, generally forming a marketplace of buyers and sellers, in distinction to the right side of the figure containing nodes/agents, 13, involved with the technical establishment of such a marketplace.

To the far left of the figure, 14, the duality and interchangeability of 'buyers' and 'sellers' is explicitly and centrally indicated, applying to 'The Market' nodes and/or agents. These actors circle around the central 'LBR' core agent, 15, implying that no direct communication between any nodes/agents is required for the overall system to function, all that is required is for each node to be able to communicate packets to and from the LBR hub.

FIG. 1 illustrates an objective of the LBR, acting as a "location based architecture" to facilitate markets and enable the limitless growth of independent (and innovative) players. The now somewhat tired and investment-wise-stale acronym of LBS needs to be superseded and subsumed by a more flexible approach that people can actually plug into. Monolithic systems and structures—think received-signal-strength WI-FI positioning systems as but one tiny example, or even GPS for that matter—need to be replaced by how the location of nodes/agents fundamentally informs how those various agents and markets work within the constant knowledge of location. The admittedly most arcane point to FIG. 1 is, thus, that the same technical approaches which can establish location (plumbing level agents sharing information and fixing location in the process) can do the exact same thing for establishing a location-based marketplace.

Figure 3:
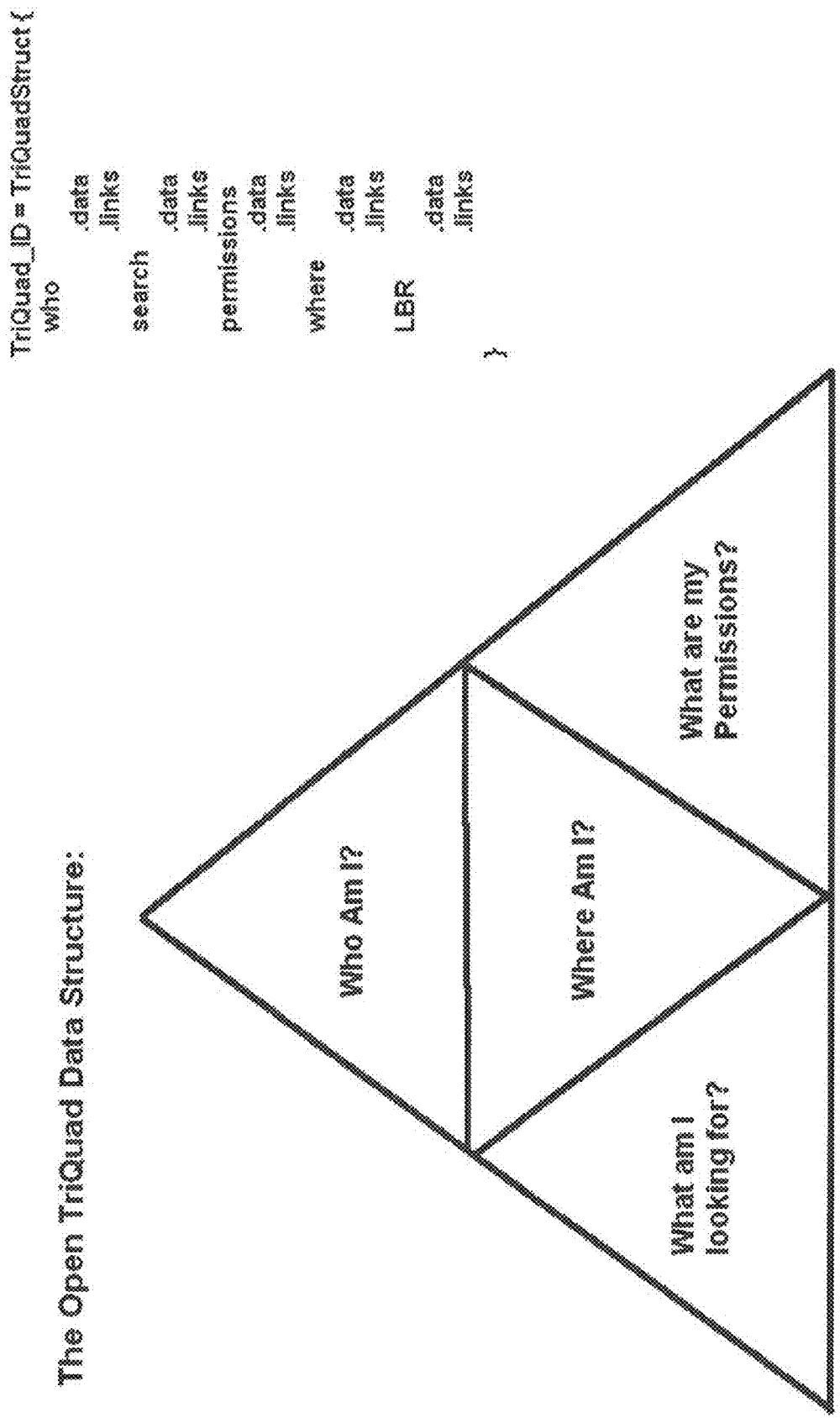
FIG. 3 illustrates the packet of FIG. 2 along with a software-like description of its data structure.

Foreshadowing much more disclosure to come, the classic question that a GPS receiver can answer of 'where am I' is slowly and inevitably replaced by 'what am I interested in at this place and whom am I willing to choose to help me satisfy those interests'. That I would need to even ask 'where am I' becomes quaint, replaced by an implied location based query with a globally vast array of eager suppliers of answers to my query . . . the bead shop just around the corner being most eager to alert me of its spitting-distance-presence, knowing that I LOVE to string weird necklaces and hand them out at parties. FIG. 3 and 'Tri-Quads' formalize these notions as engineering specifications on xml-like software packets, the flipside of weird necklaces.

A quick thumbing through of some of the figures in this disclosure can provide a finish to this introductory section. An underlying theme of these technical moving parts is the far-left text of FIG. 1—the duality/interchangeability of buyers and sellers—and its manifestation as richly populated location-based queries interconnected through an LBR architecture to a large, BUT, well organized sea of willing respondents to those queries.

Agent-LBR Packet Exchange

An LBR-designed network would operate with simple packet exchange as its most elementary operation. An agent (node) needs to know how to send and receive packets from 'an LBR'. At the end of the day, there needs to be only one basic format for a packet, but cracking one open would quickly find one of the two flavors of packet exchange:
1) Market Packets, and
2) Plumbing Packets
corresponding to the left and right halves of FIG. 1 respectively. In both cases, the form of those packets would follow industry standardized protocols similar if not even fully borrowing from familiar examples such as HTML, XML, image file formats, IP data packet formats, etc. Indeed, the more such existing formats and protocols can be used the better. No need to invent entirely new data formats; rather, existing formats can be adapted to LBR requirements.

Figure 2:
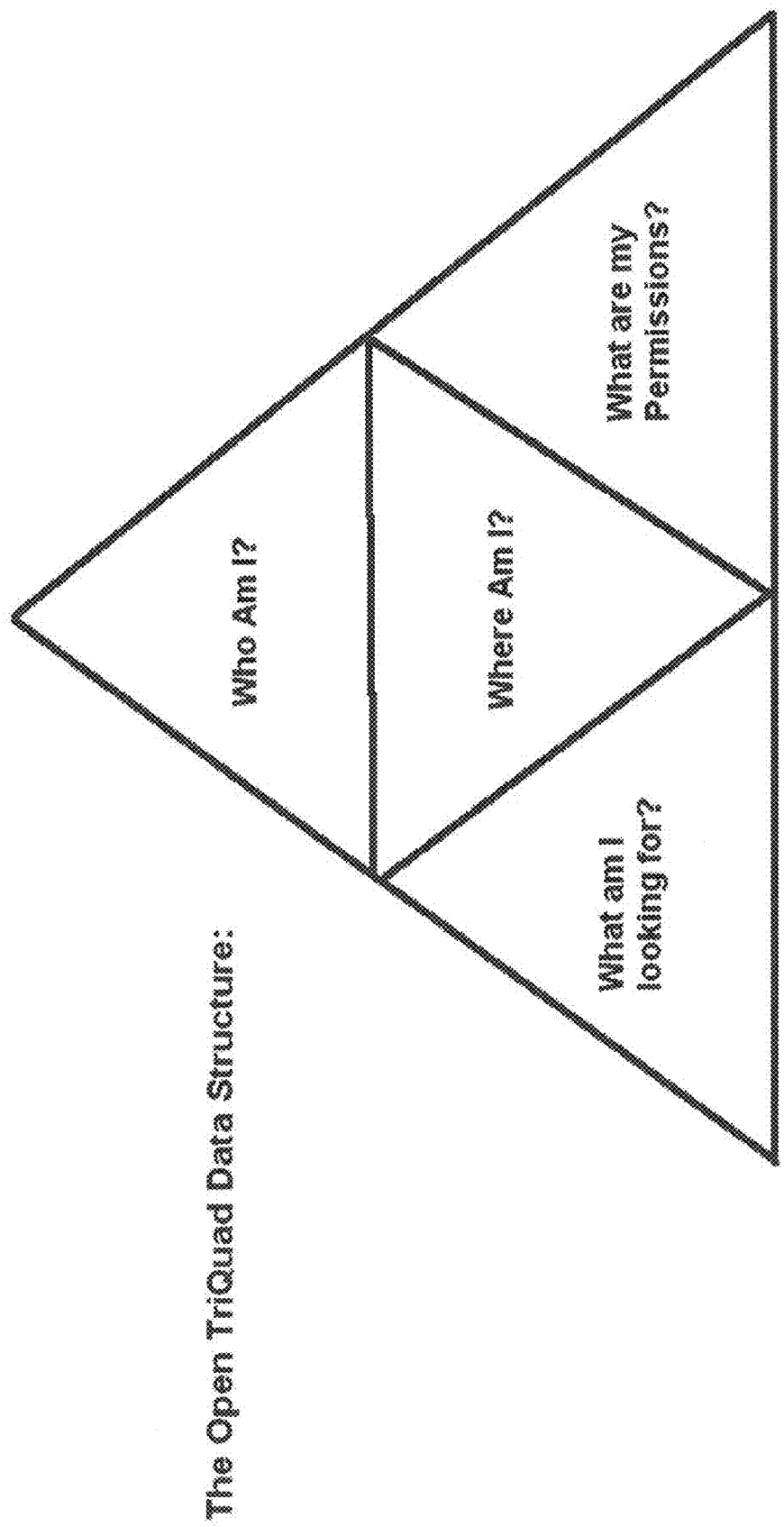
FIG. 2 illustrates a graphical example of market information packet used in the LBR.

A simple and by no means only example of a Market Packet is illustrated in FIGS. 2 and 3, FIG. 2 showing a conceptual view of the packet and FIG. 3 illustrating its software-like description. This disclosure refers to this market-oriented packet as a "Tri-Quad" as later sections will describe in detail. The driving idea behind Market Packets is that they are actively engaged in the direct exchange of goods and services, interpreted very broadly. One of the recently modern concepts of 'selling metadata'—where 'metadata' is really just an iceberg with the submerged part actually being detailed demographic data down to preferred color of socks—is thus included in the definition, as depicted in FIG. 1. The words 'selected metadata' in FIG. 1 is a prelude to the descriptions of the many levels of 'opt in' that consumers can choose for themselves and thus control the level of selling they do of their own interests and what they are willing to be presented with.

FIG. 4 then depicts one example of a Plumbing Packet. The presented graphic and its underlying data structure are deliberately closer to many existing standards and formats for data packet exchange accordingly. The key dividing line presented in the data fields of the Plumbing Packet split into two parts: one part dealing with simply establishing, maintaining and repairing a marketplace infrastructure even when there might be no traffic or chatter going on in the marketplace itself; and the other part directly dealing with the ongoing traffic associated with a live, functioning marketplace, largely driven by populating the "pung" field with the ever-flowing raw ping data.

As detailed in the Space Time Calibration patents incorporated above, pings are transmissions from one network node to another, while pungs are records of pings that are collected over time intervals and used to determine timing and location of network nodes. While the space time calibration patents describe implementations of pings and pungs for space-time calibration within networks, the LBR can also be implemented for other types of positioning with or without integration of the space-time calibration. These include positioning systems that are rely on strength of signal (Received Signal Strength (RSS)), dead reckoning using directional sensors, positioning systems listed in the above Background and Summary, or hybrid systems that fuse data from combinations of these techniques.

Note in both FIGS. 3 and 4 there is an LBR field which will be further described on its own accord later in the disclosure. An element of that field to note early on is that this field can and will often contain multi-layered routing instructions such that a single packet exchange to the LBR can instigate one or more packet exchanges, including sequence-type instructions such as 'send subset A and B of this packet to Agent X, get a response C from Agent X and then send a packet with B and C to Agent Y. These multi-layered and time-sequenced routing instructions will be seen to be critical to many location-based query and response networks replete with competitive forces wanting to buy the right to serve up responses to various queries.

Each of these packet types and their many variants will be further described herein. The higher level point to be made here is that an LBR-prescribed network need only specify—at the network message passing level—this basic exchange of packets between any given node/agent and an 'LBR', used here as an explicit noun. Everything else having to do with timing and location/position knowledge will be performed 'in the cloud' and the resulting solutions made available to the node in a steady stream of LBR-packets coming back to that node/agent. Again, this does not mean that 'an LBR' needs to be halfway around the world, across the country, in another county or halfway across a building; it can be as simple as a second thread on a CPU in a mobile handset! The actual physical location of the various nodes/agents and how they all share resources and how they all communicate is 100% flexible accordingly.

Establishing an LBR Infrastructure: Registering Plumbing-Side Agents

As previous disclosures and now patents have described (see the space time calibration patents incorporated above), certain nodes in a network will need to take on responsibilities for initiating and then maintaining basic location and timing services for the network as a whole. Such nodes are generally aligned with the right side of FIG. 1, the plumbing side. Though it is certainly possible for any node to have all 'LBR software' and all 'agent software' available to it, this will almost never be the case in implementations. The usual case will be that most nodes will want to minimize both their software requirements and their communications requirements to just those necessary to either offer their specialized brand of services to the network on the plumbing side, or consume location and timing services from the network certainly in the upper left quadrant of FIG. 1. One wishes to get to the situation where a given node fires up and one of its first communications to some other node will be a query whether that other node can directly or indirectly provide to it both location and timing services. For brevity, we shorten this to the simple question: "Are you an LBR or can you connect me to one?" The remainder of this section will assume that location-aware operations are not simply built into the standards of the network operations, and thus all initiation procedures need to be explicitly performed as opposed to 'hard wired'. Once some of these procedures are more familiar to wireless device designers, many of the explicit initiation steps will be pre-programmed into nodes.

One embodiment of an LBR sets up a common IP-address with a variety of services it offers, i.e. setting up what has been branded as a Web Service. See, in particular, discussion of web services (e.g., ZuluTime Web Service) in unpublished U.S. patent application Ser. No. 13/187,723 filed Jul. 21, 2011, entitled MULTI-PATH-COMPENSATION METHODS FOR LOCATION-DETERMINATION OF MOBILE DEVICES (published as 2012-0309415), Ser. No. 13/179,807 filed Jul. 11, 2011, entitled LOCATION AWARE INTELLIGENT TRANSPORTATION SYSTEMS (published as 2012-0309414), and the web service architecture in 61/613,915, filed Mar. 21, 2012, entitled Positioning Systems for Wireless Networks (now filed in non-provisional form as Ser. No. 13/833,679), which are incorporated by reference. Previous and companion disclosures have also described the operations of such a service without an LBR perspective, this disclosure will emphasize certain modifications to such a web service which can have it behave in line with LBR design principles.

Figure 5:
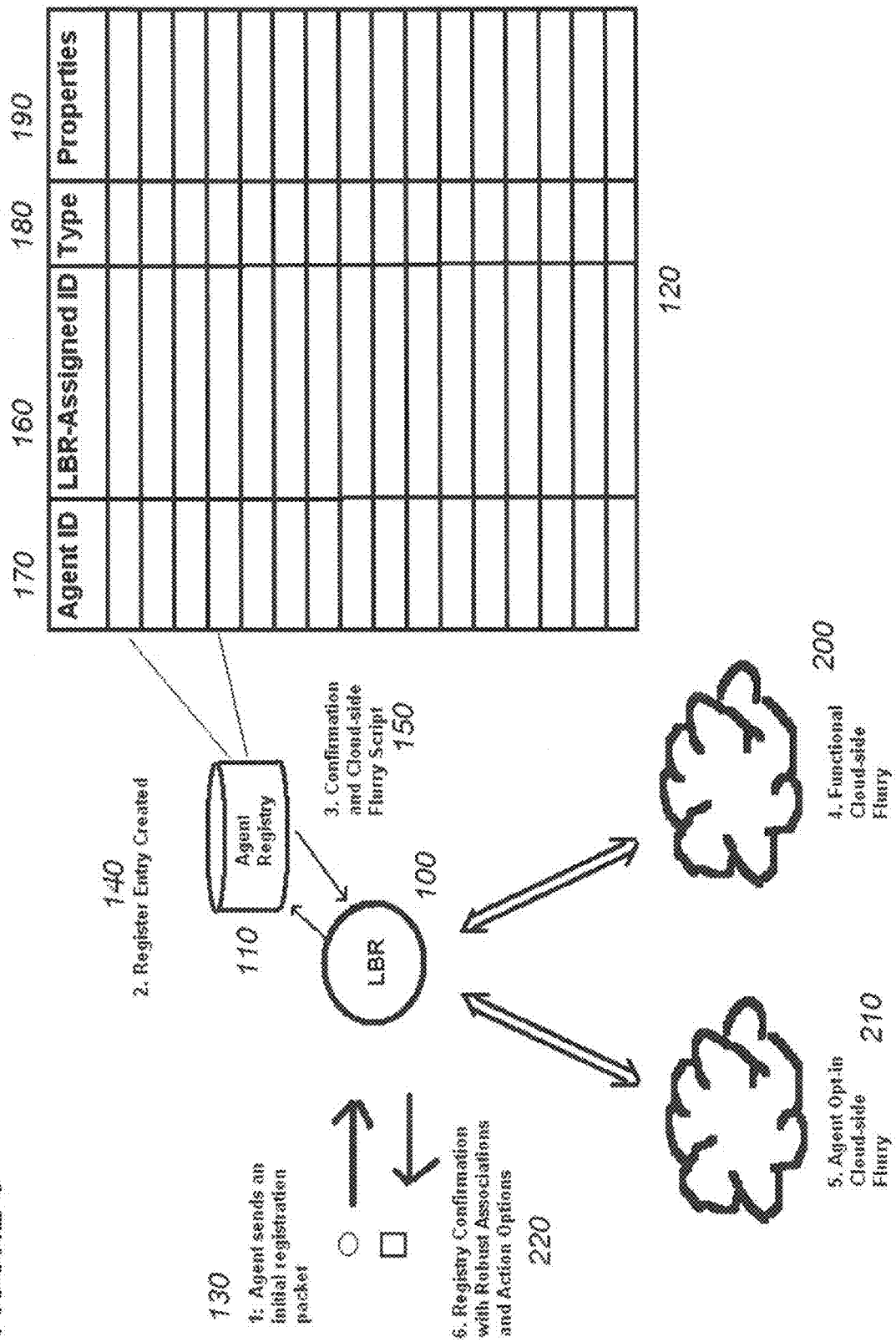
FIG. 5 is a diagram illustrating structure and operation of a LBR infrastructure operating at an IP address.

FIG. 5 is a rather involved figure that attempts to cover most if not all of the key ingredients in the embodiment of an LBR infrastructure existing at some given IP address. This section will go through this figure first with a plumbing-side node or agent, and then later disclosure sections will show how market-side nodes/agents can selectively choose to directly or indirectly participate in this approach.

In FIG. 5, we see the circle with 'LBR' inside and labeled with italicized 100. This circle represents the packet ingest software at the IP address discussed above. Also depicted is an 'Agent Registry' icon, 110, with a view into its registry structure, 120. This Agent Registry is itself an agent in the LBR definition of that term, where also depicted is some external random agent contacting the LBR with an incoming packet, 130, in this case the packet is an initial registration packet from the external agent announcing its presence and requesting association with the LBR and its universe still to be described. The incoming packet contains a flag which emphasizes that it is a registry initiation packet and the packet also contains typical metadata allowing the LBR to route the packet to the Agent Registry, 110, along with the metadata needed to populate the registry fields, 120.

The LBR software, 100, cares little about the contents of the registration packet and just knows it needs to pass it on to the Agent Registry, depicted as action 140, then expecting some kind of return packet 150, with whatever routing instructions it may contain.

When the Agent Registry receives the packet, 140, it performs quite typical database operations checking to see if the registration packet is valid, has not already been registered, etc. Later disclosure sections will examine the various intricacies and options available to this agent, but for the purposes of just showing how an LBR network is established, we'll leave it to this simple registration act with the fields shown. The field 'LBR-assigned ID', 160, indicates that the Agent Registry, 110, is uniquely assigned to the LBR 100 and it is free to use its own internal ID scheme, even though the external agent sending in the registration packet may have its own ID as sent in the packet, where that ID is stored in field 170. Later sections will better explain why an isolated LBR should follow best practices of setting up its own unique agent identification system whilst still respecting the externally defined ID systems of the various agents contacting it. In this way, this is just a mapping exercise between all the various agents that the LBR will be mediating with all their various flavors of ID's, and a unified ID scheme that the LBR and its associated Agent Registry can deal with. [The ID schema for both can certainly be identical in LBR-designed networks of lower and contained complexity].

Also depicted in FIG. 5 at a basic level is field 180 'Type' and field 190 'Properties'. Again, further sections will dive into details on these and other fields, but for the establishment of an LBR network, suffice to say that plumbing-side agents checking in to establish an LBR infrastructure need to announce their roles and provide basic information on their properties. An example of 'type' might be a Wi-Fi 'wallwart' listening node or a common Wi-Fi Access Point. An Example of 'properties' might be specifications on ping count stamp resolution or the anticipated rate at which the agent expects to be contacting the LBR with data packet traffic. One 'property' for plumbing-side nodes/agents is any knowledge they might have of their location. This is usually expressed in latitude, longitude and altitude, if they know this. Clearly, these fields are quite flexible and expandable.

The Agent Registry 110 having finished its registration task then sends a response packet back to the LBR, 150. Later sections will go into much greater detail on how this response packet 150 can contain several layers of packet-routing combinations, basically telling the LBR to route some subset of the packet 150 to some 'Agent X', another subset to 'Agent Y', and perhaps yet another subset of the packet back to the initiating external agent (not depicted) that sent the original packet 130. This general notion is referred to as a 'flurry' in FIG. 5, attached to label 150. Deferring the discussion of a "flurry" to later sections, the main three actions (realized as packet transmissions) the Agent Registry would like to see happen after this registration act are depicted as 200, sending a subset of the response packet 150 to one or more plumbing-side agents, 210, sending a subset of the response packet to one or more market-side agents, and 220, sending a subset of the response packet back to the initiating (registering) agent. What is difficult to depict in FIG. 5 but should be appreciated and described is that in general, the steps listed as 4, 5 and 6 in the figure are performed sequentially and that there is an option for the response packets from, say, step 4 to append new data into the packet sent to step 5 agents. Unfortunately, it CAN be even more complicated than this sequential stepping, but for registration, we can imagine it to be strictly sequential and that routed packets can have appended metadata attached. The next few figures and associated text will parse steps 4 and 5 a bit more, so for the purposes of describing this FIG. 5, suffice it to say that interested plumbing-side and market-side agents have been contacted, with response packets duly received by the LBR, as one consequence of the external agent registering itself with the LBR. This appending of packet information can be an operation performed by the LBR software, 100, or, one can posit a 'packet appender' agent not depicted in FIG. 5, or, even send packets back to the Agent Registry, 110, to do this operation along with the typical process control steps ensuring that the response 220 ultimately sent back to the registering agent is correct and authentic.

As stated, FIG. 5 is trying to isolate the initiation process and, given its still high level nature, the 'flurry' aspects of 150, 200 and 210 will all be further described. Concluding then with discussion on FIG. 5, a confirmation packet 220 is of course sent to the initiating agent, presumably almost all the time with a 'good to go' flag and the implicit message, 'start doing whatever thing you are going to do,' with the implicit notion that LBR 100 is willing to serve the initiating agent's needs.

Figure 6:
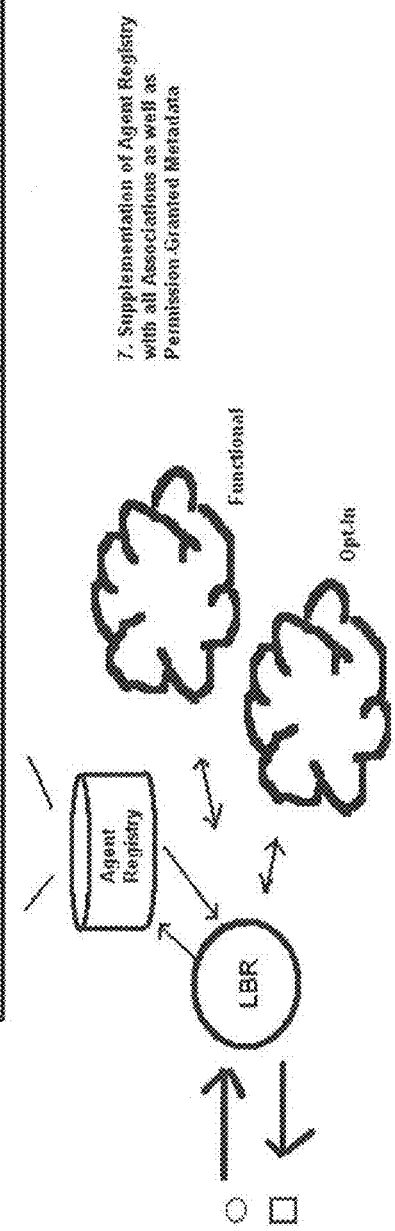
FIG. 6 is a diagram illustrating how an agent registry may be supplemented with associations and permission granted metadata as a consequence of actions triggered by registering an agent within a LBR.

FIG. 6, however, does put a little more detail into another 'consequence' of the 'flurries' that were described in FIG. 5. That is, both the plumbing-side flurry and the market-side flurry sent back data which then the Agent Registry received and appended to the registry data associated with the external agent being registered. A concrete example here might be that a Wi-Fi wall wart is the registering agent and some grouping agent (to be described) not only discovers that it should belong in one or more of the groups it is already managing, but that it also is close in location terms to ten other wall warts and that its register entry ought to indicate such. Likewise, contacts with market-side agents may find certain connectivity into either private or public networks where the registering agent will make its permissions to participate known and the networks will likewise invite it to either participate or exclude it as the case may be. The main point of FIG. 6 is that these new fields will show up in the Agent Register's database, appending database 120 of FIG. 5. It should be noted that the actual operations which initiate appending of the registry fields and their subsequent filling with data can be a separate packet-exchange session between agents in 'the flurry' and the Agent Register, hence they are not explicitly depicted in either FIG. 5 or FIG. 6.

It should also be noted that FIGS. 5 and 6 reinforce the location correspondences between common infrastructure nodes and market-services that hope to tap into a given location. So when a Wi-Fi wall wart or access point registers its lat-long-altitude and some flurry indicates (via looking up the lat-long-altitude database as is common in geographic services) that this new device is in some public cafeteria, then inherently the new device's function is being set up for the plumbing-side service of helping to locate clients determine where they are in the cafeteria, AND, setting up its participation in market-services to those clients. All of this gets back to the ideas behind FIG. 1, illustrating that injecting location information into the setting up of common infrastructure nodes becomes a foundation for also setting up location-based services to a location. A technician installing some device is inherently creating a location-based marketplace by bolting the device in and turning it on. The proprietor/owner of the device then becomes free to exclusively exploit the marketplace thus created, lease it, make it free to all comers, etc., as further sections will continue to describe.

Not every last step, packet and operation can be depicted in FIGS. 5 and 6. The intent is to show that even in the simple act of registering a plumbing-side node/agent into an LBR's domain, many things can happen. Further sections of this disclosure will describe these more detailed steps and operations.

Establishing an LBR Infrastructure: Timing and Location Agents

Figure 7:
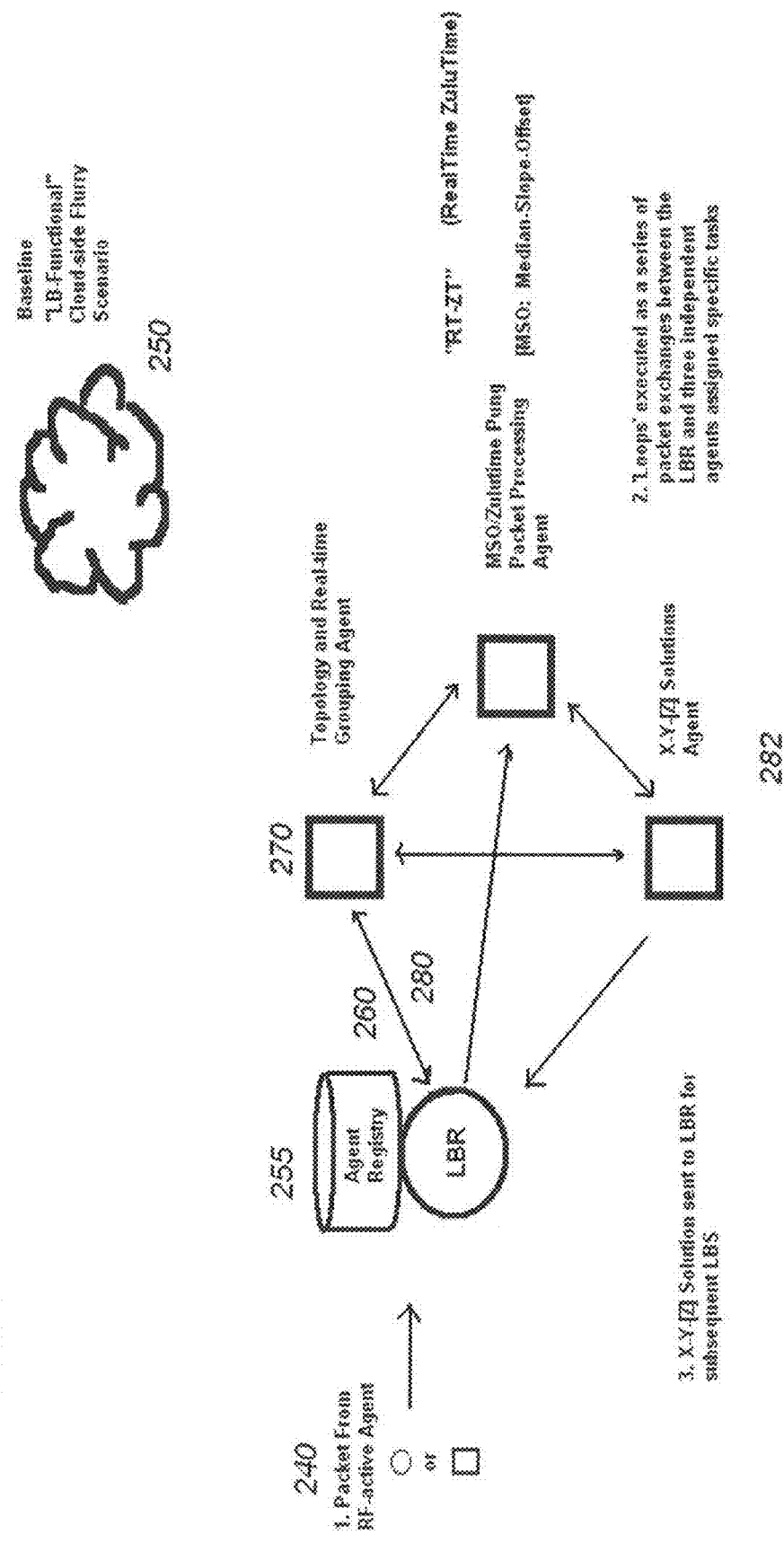
FIG. 7 is a diagram of an example of an LBR interacting with elements of a positioning system, which are implemented as agents.

FIG. 7 is a diagram of an example of an LBR interacting with elements of a positioning system. The particular example of a positioning system in FIG. 7 is called "Zulu-Time," and specific examples of such a system are described in the space-time calibration patents incorporated above. In this section, we describe an example of a process for setting up of a timing and location capability within an LBR framework based on the space-time calibration approaches described in the space-time calibration patents. In those documents, one will find many variants of the production of raw data, the organization of nodes and how they communicate (mainly through pings and pungs), and how all these things are rolled up into timing and location solutions. This section describes how such operations can be executed within and LBR framework.

With reference to FIG. 7, this section explains how elements of the space time calibration system can be 'broken up' into an LBR framework, where various algorithmic and organizing steps become their own independent agents. FIG. 7 continues with the agent registration process flow established in the previous section and explains both how timing and location can be initialized within an LBR context, but also how data can start to flow through that infrastructure and produce timing and location solutions for those nodes requesting such. We will run through FIG. 7 twice, first as it is connected to the registration process of new agents as described in FIGS. 5 and 6 with associated text, and then a second time as external nodes become active data producers providing real-time data toward the LBR, expecting timing and location solutions in return.

In FIG. 7, at the left we see a packet 240 coming in to the LBR from some external node/agent as described in FIGS. 5 and 6. Let us first postulate that this is the same 'initialization and registration' packet described in those previous FIG. 130, and hence, as label 250 indicates in the upper right of FIG. 7, we will take a peek in on one example of a 'flurry' that can happen as part of setting up the LBR infrastructure and enabling it to provide timing and solution services, i.e. a peek in on cloud flurry 200 of FIG. 5.

We have already been through the various registration steps consolidated as label 255 in FIG. 7, let's now enquire about the packet 260 being sent to a newly introduced agent called the 'Topology and Real-time Grouping Agent' 270. This agent 270 has already registered itself with the LBR and its Agent Registry. In an initialization phase, packet 260 will be announcing the arrival of a new RF-active plumbing-side node, call it Bob, and implicitly asking the Grouping Agent 270 to group together nodes with certain proximity relationships to each other, as described in the space time calibration patents incorporated above. An example of this might be that folks are setting up a given floor in a given building with 5 Wi-Fi access points (AP's) and 30 Wi-Fi wall warts, and the first packet received by 270 instructs it that such a new grouping is coming its way and that it should initiate a group associated with this very specific floor. The next 34 of these 35 registering agents will indicate they want to belong to the newly established Bob's group and agent 270 obliges by setting up a group database. In both the case of Bob asking for the group to be set up, and the 34 agents after Bob, a response packet 280 is sent back to the LBR of 'all clear' which eventually makes its way back to the RF-active nodes via packet 220 of FIG. 5. Later sections of this disclosure will further examine the operations of the grouping agent 270, so again for the purposes of describing how an LBR infrastructure is first established, FIG. 7 at least shows the basics of how RF-active nodes can become associated (grouped) based primarily on proximity and implicitly, RF interaction (utilization of common Wi-Fi channels, sharing of those channels, etc.).

The section entitled 'baseline operations, timing and positioning' will come back to FIG. 7 and discuss its operation in a real-time setting. The remaining item to note for this section is that also part of response packet 280 going back to the LBR is a sub-packet destined for the LBR's Agent Registry 110, instructing it that the group agent 270 accepted the new agent as part of 'group Bob' and that the agent 110 should perform the registry-appending as described in FIG. 6 accordingly. Part of the packet 280 is also a message to agent 110 that pung data received from the newly registered node will in most cases be routed toward the agent labeled packet processing agent in FIG. 7.

Using the example of 5 AP's and 30 wall warts above, at some point enough of these active Wi-Fi agents have fired up and registered with the LBR such that the grouping agent will send a message back to the LBR that it has estimated that Bob's group is probably sufficiently populated for timing and location solution action. This message can both a) trip a flag in the Agent Registry's database and/or b) can be sent all the way to the registered nodes. This then completes a look at how an LBR infrastructure can be set up and made ready for live data feeds ('data feeds' meaning: floods of pung packets, referring to the collection and distribution of ping data in pung packets in the space time calibration patents incorporated herein, above).

Enter LBR Market-side Participants: Initializing/Registering RF-Active Nodes/Agents For the purposes of this section, we shall confine the description to RF-active nodes/agents on 'market-side' to be any device which primarily wishes to accept and use timing and location services from the network along with the later described marketplace services of the network. A primary example here is mobile phones. Other examples include laptops and tablets, RF-active sensors and RFID's, two-way radios, industrial devices and equipment, etc. Market side agent applies to any device that communicates and wishes to consume location services.

There are two main classes of these nodes/agents: ones which explicitly interact with an LBR universe and ones that don't. The former category is rather straightforward and will be described first. Industrial devices using Zigbee, IEEE standard 802.15, are excellent examples of this class. The latter class is typified by transmit-only tracking of smart phones, where the users of such phones typically do not care about LBRs operating within the surrounding network, but they just want to know where they are and have very explicit and reliable 'opt in' or 'opt out' participation in market services. In the latter smart phone case, the smart phone merely makes packet transmissions and does not directly interact with an LBR, at least relative to the pro-active determination of its location (it often wishes to consume/use the solutions to that process, however).

Starting with the first class, a typical operational scenario would be for a client device, for example a Zigbee-based mobile sensor communicating with some fixed-in-space infrastructure device also Zigbee-based. There are of course many options available to this mobile sensor but a common one is where it wants to have a direct relationship with an LBR and directly consume timing and location services from that LBR. FIG. 5 also depicts how such an agent/node can pretty much follow the same initialization/registration procedures as fixed infrastructure nodes/agents. This section will describe some small variations from the plumbing-side nodes/agents case.

Looking again at FIG. 5, such a client device has at least two options for directly participating in LBR timing and positioning. Option one is to have knowledge of the IP address of the LBR and to just register itself directly, and the other is to 'ask or assume' that some local infrastructure node/agent will do all that for it. Either way, a registration packet 130 is sent to the LBR just like the earlier case but now with the simple distinction inside the packet that this node is a market-side (or client-side, equivalently, where one can imagine that this industrial device is 'in the market for determining its location', and may later be 'in the market to have certain industrial services provided to it based on its location') node and generally will be expecting to be provided services as opposed to providing them. As previous disclosures have explained, this is not a hard distinction, as even client-side nodes can also provide data to an LBR network that assists other nodes (indeed, it is hard for data to be provided which does not somehow accrue to the benefit of all nodes in the network except in data glut situations).

The LBR will then generally follow the same routine previously described with a few small differences. For example, there may be a logically separate Agent Registry for client nodes, think of it as 120' (120 prime), with slightly different fields being populated with ID's, metadata and associations. Such a registry would also expect a more fluid coming and going of client nodes whereas the plumbing-side registry may be more stable as interpreted in a geographic and 24/7 sense. This separation of registries is by no means required however, where another approach is to just have more data fields, where plumbing-side nodes will have 'N/A' in several fields that apply only to market-side nodes, and vice versa.

Also, the cloud-side flurries 200 and 210 will be similar at the high level (they happen), but in each case there will be different agents potentially contacted with indications that a market-side node is being registered. For example, the grouping agent 270 of FIG. 7 will fundamentally 'expect' that this new market-side node will probably be mobile (especially if such a field is set '1'), and thus to expect that it will be changing its group relationships over time (see Ser. No. 13/179,807 filed Jul. 11, 2011, entitled LOCATION AWARE INTELLIGENT TRANSPORTATION SYSTEMS (published as 2012-0309414), and 'topographic ooze', for example, which is incorporated by reference). Likewise as will be discussed later in this disclosure, the Agent Opt-in cloudside flurry 210 will in general be much richer and complicated, reaching and interacting with more cloudside agents, than is the general case with plumbing-side nodes.

All in all, however, the registration and initializing into the LBR framework for a duplex RF-active node is therefore quite similar to a plumbing-side node. The case of an RF-active agent/node such as a Smart-Phone needing to be registered, where the device itself is only participating in a transmit-only modality, is just a bit more involved than the directly participating duplex agent. The primary difference is that such a Tx-only device needs to either a) directly 'instruct' some LBR-participant that it wants to be registered and that second participant will do the registering, b) be 'heard' by some LBR participant and registered as an anonymous Tx-only agent, c) find the IP address of the LBR and do the registration itself, d) request some 'third party app' that it wishes to participate in timing/location services and thereby 'imply' choice 'a' above where then that third party app does the registration. There are clearly even more options than a) through d) above, but the main point is that for most practical implementations, it is rather inefficient for the network as a whole to have the smart phone do anything more than 'transmit RF packets like you usually do' and let other nodes do the work. Later sections on levels of 'opt in' elucidate the various choices a smart phone has in participation in an LBR-enabled network.

Baseline Operations for Timing and Positioning

Previous sections started to touch upon the actual functioning of the timing and positioning services once some set of nodes have been registered and are ready to begin producing ping data and sending pung data. The space time calibration patents incorporated herein provide additional explanation of the meanings of pings and pungs, how they are shared and organized, and how timing and location solutions are generated. This disclosure and this section of this disclosure will continue to concentrate on practicing these methods in an LBR-mediated fashion as opposed to the many other forms presented in the space time calibration patents.

Going back to the example of our building with 5 AP's and 30 Wi-Fi wall warts (see, for example, U.S. application Ser. No. 13/179,807 (published as 2012-0309414) incorporated herein by reference, for more information about how AP's and wall warts can function together as a space-time calibration enabled network), let us now assume that all 35 agents have registered themselves and all have indicated, ultimately to the grouping agent 270 of FIG. 7, that they all are on floor 4 of building 7 on some corporate campus, and all have provided their 'floor coordinates' in the registration process ('Bob' decides that they should not name the group after him finally, and he served his role however in at least being the first to initiate a group later to be renamed 'floor 4 bldg 7'). One activity that the grouping agent 270 begins doing and continues to do as these new agents (the 35) register themselves is to initiate a new group structure assigned to this floor and it will enquire back to one of those agents the following English-phrased questions, but of course executed as LBR-agent packet exchanges AND as indicated by setting flags accordingly to fields associated with the English questions:

a) Are you and your floor associated with any of my existing macro-groups, e.g. Building 7 or Acme Corp Trilling Pines Campus?
b) Are you willing to share with me (agent 270) your square footage of the floor or even a floor plan?
c) Can you fix that floor plan onto latitude, longitude and altitude coordinates? If not, would you like me to try?
d) how many plumbing-side nodes do you expect to register, i.e. when should I believe you have registered most or all of the agents (5+30 in our example)?
e) Are you expecting floors 3 and 5 to also register and am I allowed to attempt cross-floor sub-groupings (thus providing for Z-axis continuity of solutions).
f) Do you have estimates of your expected traffic loads, ping rates, pung rates, etc., that are in addition to the individual 'properties' that I will already be acquiring through the individual registrations of the nodes on your floor?
g) MANY other such questions, many of which have been described in the space time calibration patents, especially U.S. application Ser. No. 13/179,807 (published as 2012-0309414), incorporated herein, dealing with grouping, mobility and constantly changing network topologies.

As item g indicates, this list of questions is far from inclusive for all such relevant questions that can assist the grouping agent 270 do its job. The notion that the grouping agent 270 needs to 'enquire' of one of these nodes is also just a convenient tutorial example, actual campus-wide and building-wide implementations will no doubt have batch uploads to agent 270 covering thousands of devices, hundreds of floors and often a couple dozen buildings (think college campuses for example). The more explicit example laid out above, including its deliberately 'non-engineering English question formulation', is meant to be clearer on the steps involved and some of the critical information necessary/desirable for the grouping agent 270.

Once the grouping agent 270 has some minimum threshold of information as indicated above, and once a dozen or two of the floor agents/nodes have registered themselves (or have been bulk-registered), the agent then performs some first-cut pairings of plumbing-side nodes, using proximity of those nodes as an initial guide. The pair-wise associations of nodes has been explored at length in the space time calibration patents, incorporated herein, and agent 290 in FIG. 7 is specifically geared toward processing real time pung data of such pairs. The reason that this is 'first-cut' pairings is that as anyone practiced in RF-arts knows, proximity and radio specifications do not equal expected quality of channels. One goal at this point is to understand exactly 'who is talking to whom' RF-wise, can node M hear and respond to node N, or just one hear the other, the combinations are obviously quite complicated.

The more refined step that agent 270 can initiate at this point is to send simple 'calibration' packet messages to some or all of the nodes on floor 4. The message to some particular node will be: send me a few dozen packets please (through the LBR of course), it can have any message you like inside, indicated as 300 in FIG. 8. Agent 270 also respectfully requests all other nodes on the floor to 'listen and record pings' while our selected node sends these 'dummy messages', indicated by 310 in FIG. 8. Presumably agent 270 either sends one LBR-agent packet to one master node on the floor, or, individual packets to all 35 participants, either way. All nodes duly listen and record pings then take turns shipping in their pung packets to the LBR, BUT, they too send several dozen pung packets, not just one, such that all nodes can attempt to hear all other nodes for not just one packet but many. This sending of pung packets and simultaneous listening and recording pings is indicated as 320 in FIG. 8. Finally, after all nodes (including the very first one) have had a chance to try to gather pings from as many other nodes as they can during this induced chatter calibration session, they all then send in their pungs from this chatter session, whereupon the agent 270 sorts these pungs and performs a thresholding of pairwise associations by asking 'Did node J EVER even hear node K, and if so, was it at least 25% (tunable) of the pings node J actually sent'? Crossing this threshold for any given pair, agent 270 then submits the raw ping values to packet processing agent 290 (described below) for it to determine whether pair J and K is of sufficient quality to indeed 'log' as a valid pair, with such pairings then being recorded in a registry inside agent 270. It tests this for all possible pairings (and then some, if floors 3 and 5 are indicated as associated with floor 4 as well)—or 35*34/2=595 possible valid pairings.

Figure 8:
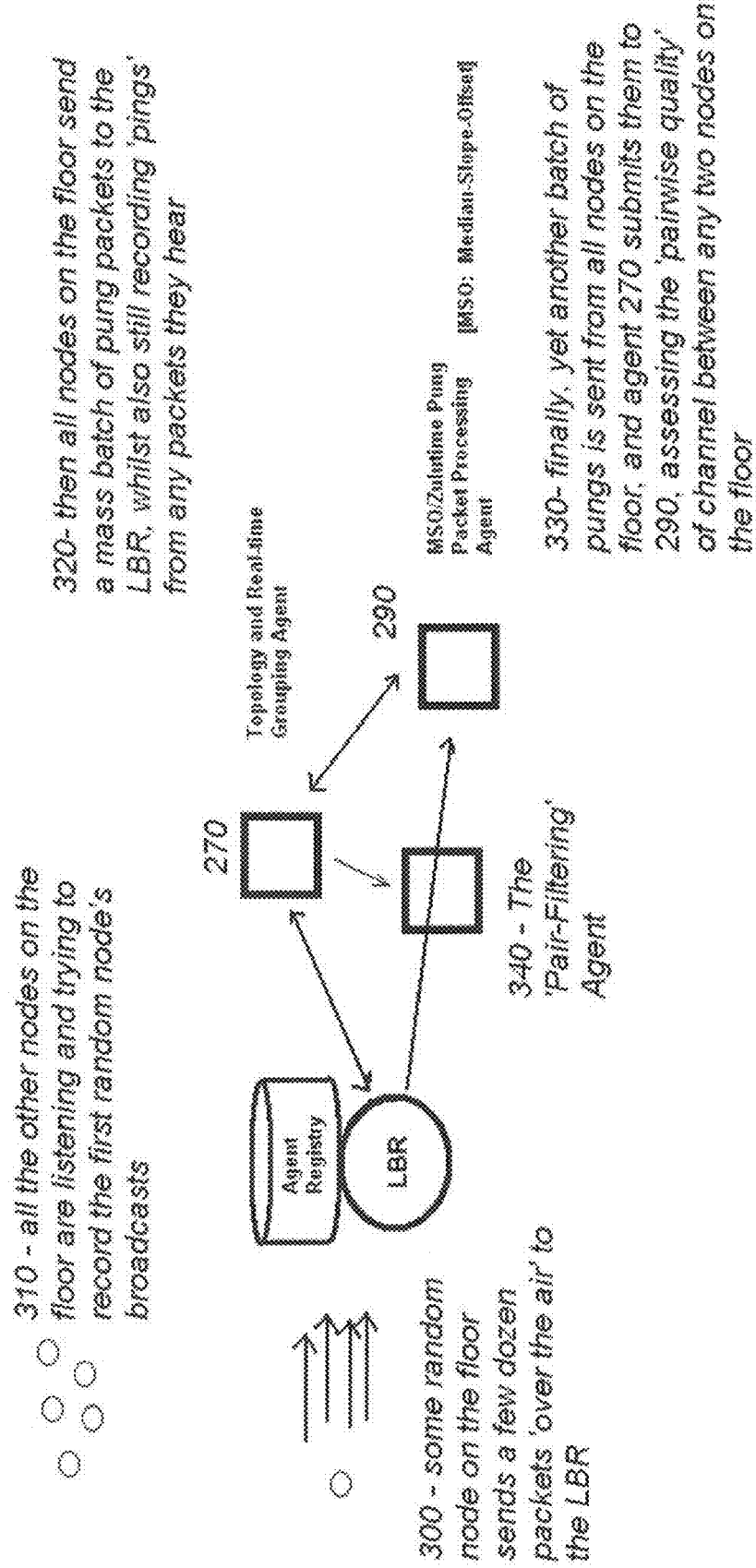
FIG. 8 illustrates interaction of the LBR of FIG. 7 with a node grouping agent, a packet processing agent, and a node-pair filtering agent, which together manage an ad hoc network of nodes.

The above description of a more refined notion of 'grouping' is thus predicated on first finding decent channel characteristics between pairs of nodes. The above description and FIG. 8 is truly more of a didactic example and those implementing such pairwise testing will assuredly use more batch-oriented methods and will no doubt use 'normal chatter' as the source for the pings and pungs. Again, the description above is explicitly meant to draw out steps and lessons on at least one way to manage the grouping of nodes. In short, the grouping agent determines the pairs that are communicating sufficiently, and logs them, and as the pairs change over time, it does periodic checks to maintain the validity of the pairs.

Let us now imagine the agent 270 has performed the steps laid out in FIG. 8 and has empirically found 300-or-whatever qualified pairings of plumbing-side nodes amongst the 35 nodes of floor 4. One thing it can do at this point is to lay out a graphical presentation of these pairing and present them as a graphic to a technician, although it would be pretty busy as a visual. A better 'intuitive' graphic might be presentations in an animated manner, stepping through nodes and ensuring that each node can hear some minimum desired number of other nodes. For more discussion of the density of nodes and the effects such densities have on quality of timing and spatial solutions, see the space time calibration patents incorporated herein. Automated agents can also be employed rather than requiring a human technician to make judgment calls on densities and qualities of connections.

Preparing for live operation, now, a minimum step that agent 270 should take is to at least store away the registry of pairings itself in its own memory and/or disks, and then to send either a rather large LBR-agent packet to the LBR, addressed to the Agent Registry 110, instructing 110 to add new fields to all of the tested nodes, indicating in their own database entries which nodes they seem to be well paired with. Such data fields would properly show up under the 'associations' field of FIG. 6. Exactly how such information will be used in live time-space services situations will be explored below.

It should be clear that the explicitness of the inherent pair-wise checking is really more of an ongoing operation. So, one of the operational jobs of the agent 270 during live operations is to routinely (e.g., every hour or once a day) do pairwise checking, testing, what have you, deleting valid pairs if they somehow stop behaving well and adding new pairs if they are discovered during normal operations.

Between the questions listed and presumably answered in the early part of this section, and the pair-wise mapping of the latter part, agent 270 has much of what it needs to now be ready for real time pung ingestion and the performing of its real time role.

The next step is for either some node at the building or some human controller at the building to send a packet to the LBR instructing 'all concerned agents' that everything is ready to initiate an ad hoc network session. At this stage, each of the 35 plumbing nodes on floor 4 start listening for Wi-Fi traffic (or Zigbee, cell packets, etc. as the case may be) and generate and store pings from the traffic it hears, then ship this data as normal pung packets to the LBR, which then feeds them into the solutions group of agents, as mediated by the grouping agent 270.

As noted above, elements of the space time calibration system are implemented as LBR agents. Another one of these agents in FIG. 8 is the "Pair Filtering Agent" 340. Its main role is to be the first guard at the gate of the flood of incoming pung packets, trying to condense pungs down to just the 'good pairs' that the packet processing agent processes further. The processed data one desires from the plumbing-side nodes is real time and continually changing clock count relationships between pairs of infrastructure nodes (plumbing-side). The next agent (packet processing agent) transforms the pung data of these 'good pairs' into a form usable for computing location solutions. One embodiment of the packet processing agent, called the Median Slope Offset packet processing agent, applies a model to ping data sampled over time by a pair of nodes and transforms it into form used by the solutions agent, as described further below. The filtering agent 340 is a computational efficiency filter, removing lower quality data from subsequent processing stages, like the packet processing and solution agents. One side task it can perform for the sake of agent 270 is to monitor the ongoing quality of pair-channels and report back on problems or new additional pairs discovered.

The picture becomes complete when a mobile market-node comes onto the scene. The mobile node starts transmitting packets that are heard by a handful of fixed nodes. In these packets, the mobile node issues a query for its spatial location to be determined, and in response, the X-Y-[Z] Solution agent, 282 FIG. 7, provides a solution for the location of the mobile node. The space time calibration patents describe how the combinations of pairwise data mixes with the raw ping/pung data received by fixed nodes from the mobile devices' transmissions, all leading toward an X-Y-[Z] location determination. Particular implementations, for example, for mobile devices are described in patent application 61/613,915, filed Mar. 21, 2012, entitled Positioning Systems for Wireless Networks, which is incorporated herein.

Spotlight on Dynamic Topology and Grouping Agents: Continuity of Solutions and Continuity of Connections Expanding upon the description of the previous section/ending paragraph, details on how incoming pung packets from fixed infrastructure-side nodes get turned into mobile client location solutions is better described by going straight to the 'normal' situation of some mobile device entering, travelling around in, then leaving a typical retail space. This section keys in on what exactly might happen behind the scenes in an embodiment of a LBR while this scenario plays out. Many of the ensuing figures are taken directly from U.S. application Ser. No. 13/179,807 (published as 2012-0309414) and Ser. No. 13/187,723 (published as 2012-0309415), which are incorporated herein.

Figure 9:
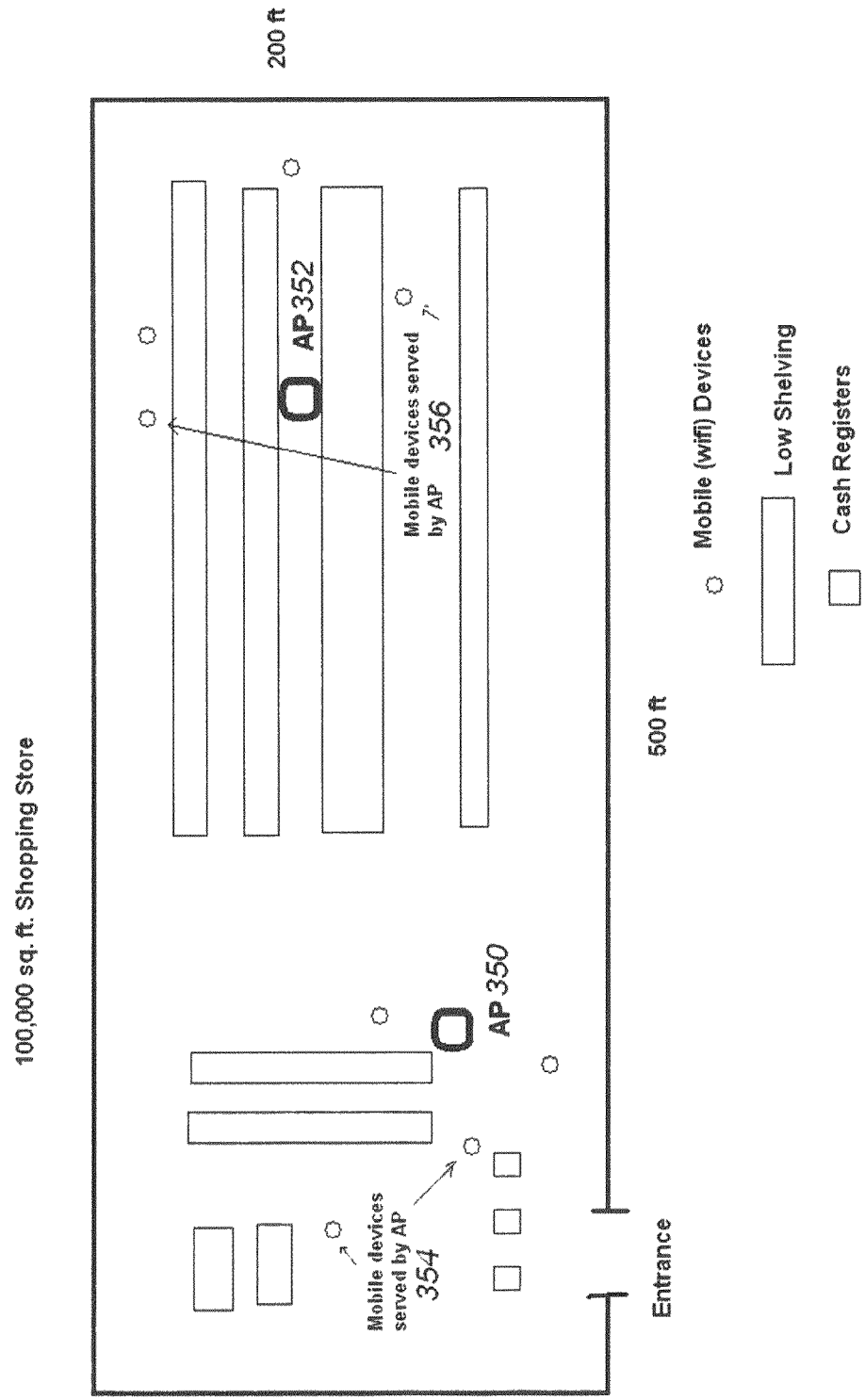
FIG. 9 provides an example of a retail store floor plan to illustrate an implementation of a LBR that manages queries for location solutions from mobile devices in the store and matches consumers of location based servers (mobile device users) with cloud-side suppliers of those services.

FIG. 9 thus introduces the basic single floor plan of a retail space, with a generic 'complication' of having two operative access points, 350 and 352, servicing the Wi-Fi clientele inside the store, each which happens to be on separate Wi-Fi channels (see other disclosures for a discussion on Wi-Fi channels and how spatial solutions adapt to multi-channel environments, such as U.S. application Ser. Nos. 13/179,807 and 13/187,723). Random client nodes being serviced by these AP's are labeled 354 for those nodes serviced by AP 350, and 356 for those serviced by AP 352. Hypothetical shelving and cash registers are also included in the graphic.

Figure 10:
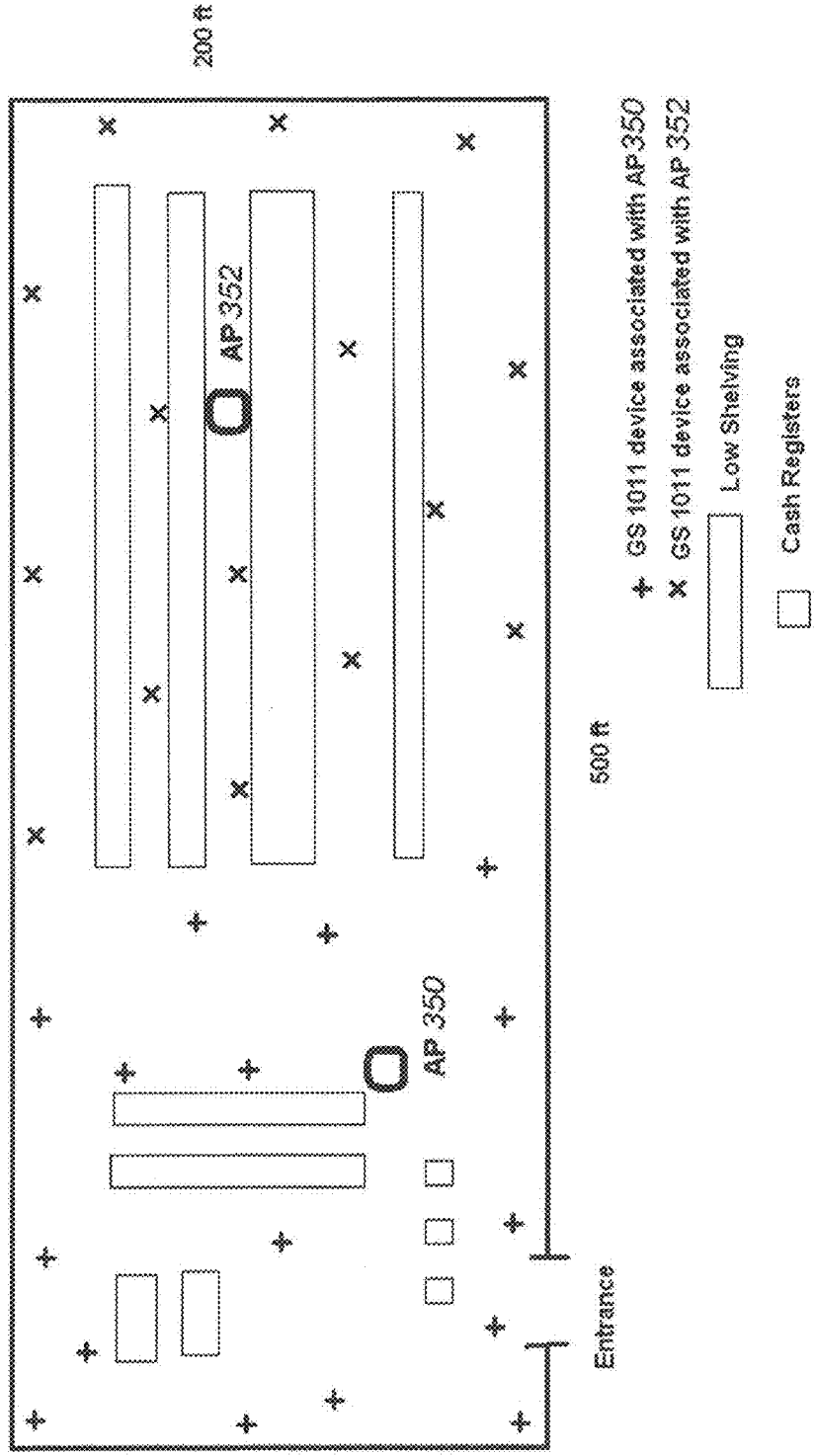
FIG. 10 illustrates an arrangement of wireless network nodes, including infrastructure nodes and access points (AP) in a Wi-Fi network embodiment.

FIG. 10 removes the icons for the mobile clients and instead points out the locations (on the ceiling) of a large quantity of infrastructure nodes, which in this Wi-Fi embodiment comprise low cost Wi-Fi devices referred to in the figure as 'GS 1011 device'. This embodiment of a Wi-Fi device is typically statically fixed to a ceiling, a wall plug (wall wart), a post, etc. The GS1011 Wi-Fi device is provided by GainSpan of San Jose, Calif. A property of these devices is that they have two processing units, one largely dedicated to Wi-Fi communications and the other being a general purpose ARM processor capable of being programmed to perform operations of an infrastructure node described herein. While we use the GS1011 in our Wi-Fi implementation, other Wi-Fi modules may be used. Also, for implementations based on other signaling methods and standards, communication modules compatible with those signaling methods and standards may be used (e.g., BluetTooth, Ultra WideB and, etc.)

All infrastructure devices strewn throughout the store are generic and essentially identical, BUT, there are two different icon types presented in FIG. 10, indicating the differences between those infrastructure devices, 358 or '+', which choose to associate with AP 350 and use its particular Wi-Fi channel accordingly, and those, 360 or 'x', which choose to associate with AP 352 and use its Wi-Fi channel. A description of how such devices are configured, installed and subsequently 'associated' with an AP is provided in U.S. application Ser. No. 13/179,807, incorporated herein. Existing Wi-Fi communications may be employed for installing, configuring and associating such devices with an AP.

The general point that FIG. 10 is setting the stage for is that this particular store has effectively two slightly overlapping 'zones' with two different Wi-Fi channels, foreshadowing the coming description whereby mobile devices move randomly throughout this store and yet are supplied with continuous and seamless location determination solutions. That only two AP's are presented is for tutorial/description reasons, and many if not more larger stores will have more than two AP's, yet will have identical LBR principles apply which are discussed in this section.

Figure 10A:
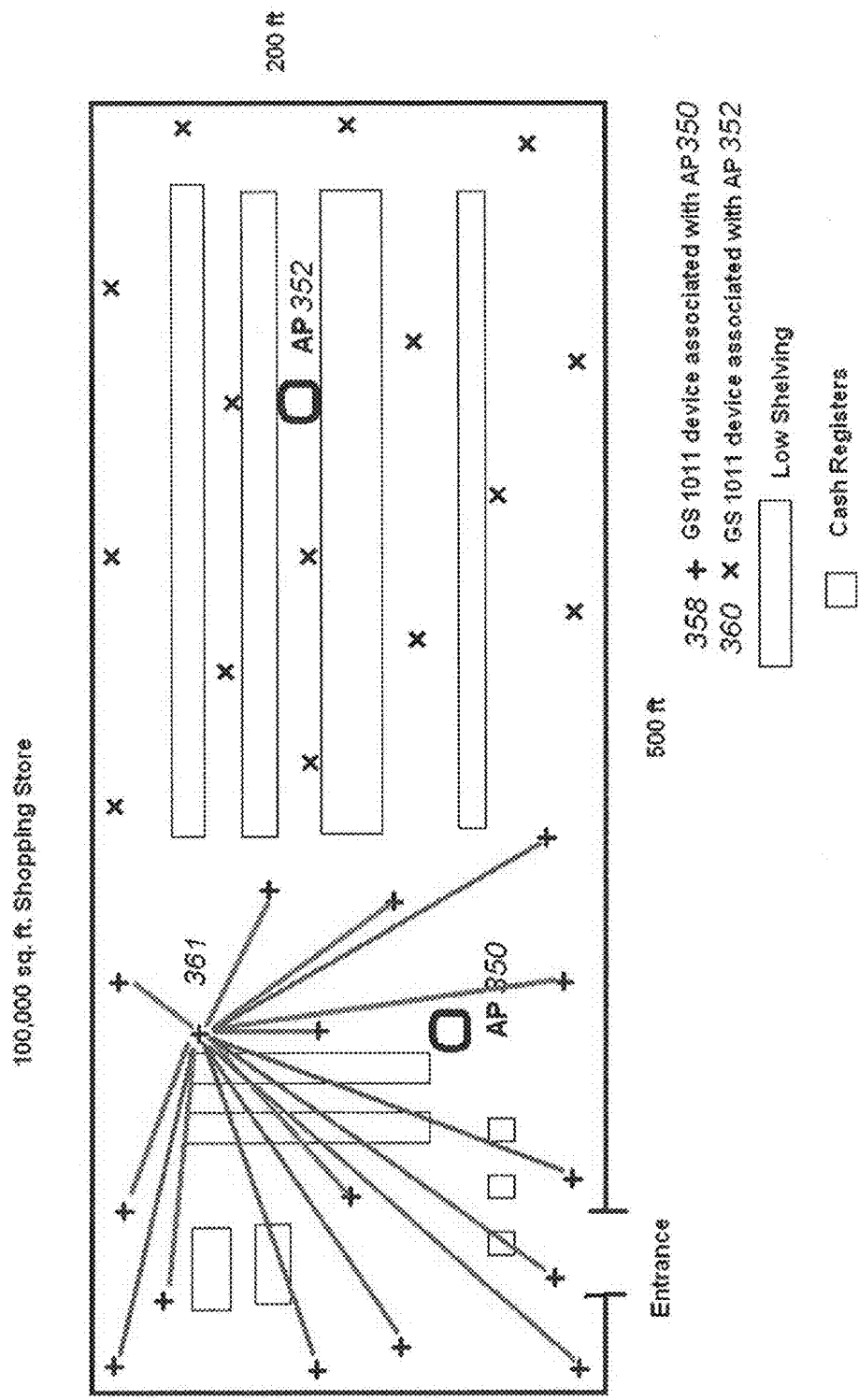
FIG. 10A depicts an example of classifying pairs of nodes as being sufficient or insufficient for use in forming an ad hoc network of nodes that provide reliable data for determining position solutions.

Now, let us assume that the set-up operations described by FIGS. 5 through 8, and all the accompanying sections around those figures, are performed on all of the infrastructure devices depicted in FIG. 10, including the creation of two sub-groups associated with the two AP's, with the two combining to form one overall group identified by the store itself. Consider also that a 'chatter session' has been run whereby a grouping agent has determined all the decent pairs of Wi-Fi direct channels between two random GS1011 devices. FIG. 10A then depicts one particular infrastructure node, 361, and which other nodes were found to both 'hear it' and 'be heard by it', depicted as green lines versus red lines. The red lines to the nodes associated with the other AP are not depicted as being obvious (as they are different channels and won't hear each other). Note that many of the further devices on the same channel nevertheless have red lines indicating that the high quality reception of signals was below threshold for those given pairings. This may be due to simply being out of range, some process applied whereby it was determined that too much noise or 'multipath' was present between two nodes, perhaps they hear each other but there is some sporadic distortions due to an excessively RF-distortion-mobile factors—it can be any number of reasons for a grouping agent to determine whether a given pairing is a good one or not (and as stated, these pairings are constantly monitored and changed if necessary, even during X-Y-[Z] solutions stages).

FIG. 11 now graphically introduces a mobile market-side client into the scenario. The graphic is simple in its changes from the previous figures and concentrates attention of what goes on during this so-called 'association' with AP 350, depicted by the dashed line 364 in the figure.

The reality is that there are a great many variants on what exactly might happen during this initial association. Many variants will have more to do with the customer/store-proprietor relationship being formed than they do with LBR and location determination. Many of these customer-relationship activations and 'opt-ins' and loyalty program implementations will be covered in greater detail in sections devoted to LBR marketplace dynamics. This section will concentrate exclusively on LBR operations in support of location determination with mobility and channel-switching involved. So the dashed line 364 in FIG. 11 effectively represents what was discussed previously in the section on market-side node registration and initiation, where it referred largely to FIG. 5. More particularly, what was described in the final paragraph of that section included several options of how a market-side client, most typically a consumer's smart phone, gets registered into an LBR framework.

Perhaps the easiest but by no means only way to register a new mobile node, 362/364, is for the store proprietor to first establish a loyalty program Wi-Fi session with that node—logging in to a mobile application for the store—then simply ask a newly arrived customer if they want location based services inside the store. This can also simply be a 'checked setting' so that a customer only need be asked once. Once the store knows a given customer is desiring location services, the store will know the ID or MAC address of the device and will instigate all the LBR registration activities described in earlier sections of this disclosure. Again, the dashed line 364 is very short hand graphic indication of all of this activity. We can then assume that now an LBR, an Agent Registry AND a Grouping Agent, generally run by the store or some service provided to the store, knows about our new mobile node 362. This mobile need do no more than transmit Wi-Fi packets every now and then (once or twice a second if it wishes to be real-time tracked with navigation assistance) for it to be located, with details on how this is done immediately below.

Figure 12:
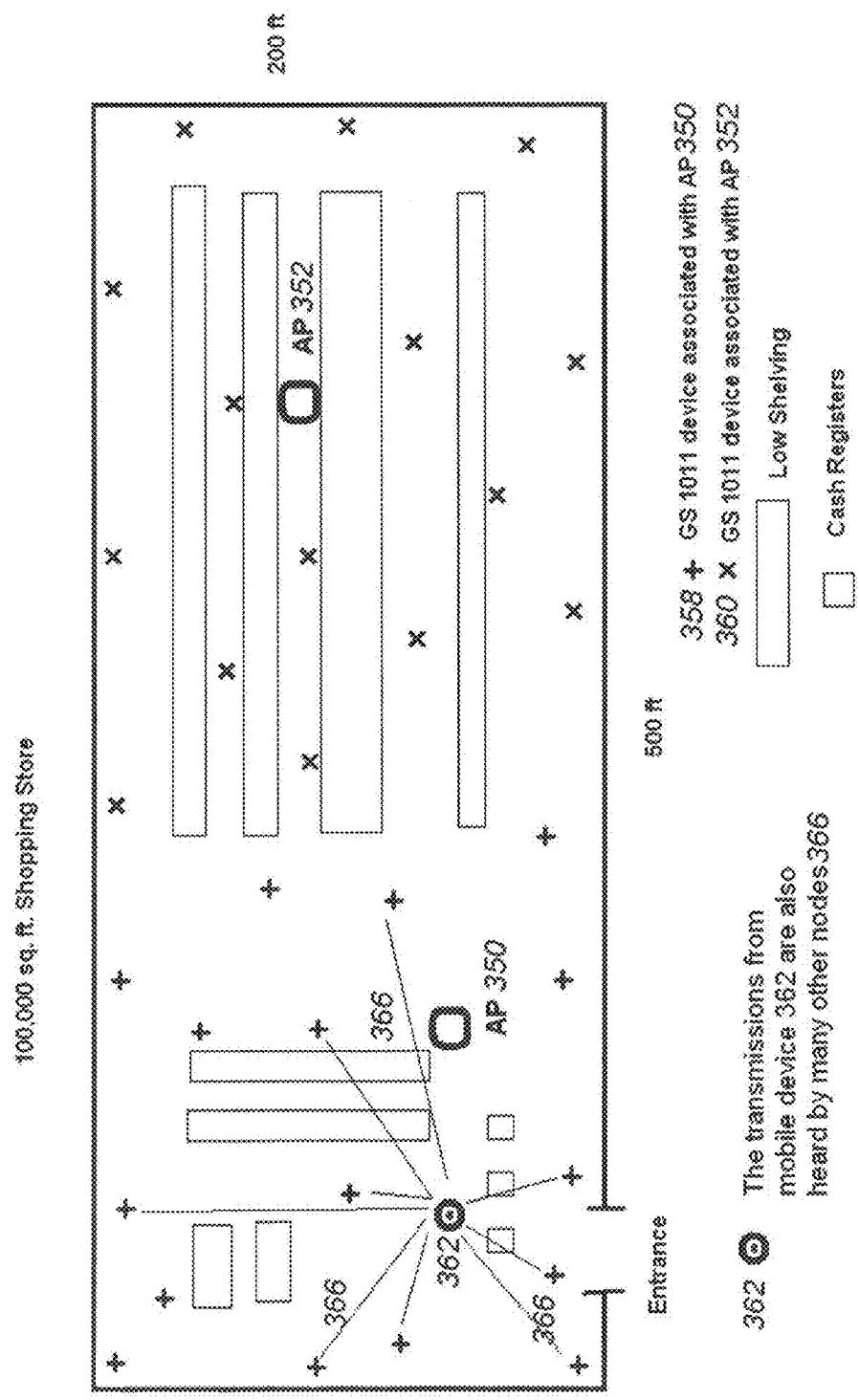
FIG. 12 depicts an example of the transmissions from the mobile device being heard by several infrastructure nodes.

FIG. 12 then depicts that even with the first packet transmit from mobile node 362, there is a small set of nodes which receive that packet and record its local arrival at that device using its individual free running counter, i.e., the depicted nodes all record pings from that packet transmission and subsequent reception. They know absolutely nothing about this new device, and indeed they generally only 'know' about ID'd devices that they should record pings and put ping data into pung packets, or explicit 'don't care' lists informing them they don't need to record the pings. For unknown transmission pings received at infrastructure nodes, best practices would be to have new/unknown devices being heard on the 'care and record' list and later, the LBR can send a message to put any given device onto the 'don't care' list. [As 'opt-out' descriptions attest, devices pro-actively telling the store that they wish to not participate in any form of location services or 'tracking' will give rise to these 'put this specific ID device onto your 'don't care' list, whereby each and any node cannot help but at least to RF-wise record an incoming packet from some device, but upon decoding the device ID and matching that ID to its 'don't care' list and finding it on that list, the node will then immediately discard/erase said ping data rather than packaging it up into a pung packet]. Thus, this raw RF-level receipt and countstamp recording of the transmissions of node 362 is represented as 366 in FIG. 12, labeling the many lines to specific nodes but by no means all nodes in the store (see discussion on the 'chatter session' whereby fixed infrastructure nodes established their 'good pairings' relationships; same general idea applies here: some nodes will hear the new device well, others won't).

So, back in the cloud (e.g., LBR embodiment operating as a cloud service), some Agent Registry 110 now has taken note of the sheer presence and typical 'opt-in' of mobile node 362, instigated whatever flurry is necessary to alert other agents of this presence, with a Grouping Agent 270, FIG. 8, being one important agent in this regard. Such a Grouping Agent will as previously stated have many options available to it but at the core it must effectively say 'I notice that this new device is obviously now within my store ABC123 group, I know it is mobile, I know it is transmit-only and I know it is currently associated with AP 350, which itself has nodes N through T associated with it'—the stage is set for putting all these pieces together as a contained local-solution group generally centered around the nodes that actively and with ever-changing configurations hear this new node 362. The grouping agent will monitor which nodes continue to hear transmissions from 362 and a section below will describe what happens as the node 362 wanders about the store.

Returning still to FIG. 12, let us now posit that the store-app-server, the 'loyalty program server' having been informed by node 362 that it wishes to play in its location services realm, now instructs the new node 362 to simply transmit a few more Wi-Fi packets (or, if the device 362 was already going to be sending packets for session relationship purposes, there is no need to instruct 362 to send packets as it was going to anyway). The end effect of this is that our small group of infrastructure nodes will collect maybe five, maybe a dozen ping-values each as they hear the packet transmissions from 362. Over an ensuing period of a couple seconds (difficult to graphically depict in FIG. 12 and hence not present), each infrastructure node also dutifully packs up such ping values into its pung packets that will be 'over the Wi-Fi airways' sent to the LBR as described in earlier sections. Of important explicit note in this example is that as nodes transmit their own pung packets 'over the airwaves'—i.e. as their own RF transmissions, other nodes will hear and record pings on these pung transmissions. So, at least for this isolated example of just one mobile device 362 being in the store, the infrastructure nodes will be recording pings from both the mobile device 362 AND all neighboring nodes in its vicinity, generally speaking the ones in the 'good pairings' list being tracked by the grouping agent, 270, FIG. 8. After a couple seconds therefore, and after every infrastructure node has had an opportunity to submit its latest batch of ping data to their LBR as pung packets, and after the LBR has routed such pung packets to the appropriate grouping agent, at last we get to the point where some pung processing agent, 290, FIG. 8, can collect such data and launch a specific solutions thread associated with new mobile device 362.

Figure 13:
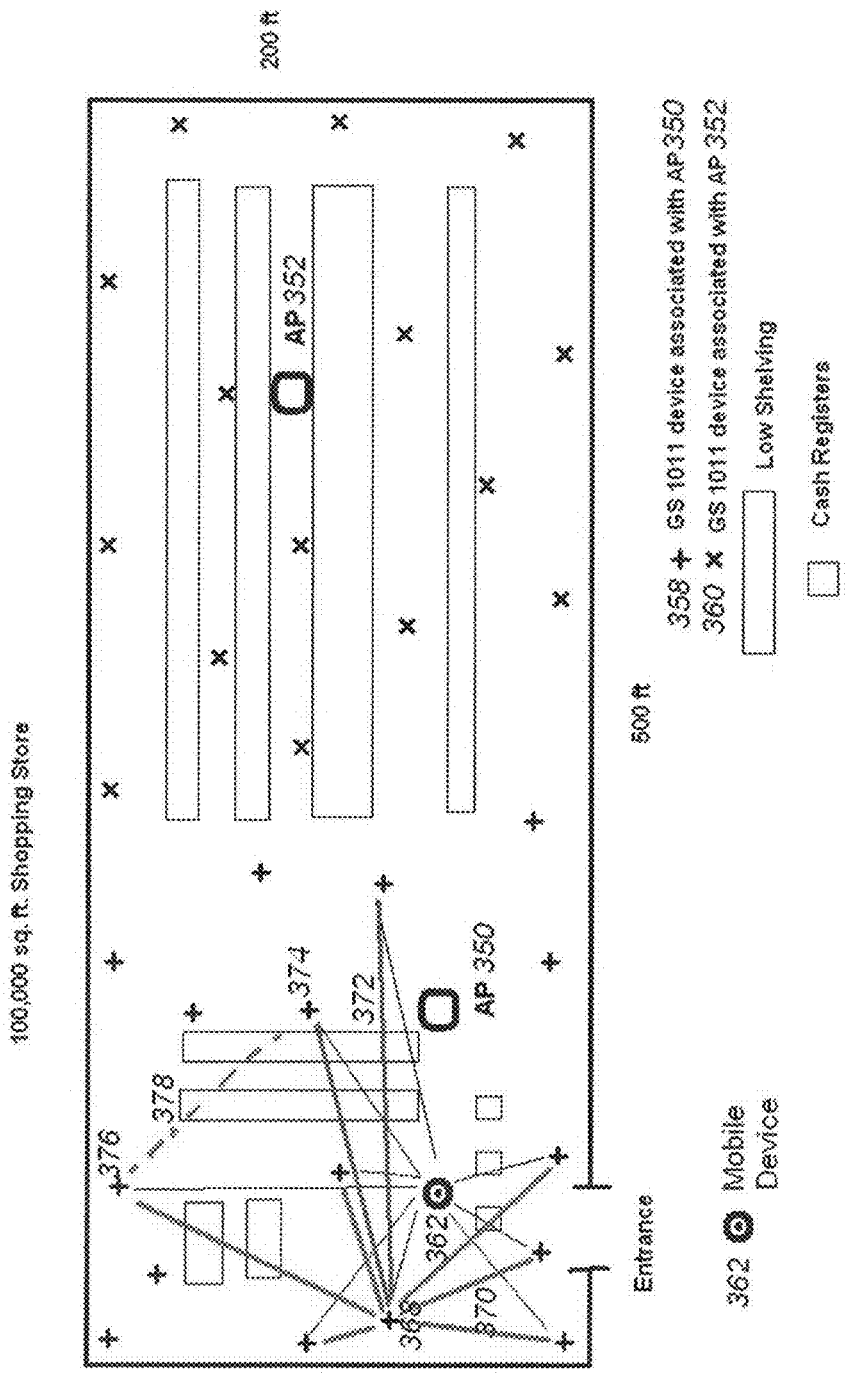
FIG. 13 depicts an example to illustrate how packet processing agents and pair filtering agents operate to assess the communication between pairs of infrastructure nodes as a means of pre-filtering ping data in the packets that these infrastructure nodes provide to the packet processing agent.

FIG. 13 graphically indicates one aspect of what the pung processing agent, 290, does. One specific infrastructure node, 368, is chosen as an example of all such nodes which are hearing mobile device 362. The pung processing agent, through services provided to it via the Pair Filtering Agent, 340, FIG. 8, determines that 'at least for right now', node 368 has decent communication channels going with precisely '6' of its neighboring nodes indicated by the green lines in FIG. 13, 370, but it does not have good channels with two of its neighbors that are nevertheless hearing mobile device 362, where this poor-pairing relationship is indicated by two red lines in FIG. 13, labeled 372.

Those practiced in the art of real-time ad hoc networks will recognize that the main ideas being described in FIGS. 12 and 13 is that mobile devices are just that, mobile, and generally on a second by second basis their RF transmissions will be somewhat stably heard by certain specific devices but that exactly which will always be changing. The underlying problem to be solved with all of this is that over some couple second period, there happens to be a closed set of RF-active nodes which both hear 362's transmit packets AND hear each other's transmit packets. This ever-changing sub-set of RF devices forms the solution basis for 362's location. So, node 368 happens to 'right now' have good pairings with 6 of the 8 devices which are 'right now' hearing 362's transmissions, but if we then look at node 374, we find that it has a separate 'good pairing' relationship with device 376, indicated by the dashed green line 378. Any good pairings of listening devices can provide useful input to location determination.

FIG. 14 illustrates this concept by showing a case where all good pairings for some specific few second period and for this specific mobile device 362 are fully displayed. This disclosure keys in on the networking principles and software agents in the cloud that track this veritable spider web through time. What is perhaps most interesting about the visual presented in FIG. 14 is that the reader must now imagine this plot 'in real-time' and ever-changing on a couple-second by couple-second frame rate, and with just a bit of internal visualization, one can watch this web follow device 362 as it begins to move about the store. The underlying operation of the LBR of this dynamic version of FIG. 14 is, primarily, contained in FIGS. 5 through 9 and their associated written descriptions of the previous sections. Examples of the processing of ping data to compute timing and location in this type of indoor Wi-Fi environment are described in the space time calibration patents, and in particular, Publication 20090213828, Ser. No. 13/187,723 filed Jul. 21, 2011, entitled MULTI-PATH-COMPENSATION METHODS FOR LOCATION-DETERMINATION OF MOBILE DEVICES, Ser. No. 13/179,807 filed Jul. 11, 2011, entitled LOCATION AWARE INTELLIGENT TRANSPORTATION SYSTEMS, and 61/613,915, filed Mar. 21, 2012, entitled Positioning Systems for Wireless Networks (now filed in non-provisional form as Ser. No. 13/833,679), incorporated herein.

Over time scales of a few seconds or a few tens of seconds, a GPS receiver generally expects a reasonable stability of the satellite signals it is receiving from various specific satellites, but it also expects constant change as well, once those time scales stretch to minutes and longer. The situation depicted in FIG. 14 is not hugely dissimilar at this time-scale level, where the mobility of the mobile device itself becomes the inherent driver of what at its deepest level is a de facto network configuration issue—i.e., the need to continually determine which nodes are 'during this short few last seconds' communicating packets between each other, keying in on just one mobile node for the framing of the configuration issue. The singular mobile node, 362, defines its own network configuration relevant to itself. The sequencing of this disclosure will next discuss what happens as more mobile devices enter the picture and 'efficiencies behind the scenes' can become clearer.

Dynamic Topology and Grouping Agents: Scaling the Number of Mobile Devices Served FIG. 15 continues the exampled started above, this time illustrating several mobile devices. This diagram is also found and described in U.S. application Ser. No. 13/179,807, incorporated herein. Here again we will focus in on an LBR construction of how such examples more easily scale as mobile devices may approach dozens and hundreds for some given very large store or mall, and the numbers of stores and malls approaches thousands and tens of thousands.

FIG. 15 isolates a singular example infrastructure node, 380, on the ceiling or on a wall, etc. Its location in the store is such that at some few-second period in time, it can receive and decode packets from 14 specific mobile devices (unlabeled in the figure). Recall that a valid receipt is not just verifying the identity of a given mobile device but also latching a counter upon the receipt, thus capturing a ping datum for that packet. The figure then illustrates how a pung packet is thus generated in the top right corner of the figure, 382.

In the LBR context, we can know that device 380 has been duly registered with an LBR. This device receives and records ping datum from nearly every 'relevant packet' it receives, packs up the datum as pung packets and transmits the pung packets to the LBR. The filtering of relevance between packets involved with LBR activities and those that are not relevant should follow standard 'updated lists' practices, as has been described, including in reference to an 'opt out' procedure, where devices can choose to place themselves onto 'ignore' lists, 'immediately discard' lists, etc.

Node 380 records pings from some group of mobile devices AS WELL AS records the ping counter values as it hears other nodes sending their pung packets to AP 350. This situation is depicted in FIG. 15A, where the pung packet 384 sent from some other random infrastructure node to the LBR is also heard and ping-recorded by our example node 380. It is exactly the same packet transmission, the two numbers just refer to the fact that both AP 350 and infrastructure node 380 receive the packet, with 380 also count stamping the packet and placing its value and ID of the transmitting node into its pung list 382. It should be recalled that all 14 depicted mobile devices are just having 'normal Wi-Fi communication sessions' as mediated by AP 350. AP 350 can also be countstamping incoming packets just like the infrastructure nodes, indeed, this will be the preferred embodiment of this invention once more AP providers understand the benefits of enabling location capabilities in their offerings, but for now, these capabilities generally do not exist on AP's and thus, the situation depicted and described herein simply posits the AP's as doing their usual thing: mediating communication sessions with a variety of Wi-Fi devices around them.

Another quite acceptable variant to the scenario herein described which will work just fine but is not generally supported by 2102-era devices is that duplex count-stamping (ping gathering) can also be happening between fixed nodes (both GS 1011 devices AND AP's) and the mobile devices themselves. One can envision FIGS. 15 and 15A all having mobile devices with on-board count stamping capabilities for Wi-Fi packets received by those devices, pung packets constructed accordingly, then the mobile devices could place such data into packets received by AP 350 and sent to the 'store app' or whatever 'session' they are a part of, to then be passed onward to some LBR and therefore their data would also participate in location determination. Indeed, it is this inventor's belief that mobile devices will someday ALL have accessible packet-receipt (and probably packet-transmit) count stamps latched upon packet Rx (and Tx) events. When this happens, mobile devices can choose to be more active participants in LBR sessions. 'App developers' will be able to create and provide all manner of new apps exploiting a more direct relationship with LBR's and location-based marketplaces. "Opt-in" and "opt-out" capabilities go to a new level of sophistication and trust once a given device itself can choose what data to share and what not to share, or, to simply keep all of its operations to itself similar to a GPS receiver being able to function by simply listening to public-domain signals. Likewise, a mobile device can also just sit and consume (receive) public domain signals and determine where it is. The LBR architecture CAN support such pure consumption of services by making many of its current data feeds (from infrastructure nodes such as the illustrated GS 1011's devices, for example) publicly accessible.

Concluding this section, one can see that in the nominal case of mobile devices simply broadcasting Wi-Fi packets every so often, then scaling is just a matter of how many mobile devices can be heard by any given fixed-node infrastructure device—in the final analysis this will be determined by Wi-Fi airways and contention for air-space, as one would put it in the parlance of wireless communication. The LBR cloud-side construction is such that LBR's can be parallel, agents parallel, threads spawned and pretty close to 'indefinitely scalable' as the hyphen 'cloud-side' implies.

Dynamic Topology and Grouping Agents: From Raw Pung Data Ingest to Location Solutions This section will go further into details of what is happening as the infrastructure nodes continually send their pung data to an LBR. As will be seen, essentially all of the 'algorithmic steps' remain similar to those of previous disclosures in the space time calibration patents, including prescriptions on dealing with multipath distortions and dropped channels. Here, the emphasis is on breaking up these steps into a more efficient and easily scalable form. One simple example of this is embodied in a rhetorical question, answered in this section: if two fixed infrastructure nodes are involved with receiving packets from 20 or 30 mobile nodes in order to assist in determining those mobile node locations, and if there are sub-operations common to just those two nodes applying to all 20 and 30 mobile nodes, why do such operations 20 or 30 times? (short answer: do them once and make these results available to the 20 or 30 solution threads; longer answer: practice LBR principles for scalability).

Figure 16:
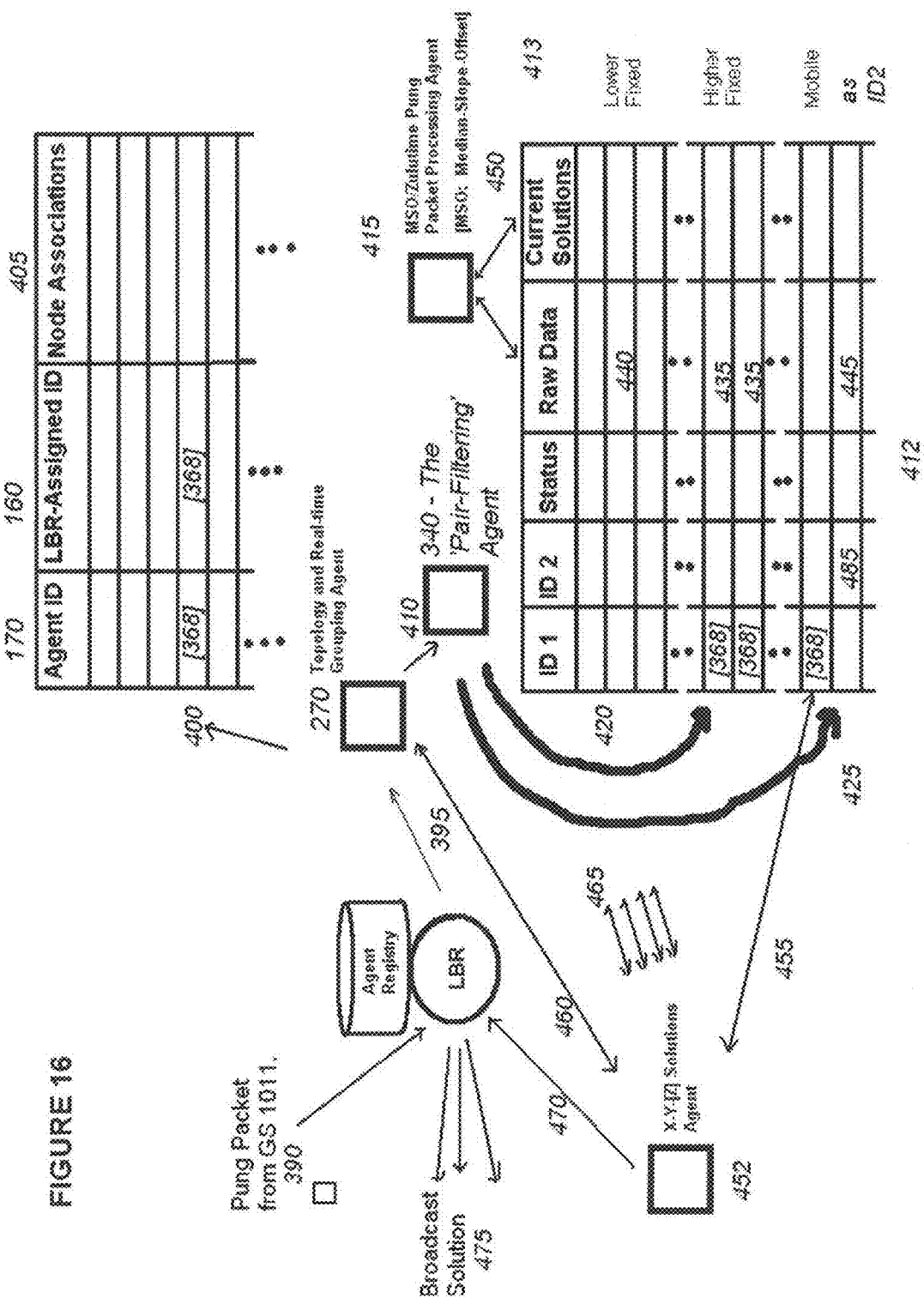
FIG. 16 is a diagram illustrating how the LBR routes packets among agents, and the agents process the packets to provide locations solutions.

FIG. 16 takes some of the bones of FIG. 7—which illustrates how various player-nodes are registered and organized—and will now illustrate how ongoing pungs are processed from many fixed infrastructure nodes. [As previously noted, it would be useful to have pung data from mobile nodes as well, but this example assumes that mobile devices are in a 'transmit only' configuration, not 'caring' about being a direct participant in determining their location but merely wishing to benefit from that knowledge; this issue is a 'market penetration' issue, where limiting the requirements of a mobile device to simply transmitting a few Wi-Fi packets is a lower barrier to entry, and hence this section continues to concentrate on this mobile transmit-only scenario].

In FIG. 16, let's start by looking at the far left of the figure and the presumed incoming pung packet 390 [For now, let's assume it is from node 368, FIG. 13]. This is, in our implementation, 'wrapped' by a LBR packet frame, see FIG.

4 and its accompanying description. Via wrapping instructions, the LBR and its associated Agent Registry, the LBR in this case knows to pass along this packet, 395, largely intact to the grouping agent, 270, that has been previously assigned to fixed infrastructure node 368. The LBR may also perform some housekeeping operations such as incrementing a counter for how many pung packets it has received from 368, and/or updating the 'time of last LBR packet' from 368, and/or broadcast a message to any agents which have signed up to be alerted any time 368 submits a pung packet. There are other options as well, but generally speaking these will be mediated by fields in the Agent Registry where such instructions have been previously loaded.

Grouping Agent 270 immediately determines (step 400) which of its many nodes it might be handling has sent this incoming packet, again through the LBR wrapping. In this case, it determines the sending node through database look-up through a conventional database process. From this look up, it finds whatever operative ID(s) are associated with the sending node. Much of the Grouping Agent's task has already been performed when it was tasked with doing a crude grouping of nodes based on 'floors' and 'AP's', etc., where subsequent operations created the chatter sessions and found initial configurations of 'good pairs'. In a highest level design sense, the Grouping Agent is chief instigator of the cloud-side flurries required to initiate groups and set the stage for real-time solutions processing, and its real-time role becomes therefore more of just another router with some housekeeping chores watching over the general health of the established groups, pairs, serviced mobile clients, etc., doing something about the 'health' and/or changing network configurations if it discovers major changes in such. Inherent to these earlier activities was the storing of such information and the creation of its own internal listings of managed nodes and node associations, with FIG. 16 making this more explicit.

Continuing on with FIG. 16, we see a broadly defined column heading labeled 'node associations' which is obviously more involved than a simple column would indicate. The activities depicted primarily by FIG. 13 and its associated text are generally kept track of (recorded and monitored) at a higher level in this agent's database (higher level=the nodes generally grouped with AP 350 but not necessarily 'good pairings', which we will come to; and also, generally which active mobile devices MAY, but not necessarily ARE, being heard at any given few second period of time). We might refer to this level of association as a virtual or potential level, and ensuing discussion on the pairwise agent and the packet processing agent clarifies another level of granularity on how few-second by few-second changes are monitored, stored, processed, etc.

For this scenario, we can imagine that Agent 270 does a quick check on the pung packet looking to see that most if not all of what it contains is within the 'known' group of nodes, and if so, it mainly just passes along the intact packet (410) to the Pair-Filtering Agent 340. If it does find 'new nodes' in the pung packet, or some other anomalies (division of labor of anomaly-checking can be negotiated between 270 and 410), it may perform other actions such as inquiring back through the LBR whether there are new fixed infrastructure nodes that have neglected to register themselves, new mobile nodes which have not explicitly registered to 'opt out'—which itself launches a complex decision process on what to do with such 'purely anonymous' nodes—etc. As the sections describing more of the marketplace aspects of LBR will further elucidate, the whole privacy/opt-in/opt-out choices are rich and varied, and the Grouping Agent 270 is one logical contained set of software where some of those capabilities can be expressed and acted upon in public/readily identifiable and 'trustworthy' ways.

Continuing with the specific scenario, once the Pair-Filtering Agent 340 receives the packet 410, its primary task is to sort through the lines and fields of information depicted as label 382, FIG. 15, sorting everything into 'good pairs' discussed earlier. This is one of the reasons that the word 'filter' is used, though it could also be called a Pair Manager Agent, for its role in managing an updated list of 'good pairs' operating in an ad hoc network. One embodiment of how exactly this Agent 340 sorts information and subsequently stores it is depicted as the 'new' database layout in the lower right of FIG. 16, labeled 412. This database itself is actually not 'new' only newly described now that we are at this level of granularity. Its initiation was during the previously described chatter sessions whereby the many 'good pairs' were found and recorded. It can be argued that this database more properly should be managed by the Grouping Agent 270 and that the Pair-Filtering Agent should simply be an agent which operates on the database—which is exactly how this embodiment lays out the Packet Processing Agent 415 next to be described—OR instead this embodiment posits that this database warrants its management by Agent 340.

The lay-out of database 412 is also flexible with one specific embodiment presented, with the fields also limited in the depicted graphic to some mainline actors. The overall structure of 412 consists of two larger row structures with potential double entry logging for fixed duplex node pairings and a second single entry logging for mobile nodes. The field layout and the ID sorting approach are generically labeled as 413 and this and subsequent paragraphs walk through these items. The basic concept is that the node shipping in the pung data will become ID1, while all the ID's it contains inside its pung packet will become 'possible' ID2's, after certain checks and filtering occurs. In practice, the filtering done by node 368 itself, its so-called 'don't care' or 'discard' list, is not perfect and it will very often be sending in ping datum received from nodes not currently within the 'good pairs' database 412. We can then view Agent 340's task as first walking through its newly arrived pung packet and finding the sending node's ID (either the LBR ID and/or the Agent ID, etc.) in the ID1 field, assuring that the sending node is at least part of one good pairing. We will come back to the case where the sending node's ID is not discovered anywhere in the ID1 field.

Depicted in FIG. 16 is the curved arrow 420 where in this scenario the pung-sending node's ID has been located in the ID1 field. We can imagine that a total of ten entries are found after the first entry at the end of the arrow 420, corresponding to the six green arrows of FIG. 13, and four more that are not depicted in FIG. 13 because they may not have received good packets from mobile device 362 which was the primary subject of that figure. The task of Agent 340 is now simply to add in the raw ping datum of the pung packet into the raw data fields, labeled as 435 in the figure. It is generally sufficient to only place the raw data into the fields associated with the pung-sender, but there are also practical reasons that suggest also placing this raw data into the raw data fields of the 'transmitting nodes' as well, labeled as 440 in the figure. This is a kind of double-entry logging so that any node participating in either a transmit or a receive ping can have access to all recent relevant raw data as purely a function of the ID1 field. Again, though, this is a convenience not a necessity.

Agent 340 sifts through each entry in the received pung packet, attempting to find 'good pair' matches, indicated by the second and subsequent lines in the database. Here as well, it may find fixed infrastructure node ID's that are not a part of the ID2 field and/or it may have entries in the ID2 field where it is expecting to see some new raw data but finds none. Both cases are routinely encountered in practice. In both cases, the task of identifying and subsequently doing something about these situations can be negotiated between the Pairing Agent 340 and the Grouping Agent 270. In the earlier case where the sending node was not found in the ID1 field, and here in this paragraph's pointing out that sometimes good pairs find no new data and/or possible new 'good pairings' are showing up, secondary processes can start either in 340 or 270 to monitor and change the current good pairing database. Usually, this entails a certain kind of thresholding and consistency checking that was part of the initial chatter calibration earlier described. Those practiced in the art of maintaining real-time databases which log current connections and the need to monitor the 'age' of those good connections, the need to purge entries if they go stale, create new entries if new valid ones are found, should use such practices in the building of database 412.

Depicted next in FIG. 16 is the curved arrow 425, indicating that Agent 340 will also be cycling through all ping datum in the pung packet that belong to mobile devices that were transmitting packets. New mobile device ID's will either be found or not found in the current database 412 ID2 field. Where found, Agent 340 provides the raw ping count values into the raw data fields, labeled as 445; where not found, 340 or 270 may wish to kick off a 'is there a new unregistered mobile' message back to a store's app server for example, or similarly, 'we have found a new mobile ID, is your store policy to assume 'opt-out' first', with the response of 'yes' causing a broadcast to all infrastructure nodes in the store to place the newly discovered mobile ID onto their 'discard lists'. Sections on privacy, opt-in, opt-out will all explore these topics further, but the point for the current scenario is that some events will always be happening (good pairings going stale, new good pairs, etc.), and that one of the tasks beyond filtering of either 340 or 270 will be to deal with these types of anomalous events by making corresponding updates to database 412.

The steps through and including label 445 can together be seen as database look-up and updating operations, keying in on sorting and storing the raw ping datum contained within ongoing floods of pung packets being sent in from deployed fixed-node Agents. Scalability of this capability is the very definition of the process depicted. Agent 340 is largely tasked with this filtering out of 'good pair' real-time data, with the dispatch of the anomalous situations also included. This is now a good time to introduce the MSO Packet Processing Agent (also labeled as the 'Pung Processing' agent), 415 and its activities alluded to by the two arrows labeled 450.

Figure 17:
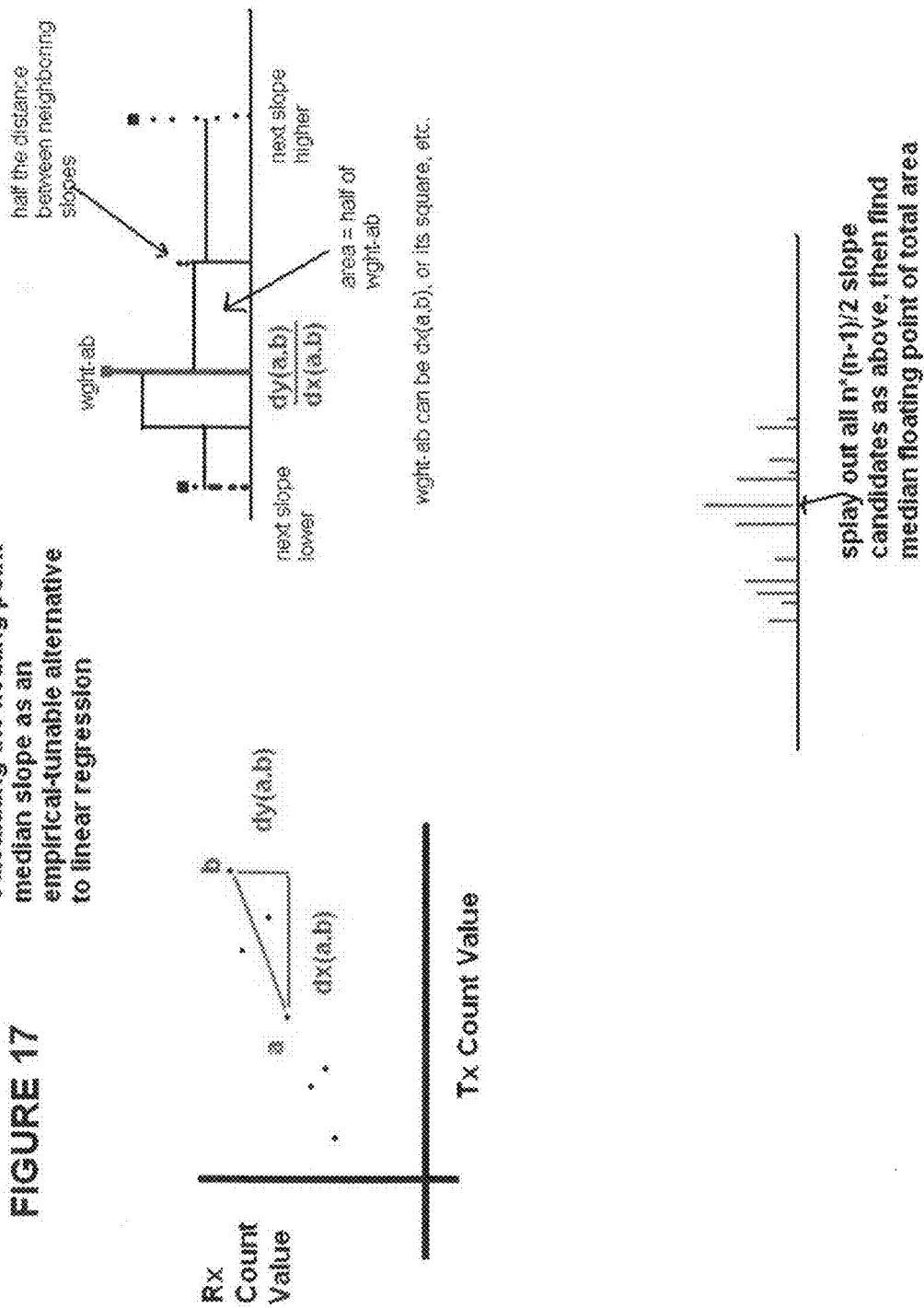
FIG. 17 illustrates a particular method of packet pre-processing in which clock/counter data gathered from transmissions between pairs of nodes is transformed into a representation used for computing location solutions.

As has been typical of descriptions of the exact operations of various agents heretofore, the precise execution of the MSO Packet Processing Agent 415 has many variants. Its central task is to transform raw current ping data stored in the raw data field into current slope/offset information existing between, generally, two fixed nodes in a 'good pair' duplex ping session. FIG. 17 illustrates aspects of an embodiment of this Median Slope Offset approach for transforming raw ping data. This approach comes from our observation that linear regression fitting of lines to sample data is sufficient in some cases to model ping data over time, yet empirical tuning with non-linear methods can provide better results. Depicted is one such 'empirically tunable' approach to finding slopes and offsets of sample distributions that are typical of Tx count v. Rx count plots between two fixed infrastructure nodes. If clocks/counters were perfectly in synch and counting together (same slope and zero offset between counters), these plots would be very close to y=x lines, offset by distance between nodes. This is stated only to help understand the depicted plot and obviously never happens. Another typical sample distribution is Rx-Tx as a function of either Tx or Rx—which tends to better intuit clock/counter differences though is largely the same information as Tx v. Rx. The point of FIG. 17 is mainly to explain how 'MSO' (median-slope and offset) functions, where other sections in this disclosure and previous disclosures explain the numerous places where such an operator-on-data can be useful, noise tolerant and tuned.

While linear regression fitting of lines to sample plots is acceptable as well, the MSO approach depicted in FIG. 17 appears to be a bit better in practice (10 to 50 percent error reductions are not uncommon, usually in high distortion environments—read high multi-path and delay-asymmetric instrumentation). Referring to FIG. 17, finding the median offset is essentially the same as finding the median slope, where the slope usually comes first, then the offset is found after subtracting the y='median slope'*x line from the sample distribution, followed by the same sample splay operation depicted in the lower part of the graphic on the resulting y-values after the subtraction (replacing y'=y−'median slope'*x for the 'dy(a,b)/dx(a,b)' in the figure, upper right). This is mathematical description of the transformation that agent 415 applies to clock/counter data. As noted, other means for fitting the data to a model, such as fitting to a linear model by linear regression, are also possible.

Thus, a function of agent 415 is to process a given raw data column cell-entry that it is pointed at, by grabbing the last few seconds of Rx/Tx count values and placing these median slope/offset results into the adjacent database column. Other agents to be discussed further operate on those 'interim solutions'. The 'pointing to which entry cell' is widely variable on how this happens: it can just do a common top to bottom cycling, it can be instructed to go to specific places by Agents 270 and/or 340, or it can just follow its own logic of watching when sufficient raw data conditions are met (thresholds, etc.) in all the raw data entry cells and operate when they are met. Other options are possible as well. Those practiced in real-time updating of raw data feeds into databases structure cells, then transforming such raw data into steady processed results, can recognize the options available for agent 415.

Turning back to FIG. 16 then, the X-Y-[Z] solutions agent 452 can now be more properly introduced. [It was labeled 282 in FIG. 7, with a higher level description earlier]. This agent's function also can have the 'generality of approaches' description exactly as agent 415 described in the prior paragraph: the details of its implementation are quite flexible. In our current scenario, its primary focus is on the many mobile devices moving about the store and the global need for some agent to process MSO and raw-mobile-Tx data into X-Y-[Z] solutions. Again for a 'Tx-only' example of mobile devices which get located by simply transmitting packets, the task begins by searching the ID2 field for any specific mobile device wishing to be located, indicated generally by line 455, then noting ALL ID1 fields wherein the ID2 field has that given mobile device, THEN inquiring of either agent 270 of where all the 'good pairs' involving this new set of ID1 players (effectively trying to piece together the logical situation depicted in FIG. 14 and its associated text). Once the web of FIG. 14 is thus determined, the MSO results are fetched (465) from the solutions-field of database 412 and combined with raw ping data in the "mobile as ID2" part of the database (co-indicated by 455), ultimately driving the several variants of final X-Y-[Z] solutions described in space time calibration patents incorporated herein, including the descriptions in the multipath oriented disclosures showing how the web-structure of FIG. 14 can be optimally exploited in a multipath-mitigation sense. See, e.g., Ser. No. 13/187, 723 filed Jul. 21, 2011, entitled MULTI-PATH-COMPENSATION METHODS FOR LOCATION-DETERMINATION OF MOBILE DEVICES, and 61/613,915, filed Mar. 21, 2012, entitled Positioning Systems for Wireless Networks (now filed in non-provisional form as Ser. No. 13/833, 679), which are incorporated herein by reference.

FIG. 16 illustrates the LBR operations that coordinate the proper data fetching and assembly lines of real-time data flow. Mass scalability generally dictates these approaches to 'getting to the math'. Minimizing Cost in its broadest sense is the real problem to be solved, with these last few sections describing an embodiment to such.

Concluding the discussion of FIG. 16 and of this section then, once given X-Y-[Z] solutions are determined for one or more mobile devices in the store, the solutions Agent 452 dutifully sends such solution(s) 470 to the LBR for whatever new flurry of activities this may instigate—475. As this disclosure transitions from plumbing-side descriptions of how location of devices is determined to market-side descriptions of tri-quads and location-based-markets, it will quickly be seen that the three lines labeled 475 are really just small matches which ignite several new and richly adaptable activities all with the end-goal of the far left side of FIG. 1: matching buyers and sellers.

Figure 18:
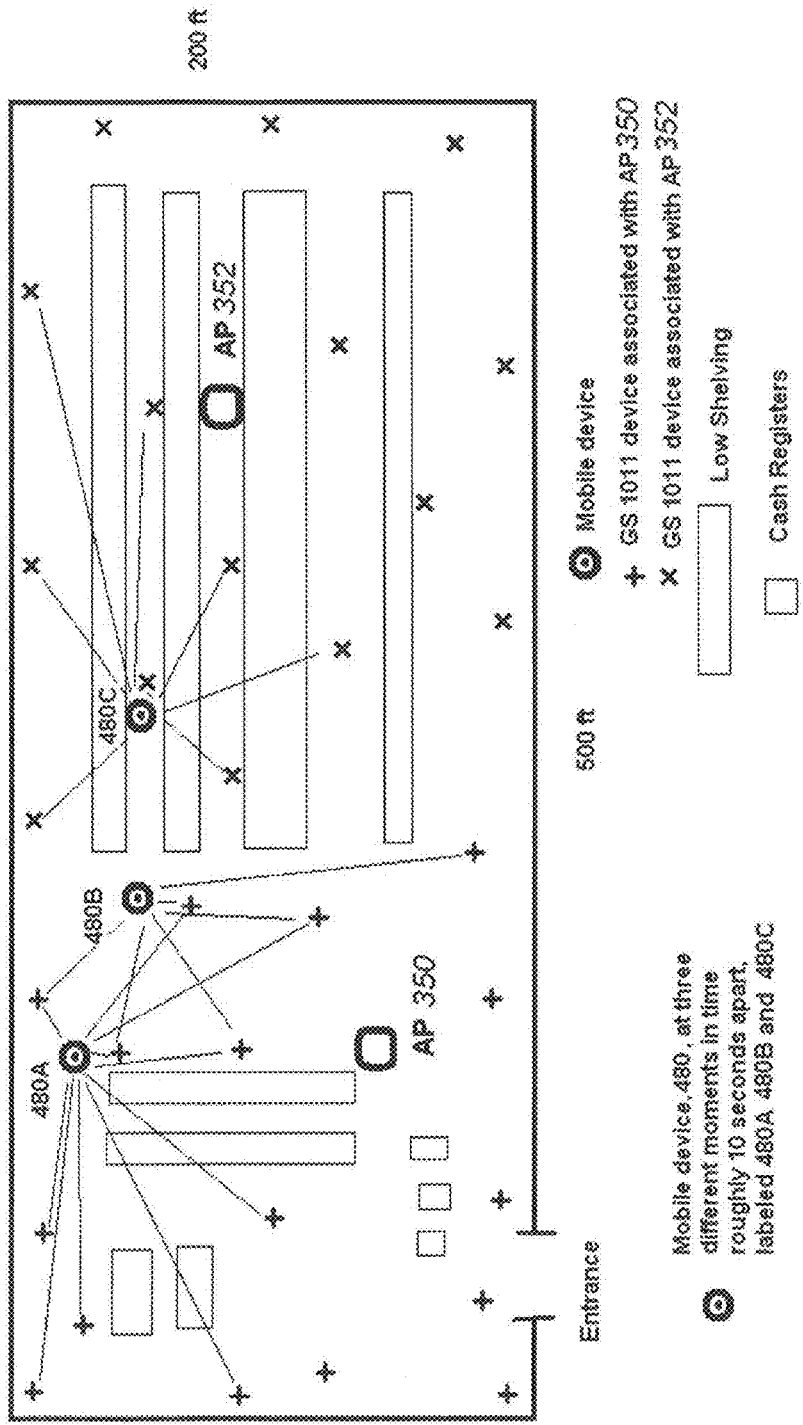
FIG. 18 is a diagram illustrating changing connections among a mobile device and other network nodes as the mobile device moves to different locations over time.

Dynamic Topology and Grouping Agents: Mobile Device Movement, Channel Hopping and Topographic Ooze FIG. 18 is largely borrowed from an earlier filing where this section will now concentrate on the LBR-aspects of this earlier-described scenario. The main concepts surround how LBR message passing amongst the various agents handles the constantly changing network topologies, including the point where a given mobile device switches from being associated (in primary data packet exchange with) AP 350 and switches over to AP 352, a scenario which also includes the plumbing-level-important switching of Wi-Fi channels.

FIG. 18 depicts a singular mobile device 480 now in three separate instances in time, separated by 10 seconds each, labeled as 480A, 480B and 480C in the figure. It also depicts 10, then 6, then 8 'good' Tx to Rx connections between itself as transmitter, and infrastructure nodes as receivers, at the respective A, B and C points in time and in the store. It can well be appreciated by this graphic that determining indoor location via this constantly changing set of connections is a bit trickier than the situation a GPS receiver faces, where satellite signal reception has a much slower timescale of change and, of course, a much more predictable set of connections.

If we go back to FIG. 16 now, we see label 485 in the ID2 column near the bottom of its graphic depiction. This label 485 is within the 'mobile' section of the database, as depicted on the far left, labeled 413 well above. The point of label 485 is to say that much of the rest of FIG. 16 and its accompanying text description is just going on as usual: infrastructure devices in the store are simply sending in their pung packets, non-mobile 'good pairs' doing their normal thing, but as device 480 moves around the store, we find that the main changes behind the scenes are that now different nodes will be reporting pung packets which have transmissions from mobile device 480 showing up.

As the solutions Agent 452, FIG. 16, is asked to make a location determination for 480, it has access to this last five or ten or twenty seconds of pung data showing up in database 412. Naturally, the solutions-agent fully expects that different nodes will wind up having 480 show up in the ID2 field over this time period, and previous disclosures have delved into how a singular time-filtered and/or Kalman-filtered determination of location can fall out from this short time period (e.g., five seconds) of Tx-Rx connections that have occurred between 480 and any infrastructure nodes. Solutions agent 452 thus collects all instances of 480 ping data as identified in the ID2 field and performs these mathematical operations accordingly.

As device 480 moves from 480A to 480B, the main action behind the scenes is that each second by second a changing set of nodes are actually hearing from 480, but all are still associated with AP 350 and hence on AP 350's Wi-Fi channel. The nodes associated with AP 352 and on its channel are thus not hearing transmits from 480 and thus are not showing up in database 412. Next we turn to what happens when 480 moves from the part of the store where nodes generally associate with AP 350 to the part of the store where nodes are associated with AP 352.

As usual, there are several options for detailed treatment of this situation. Perhaps the easiest and now the most common is when a given mobile device simply goes through its normal 're-association' process whereby the in-store Wi-Fi service simply figures out that 480's signal quality/strength is obviously and rapidly decreasing for AP 350, and a quick channel-hop procedure on the mobile device finds that there is a stronger-signal alternative in AP 352 and its channel. These procedures are well understood in mature Wi-Fi AP deployments and environments such as retail spaces. The most basic way of saying this is: mobile device 480 just switches over to AP 352 with the LBR infrastructure having nothing to do with it—it just happens as a normal part of Wi-Fi operations.

For this simplest/easiest case, then, the primary thing happening behind the scenes in LBR-space is that there is some 'coarse' instant in time where database 412 no longer finds 480 showing up in the ID2 field for all nodes associated with AP 350, and all of the sudden starts seeing 480 showing up in ID2 fields for nodes associated with AP 352. At the raw data level, it is as simple as that. It is then EITHER the Solution Agent's job to see that this wholesale switch of ID2 fields has occurred, notifying the Grouping Agent 270 of this change, OR, the Grouping Agent itself can have a low level process watching for this kind of channel hopping/AP re-association by monitoring pung packets and making sure its tracked group relationships—at the AP level—are holding firm. Both approaches also can work, a form of redundancy.

However the re-association and channel hopping happens, from the solutions Agent 452's perspective, it simply needs to take this switch into account during its calculations and blending together (usually in a Kalman filter way) of past, recently past and very current data into one singular estimate of location. In this case, the 'past' and 'recently past' data has come from AP 350 associated nodes, with the latest batch of data from 352-associated nodes. A couple seconds later, a hypothetical 480D not depicted, most data will now be coming exclusively from 352-associated nodes. This is a basic problem of solutions-blending across a boundary, where one side of the boundary has a discrete set of data providers and the other side has a different set.

Figure 19:
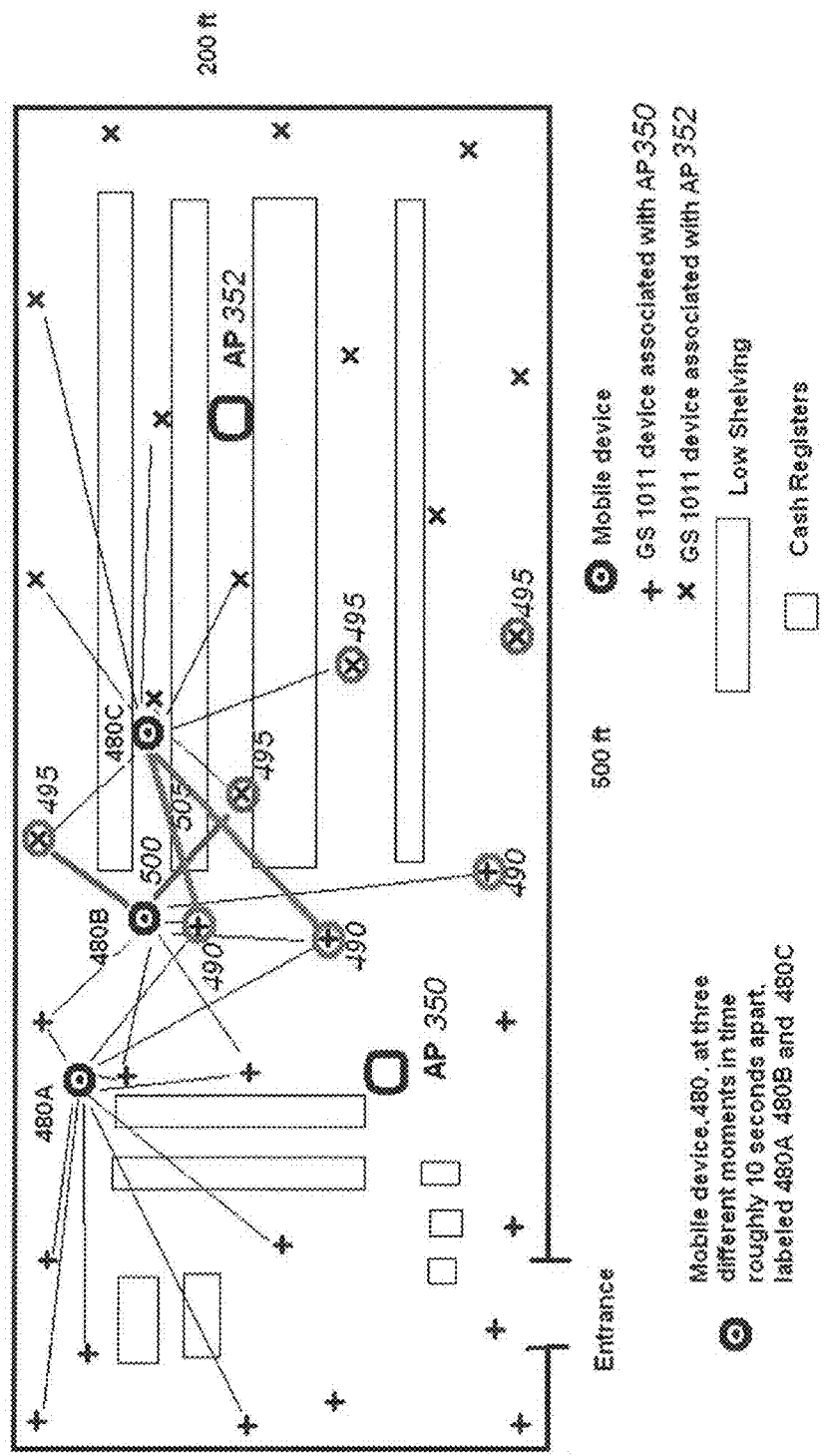
FIG. 19 is a diagram for describing another approach to changing connections among network nodes as the mobile device moves to different locations over time.

FIG. 19 depicts another approach to dealing with a changing set of connections as the mobile device moves in the store. In a nutshell, even though GS 1011 devices generally like to associate with a single AP, this does not have to be the case. For GS 1011 devices in that middle zone between AP 350 and AP 352, they have the option to cycle-switch between associating with 350 and then 352 and then back again. This might be switched every pung cycle, for example, generally once a second or once every couple of seconds. At the very low network layer, AP 350 and AP 352 may not even need to know about this switching, they just know that they hear from some given GS 1011 device every so often 'on their channel' and don't care what happens on other channels. The benefits of this channel switching is that now devices in that middle ground can participate in providing better solutions overall, with the price paid that they will be missing roughly half the transmissions from mobile devices and from other fixed infrastructure nodes associated with a given AP. But, this price in practice is relatively small IF there is a fair amount of data redundancy, i.e., where some given device now only hear a dozen pings as opposed to two dozen.

Returning to FIG. 19 then, we see that three green-circled nodes labeled 490, associated with AP 350 exclusively in previous figures, are all now doing this channel/association switching between AP 352 and AP 350. Likewise, four red-circled nodes labeled 495 are doing the same. Further depicted are the newly-discovered Tx-Rx good connections that would not otherwise be there in the earlier singular-association scenario, with these new good connections labeled 500 and 505. As those practiced in GPS location measurement well know, new 'diversity' in solutions far outweighs halving of the raw data averaging, all leading to improvements in Dilution Of Precision (DOP is a term used in GPS literature and appropriate here).

In the case of fixed-node devices which do this routine channel switching, they would of course inform LBR-space of this behavior such that from the Agent Registry 255, FIG. 7, all the way through to the solutions Agent 452, FIG. 16, they all know to expect such behavior and exploit its properties accordingly (and mitigate its costs).

Retailers and Their Customers

Those who build, stock and operate retail locations naturally should be the ones who service the customers who are attracted to those locations.

The creation of these physical environments almost always includes a wireless signaling capability, typically wifi. By enabling indoor location capabilities within that signaling infrastructure, described in previous sections, the operators of the signaling network are the de facto initial owners of the location-based query traffic generated within their store (or mall). The primordial request 'where am I' implicitly generated by a customer's phone begets the response 'here, at this location in my store' courtesy of the store owner/operator. This section continues the description of including more value to the customer beyond the baseline location information.

Retailers have been—literally—facilitating and mediating the relationship between shoppers and competing brands for ages, so the practice will naturally need to co-opt online services and smart phones. In pre-smartphone days not so long ago, a customer requiring assistance and/or guidance could have their needs met through either employees or through signs, store maps, promotions, etc. In the 2012 era however, a battleground has developed between retailers and 'outside interests' over owning the service relationship mediated through a smartphone—while the customer is in a Retailer's store. Things have gotten so ugly (from the Retailer's perspective) that customers can walk up to a product, look at its displayed price, find a cheaper offering of the identical product on some online service, then buy it from the service, right there in the store, with shipment the same day. "Thank you very much Mr. Store, you helped me buy that product and you don't see a dime, oh, and thanks for the chance to help me pick out exactly the thing I was looking for". It is unclear how such a retailing model can survive if the very idea of investment in a physical environment is not met with return on investment via on-site product purchase.

One of the inventions offers a classic solution to the Retailer's challenge described above. Win the customer's dollars by being the best to serve their needs. Assuming that providing in-store locating capabilities, along with rich and relevant location-tuned services, becomes a normal part of physical shopping over the decade of the 2010's, the ball is in the Retailer's court to optimize those services resulting in captured sales.

Inventions described in this document include systems and associated methods that enable retailers to proactively provide and mediate location services to customers in their store. In 2012 much of the buzz is about setting up location technologies inside a store—then presumably leaving it up to the customer to wade through a cacophony of information spewed at them via their smart phone, based on locations inside a store. In one embodiment of our inventive system, the system enables the Retailer to control the in-store location-query traffic through its service-providing described in previous sections. At this point, the broader power of extensible data structures, such as tri-quads, can be discussed in their more market-transaction form. The Retailer is in a position to retain and enhance its relationship with its customers via this core location-service backbone. (And . . . it does not have to be the specific system described in previous sections alone, any locating capability that the retailer or mall owner sets up becomes a platform for answering much more that the query 'where am I', inherent in such a capability).

In one embodiment, an inventive step starts with the Retailer invoking some level of 'opt in' between themselves and their customers, if even that level is the baseline of the legal right of the store owner to monitor and track RF packet transmissions inside their own store. But the smart Retailers will be much more explicit with their valued customers than this baseline level of 'inherent opt in', they will engage their customers with educational materials, interactive sessions on their smart phones, etc. Value back to the customer will entice that customer to ever higher levels of 'opt in' for the store to provide them with location-relevant services.

On the plumbing side of things, an inventive step involves the de facto standardization of how identity, permission and query-data all begin to get associated with a single customer and their 'retail sessions' or 'shopping session' for lack of a better term. A systematic approach to establishing then populating such syntheses of data is not something that can be hand-waved as some kind of 'oh yeah the database takes care of that' thing. It is complicated, it does not exist in 2012, and it needs to be explicitly created. The state of the art today is associating a customer's entry into a store such as through services like ShopKick offers, then attempting to implement 'database associations' into point-of-sale networks which are indeed quite sophisticated in themselves. This is all a far cry from actively holding the hands of shoppers as they wander through a store. The routine and reliable helping of that customer as they walk through the Retailer's store involves well-designed plumbing level steps, both as previously described and as will be further described in tri-quads and their living, evolving forms.

Yet another inventive step is the crystal clear isolation and servicing of 'The Pipe' of active customers involved in shopping in one's store. In this powerful new system framework, a Retailer can yet again facilitate and mediate a win-win-win relationship between their customers and the brand owners who are populating their shelves.

In 2012, it is a profoundly novel notion that a store can now organize and coherently present actively shopping sales leads—wallets and purses at the ready—to a competitive but highly motivated sea of brand owners bidding to win the responses immediately presented to those shoppers. This generic notion is clearly driving much of the buzz today but the buzz is equally profoundly lacking in the details of how such a notion is implemented. It does not fall out of trees by piping text words into a Google search and splaying results onto a small screen. Coherent packaging of real-time location data packet traffic, managing dedicated cloud agents, Retailer's mediating what is finally sent to the screens of shoppers in their stores . . . this has to be specified, designed, coded, tested and ultimately trialed with real folks in real stores.

Figure 20:
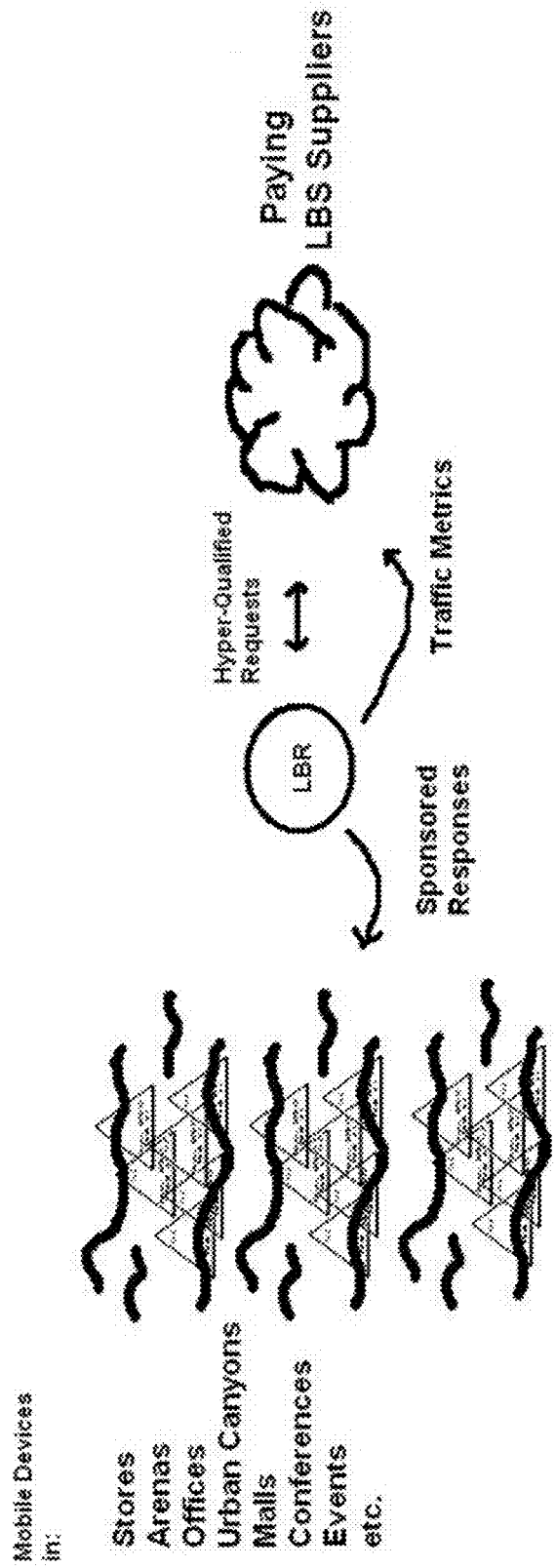
FIG. 20 depicts at a high level how the location based router (LBR) mediates between a stream of queries from mobile devices in various types of venues, on one side, and between location based service providers, on the other side.

FIG. 20 depicts at a high level how the location based router (LBR) mediates between a stream of queries from mobile devices in various types of venues, on one side, and between location based service providers, on the other side.
Retail Session Management Based on in-Store Location Technologies A point deserves repetition with different nuanced angles. The Retailer, by establishing "the indoor GPS" using pop vernacular with emphasis, has earned and must maximize the right to facilitate and mediate how their customers are served by the cloud in their store. The parts of the cloud the Retailer should most care about are the web sites and internet services supplied by their partner brands, those same brands populating their shelves with stuff to buy. In summary, retailers need to harness the cloud, not hate it; this document explains how location technology can form the foundation for this.

The Retailers that will survive and thrive after the next Darwinian churn will be the ones who do not just go out and procure 'the best interior positioning technology', they go out and transform the shopping experience with something that at least this document describes as myShopper, an integrated smart phone application program intimately familiar with the lay-out of the store, the quirks of whatever particular interior location technology is actually deployed (not necessarily the detailed one described in previous sections and previous filings of applicant), and most importantly, practicing the tri-quad-esque arts of this disclosure.

myShopper's heart and soul remains founded on trust, loyalty and retention of the customer, reflected in the plumbing by the permission fields and their storage in various agents and those agents' databases.

myShopper proceeds with establishment of a cloudside companion having two basic attributes: the 'loyalty program' continuous record of each and every customer (including new ones), and a shopping session instantiate companion fired up each time a customer returns to a given store (or store in a chain). (This particular 'companion' further breaks down into finer components as will be described).

myShopper then may, repeat, may, help the Shopper shop! What does this mean? Think Nordstrom's pioneering of the personal shopper concept: were these employees some disheveled technogeeks walking around with clients shoving crass nickel bargains in their faces, heck no. Quite the opposite, they were there to help the shopper cut through the noise and get exactly what they wanted. They embodied the win-win-win scenario where the client wins, the store wins, and the brand that was purchased wins. MyShopper's core job is to be part of the solution not a new problem . . . the observant and friendly assistant, there when you want them and sheltering you from the noise when you don't want them or the noise.

To the shopper, myShopper is just the store's very own, branded GPS on steroids: 'hey, hmmm, I can just quickly pull up and see where I am exactly in the store, relative to various stuff of interest to me'. I can choose to use the more advanced features and the 'push' notifications and the turn by turn directions and the shovel-coupons-at-me modes, etc., or it can just be there when I need it, maybe even telling the store to leave me alone until I ask for help (a tri-quad permission state), whatever! I'm in a store, I'm here to buy stuff, help me in the way I want to be helped.

But back to the plumbing angle, myShopper is the exposed tip of the location-based-router(LBR)/tri-quad iceberg. The very function of the interface between a customer and their smart phone shopping assistant is derived from the behind-the-scenes operation of the system. There is the store you are in, on your phone, a representation of exactly where you are in it, and as you proceed to walk around, your Retailer is eager to serve. The initial setting up of a network that can determine where a customer is, culminates in filtered and relevant offers showing up when requested. Enabling location (a store 'being' the indoor GPS) begets a more technically grounded form of location based services. For the Retailer, the cloud is no longer the enemy, it is the new lower cost-basis sales assistant replete with good metrics on point-of-sale success correlated to promotional service actions. Did the market side offer won by brand X in response to a query from a mobile device in the store generate a sale? These capabilities and many others are ultimately what LBR is enabling, a far cry from being just an indoor positioning technology.

Again, the technical crux of the matter is that the Retailer has invested in their own signaling infrastructure, they are allowing access to this signaling infrastructure to their customers, and they have made the decision to 'location enable' that signaling infrastructure. What this further means is that the retailer has either their own IT department individuals or contracted IT talent setting these systems up and doing the QA on the basic availability of an internet connection for their customers. The established art in such networks is that new customer devices entering a store go through a routine set of steps establishing a communication session with that infrastructure, often including matters of security/encryption. It is at these simple network layers where the retailer 'owns the data packet traffic'. The critical juncture here is then the difference between providing for a simple channel to the generic internet (the cloud), versus the offering up of explicit locating services. The former service has much to do with why Retailers are afraid of the cloud: a customer walks up to a printer and finds a better price online than the one listed on the shelf, pokes the buy button for the online one and leaves the store. The latter location service offered up retains ownership of the session traffic and so long as the Retailer follows the ancient laws of helping their customers rather than exploiting them, we arrive back at some important aspects of this disclosure: own the session, serve the session, make the sale in the store.

The following sections describe tri-quads in an implementation manner, ultimately illustrating how Retailers can 'shop out and/or auction' query requests and responses as customers walk up and down their aisles—always as regulated by the individual customer as they define their interests and service preferences. The theory here is simple: get the customer exactly what they want, when they want it, as they walk around your store, often co-opting those very 'outside interests' that theretofore were the threat. Let those outside interests—especially the brand owners of the stocked products—help the Retailers move the products.

All of this rests on owning the baseline location-query communication pipe to the user's mobile device. All of this rests on the idea that the question 'where am I' is almost always—especially in a store—connected to a richer form of search and response behavior; Behavior very often ending with cash or a credit card leaving somebody's purse/wallet. The tri-quad concept and its programming implementation, critically including the regulating opt-in factors as controlled by customers, can enable the oldest retailing religious precept there is: move inventory.

Enter the Tri-Quad: Turning 'where am I' into a Tunable Stream of Location-Based Qualified Queries and Filtered Responses FIGS. 2 and 3 and their associated text have already introduced the conceptual form and the programming form, respectively, of a tri-quad. The concept is to keep things simple: package up location services as a user-regulated search—formed as xml-like, extensible data fields and packets. The most important point is that these syntheses of realtime location data with other critical metadata, including identity and permissions, do not happen through marketing hand-waving. They require specific steps, specific forms of programmed packaging, explicit points 'in the cloud' where real-time session data is stored and managed, so on and so forth.

Referring then to FIG. 2, the middle triangle contains the baseline query which is akin to a GPS receiver continuously asking itself 'where am I'. With actual GPS, the timing and message structures of signals from satellites help it to answer its own question. Likewise, a customer with a smartphone who may 'opt-in' to a store's mobile shopper application may instruct their phone to do the same thing: accept location enablement from the store and thereby kick off a continuous process where the phone is effectively asking itself 'where am I in this store'. The behind the scenes process of previous sections then go about continuously answering that question.

But it is this very behind-the-scenes answering of the location query which is the raw traffic for richer location-oriented queries. The first recommended technical step in this direction is to obtain explicit and/or pre-set opt-in from a customer to extend the services provided to them. Smart phone users are already accustomed to an opt-in choice with respect to GPS-enabled location services, the same social convention can be applied to indoor shopping.

One of many examples of how to do this would be when a customer invokes a given store's smartphone application (e.g. Home Depot, or Walmart, or Old Navy, etc.), there is an initially unchecked box labeled 'Enable Query Streaming' there for the customer to check. In the very earliest implementations where such a concept has not yet been socialized, the curious 'early adopters' will undoubtedly first click on the link just below the check box labeled something like 'What is Query Streaming'.

The answer they will find after following the link will be a high level, consumer-oriented description about how they are not only requesting in-store navigation maps and location capabilities, but they are allowing much more than this. As a baseline, they will be allowing access to a reasonably up-to-date map of the store replete with helpful product section overlays, on which their own current location can be displayed. But more importantly they will be enabling their location and proximity to items-of-interest to be part of an ongoing stream of latent queries packaged up in tri-quad form. Relative to FIGS. 2 and 3, by accepting whatever high level description is provided to them concerning 'Query Streaming', they will begin the process of filling out certain information in the 'who am I' quadrant and the 'permissions' quadrant, all ultimately being data field items inside data packets. These events happen after they navigate back to the 'home app' with the check box accepting these services, upon the customer check the box.

Previous sections have already described in detail how the sheer act of setting up locating capabilities establishes the 'session backbone' which then enables the communication and storage (in some registry) of the services thus requested. After checking the 'enable query streaming' box, the extra data fields containing this new information can readily be acknowledged and acted upon by the very same packet-passing mechanisms described variously from FIGS. 2 and 3 up through and including FIG. 7 (and obviously, their accompanying text).

But it is at this point we must go all the way back to the general situation depicted in FIG. 1. In analogy to a clock, this application has begun by describing the simplest of behaviors of clients/handsets in the hours 9 to 12 quadrant, concentrating most on how the communication infrastructure nodes of hours quadrant 12 through 3 operate, with a modicum of description of how some of the registry and positioning agents of hours quadrant 3 through 6 behave and instantiate a session-based network servicing those clients of quadrant 9 through 12. These sections here and following are intrinsically saying to co-opt those previously described processes, importantly including the registry operations and storage, and use those same processes for implementing these more advanced location-query capabilities.

So, back to our example of the user checking the 'enable query streaming', a message is thus sent from a user's handset, through the store's own cloud-based service which has already begun servicing their customer, getting to the registry where an association is made between a theretofore fully anonymous handset and whatever data fields the store and their customer have seen fit to provide the registry. A recommended default condition is to remain largely anonymous and, unless explicitly instructed by customers in ways not yet described here but shortly will be, leave the identification fields associated with the handset to very generic data descriptions such as 'handset desires baseline query services' and implicitly has not yet enabled higher level data associations between their handset ID and for example, their male/female identification, age, name, shopping preferences, etc. All of that is contained in more and more explicit opt-in levels as dictated by the customer.

The following sections begin the process of describing, with technical implementation details, how some of these market-enabling cloud-side agents function. The rudimentary operation of the packet exchanges and regulation of packet traffic by more plumbing-level agents remains a key ingredient to how these higher level agents work—they rely on the dutiful message passing and information-storing operations of these previously described agents.

Your Cloud-Shadow Agents—The Assistants in the Cloud

One of the most simple query-stream enablements that can be allowed by a customer is the setting up of one's own personalized shopping assistants 'in the cloud'. The description of myShopper previously indicated how this can actually be two separate but intimately related 'threads' or agent-processes established in state-of-the-art cloud-base CPU's and memory, one thread intimately (securely) interacting with the mobile client app, and the second thread provided by a Retailer which mainly interacts with the first thread.

We now provide implementation detail of one layer deeper on how these two agents fire up after a mobile customer has requested such. From here forth, the agent closely associated with the client device will be referred to simply as the client-agent, and the one representing the retailer's interests will be called the concierge-agent. Without meaning to be too weird, they are the cloud-side equivalents of the shopper and the store's assistant assigned to that single shopper. The customer unequivocally 'trusts' their own client-agent so long as standard encryption protocols have been observed and password protected, and their 'trust' in the concierge-agent is a direct function of their loyalty relationship with the Retailer, itself being a function of past experience and the perceived quality of recent and current service from the Retailer.

We now describe a mechanism for firing up both agents in the cloud. As with smartphone applications such as ShopKick wherein the initial entrance of a shopper into a store triggers generic database activity and 'session constructs' behind the scenes, a generic triggering also happens in this embodiment only here we are explaining how the Retailer prepares to help the shopper shop as they explicitly walk around the store. It is also here where initial associations are made between a shopper's identity and the vast, pre-existing retail management databases, with a significant value add being point-of-sale logging, connecting customers with what they actually buy. This crown jewel remains the same for this embodiment, where herein the idea is to connect a whole bunch more dots (literally, paths through stores and scripts of shopping behaviors) to the primary big dot called sales fulfillment.

The technical underpinnings described in this section get back to the instantiation of the client-agent and the concierge-agent using the LBR packet passing procedures previously described. These agents typically have their own associated databases nearly identical to the RF-active agent processes. See, for example, the management of agents and agent registry depicted in FIGS. 5-6 and accompanying text above.

Figure 21:
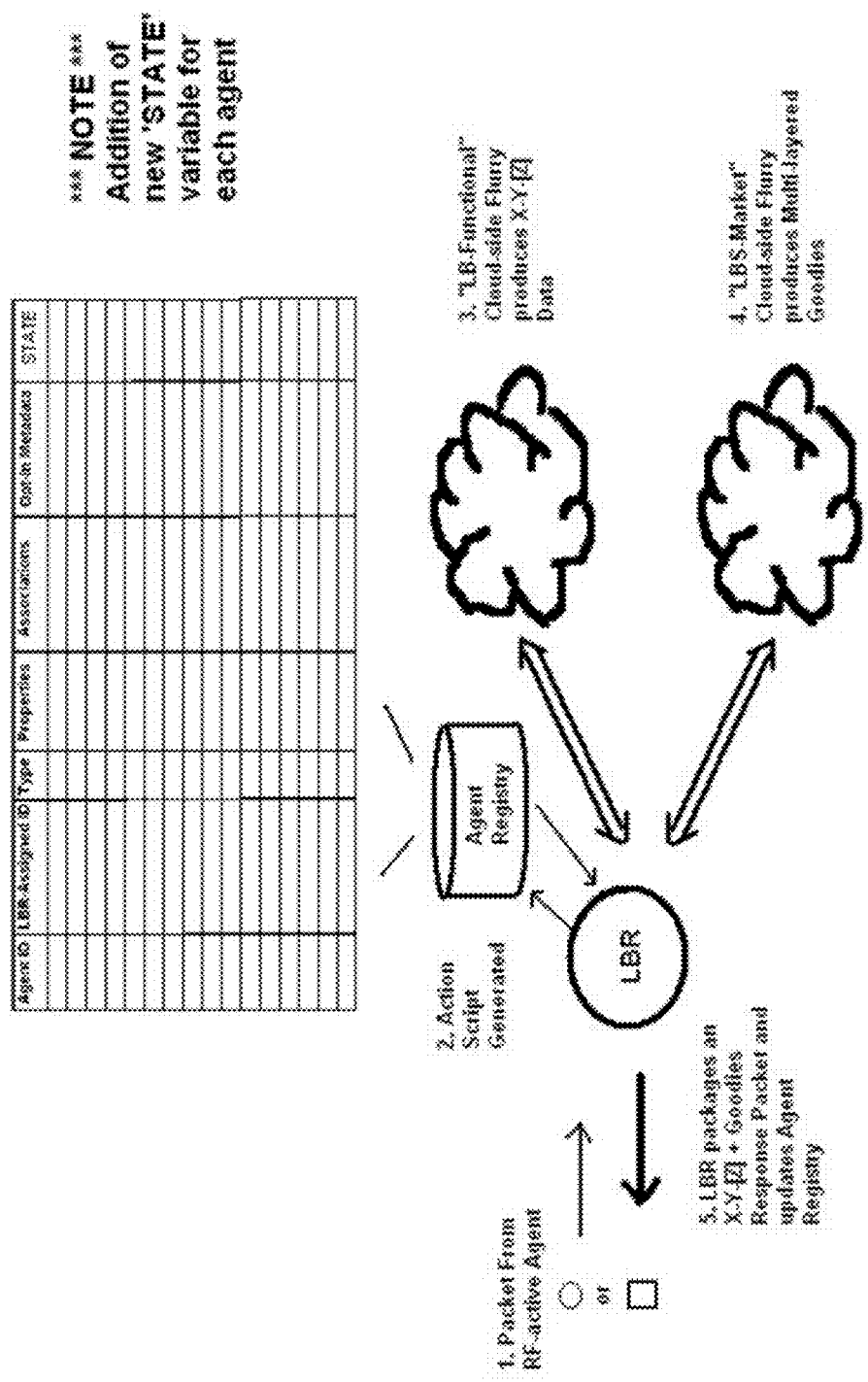
FIG. 21 further illustrates the LBR's role in managing agents and interacting with positioning services to get X-Y-Z data and market services from which it gets offers and packages them with the position data.
Figure 22:
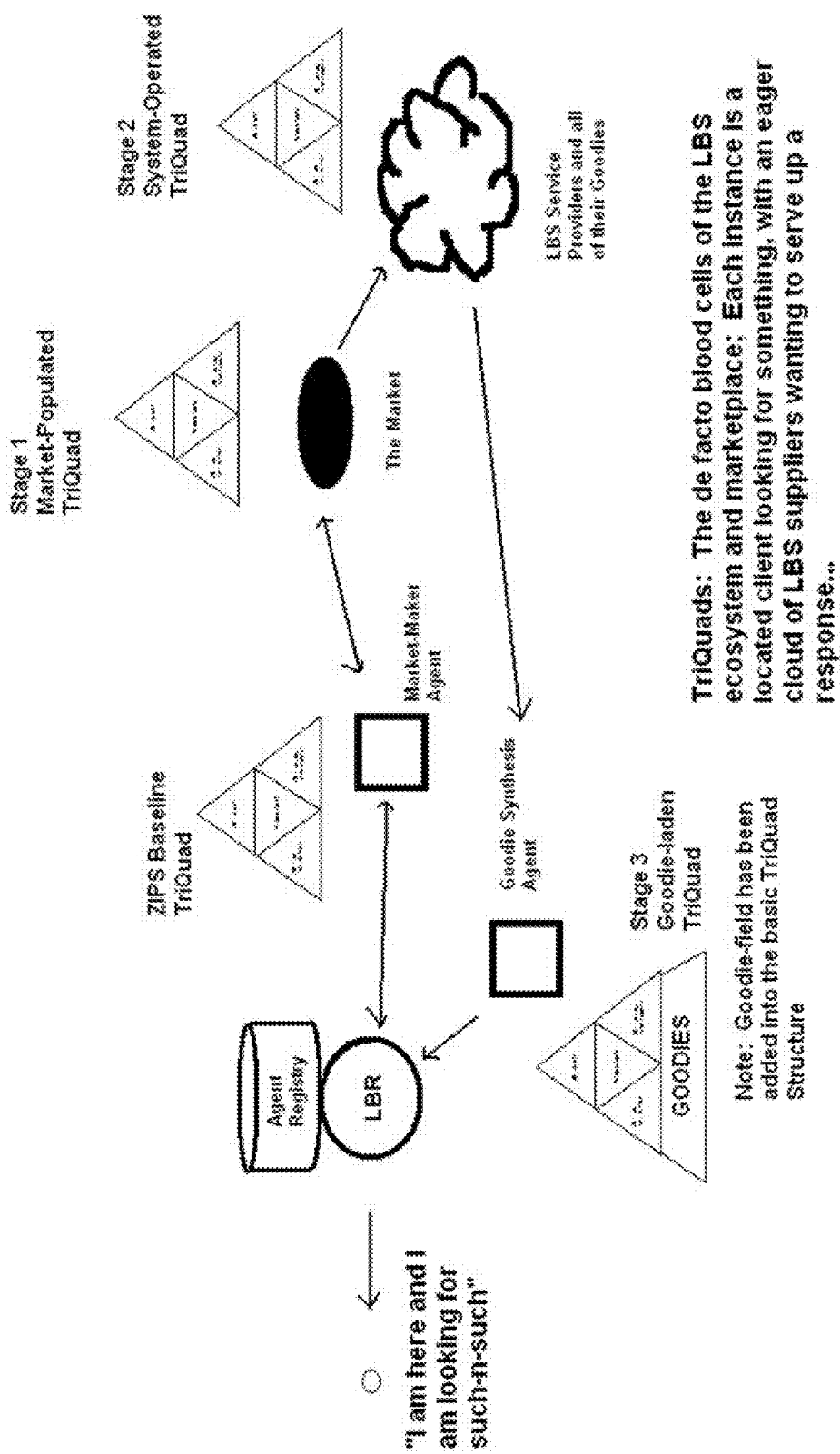
FIG. 22 depicts stages of instantiating an extensible data structure (e.g., TriQuad) corresponding to a mobile device query, and progressively populating it by various agents.
Figure 23:
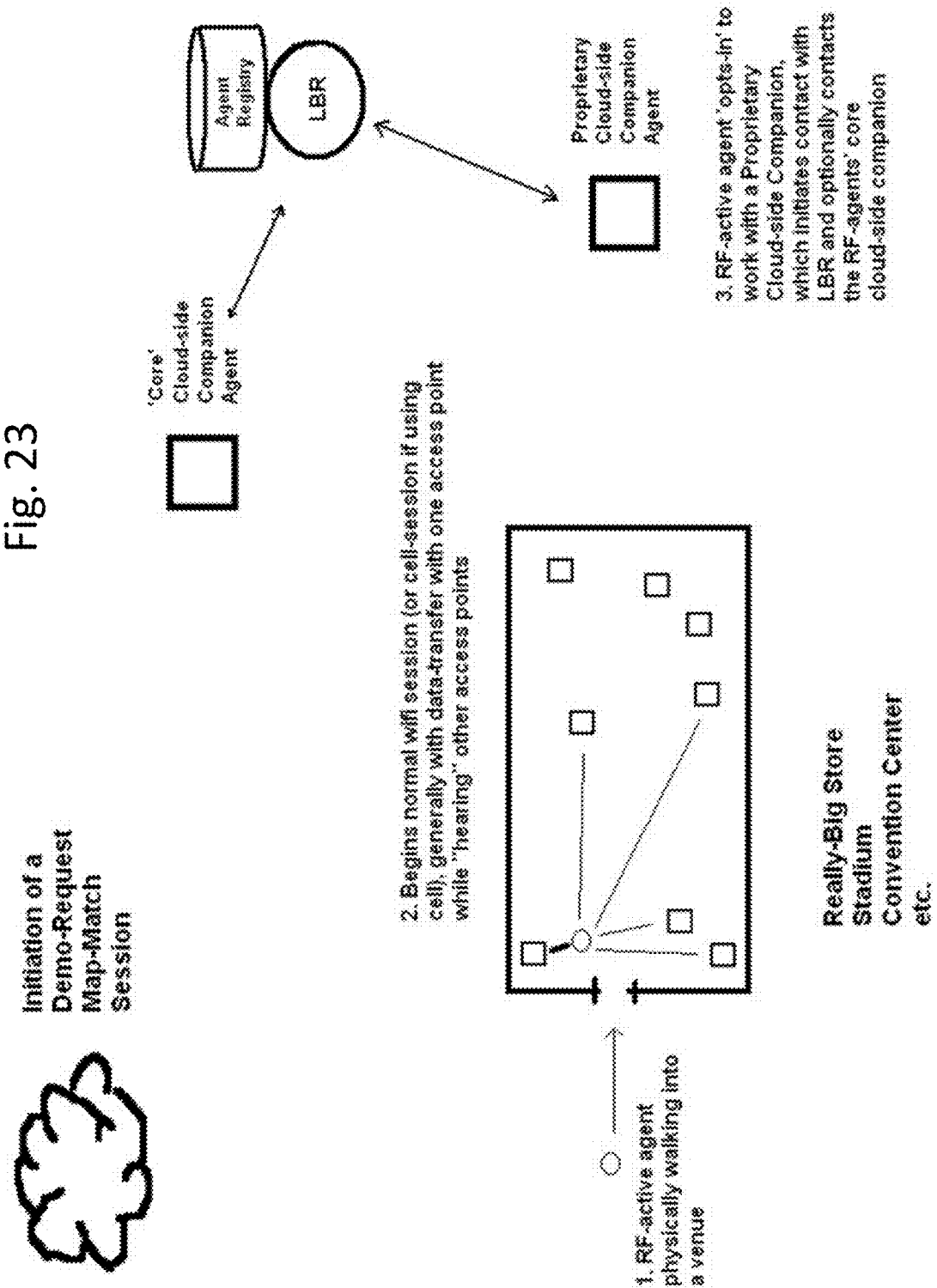
FIG. 23 illustrates steps illustrating the initiation of a process of instantiating a session with a mobile device in a venue and establishing corresponding companion agents for the mobile device.
Figure 24:
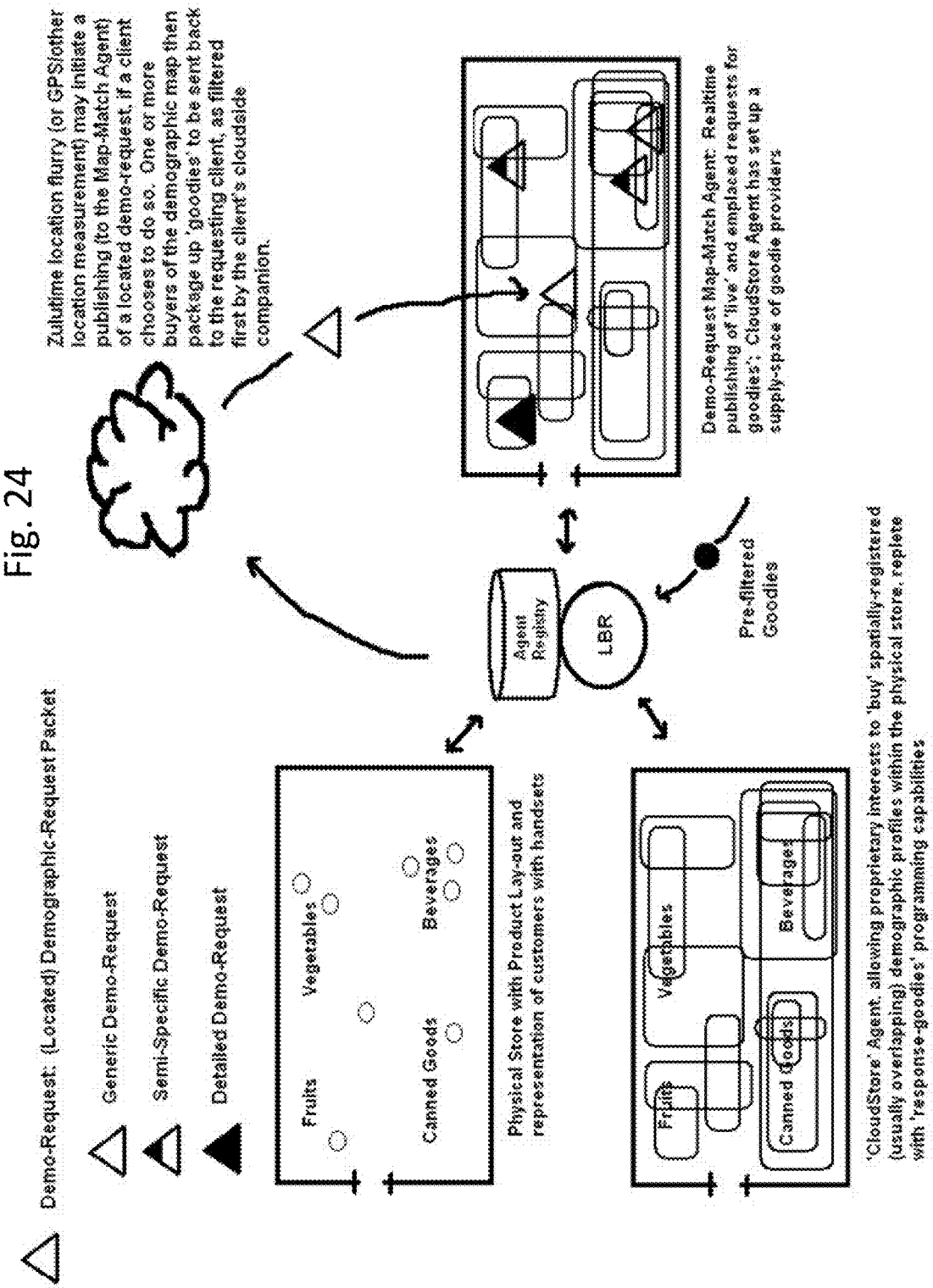

To provide context for the detailed description of the operation of LBR embodiments, we provide some additional drawings depicting aspects of LBR implementation. FIG. 21 further illustrates the LBR's role in managing agents and interacting with positioning services to get X-Y-Z data and market services from which it gets offers and packages them with the position data. FIG. 22 depicts stages of instantiating an extensible data structure (e.g., TriQuad) corresponding to a mobile device query, and progressively populating it by various agents. FIG. 23 illustrates steps illustrating the initiation of a process of instantiating a session with a mobile device in a venue and establishing corresponding companion agents for the mobile device. FIG. 24 depicts an example of organizing location based queries in a venue into transaction opportunities that market side participants may bid for. It further shows the role of LBR and associated agents in constructing a detailed request by adding additional context to a device's query, and then filtering a response (e.g., detailed request progressively constructed for market side bidding progresses from generic request, to semi specific, and finally to detailed request based on activity of agents that determine opt in permissions, location, preferences, history, loyalty program information, etc.). FIG. 25 depicts a graphical construct in which a market side provider can purchase (or set the conditions for purchase or bidding for) responses to these types of detailed requests within venues in terms of various conditions discerned during a shopping session (such as opt in, correlation of current interest, location, pricing, user intent, history, loyalty program, etc.). FIG. 26 is a diagram further depicting roles of a cloud side companion agent corresponding to a mobile device session in terms of the construction of a fully loaded request to a market for services. FIG. 27 provides another depiction of an extensible data structure which is used to construct a detailed request, submit it for bidding on a market based exchange, and then attach one or more winning responses. All of these various elements and functions are described through detailed examples below.

The Retailer may or may not physically instantiate and facilitate the customer's client-agent, this is up to the client to decide. They may have chosen to use some highly personalized shopping service where they manage their own generic preferences, shopping habits, likes and dislikes, so that when they shop at whatever store they choose, their trusted client-agent goes with them and they expect the store to accept it. Alternatively, especially in 'early adopter days', these types of personalized shopping agent services will not have been established as independent businesses, and so the Retailer offers up 'secure' personalized client-agent services, similar at the philosophical level to the retaining of credit card numbers and other personal details 'on their databases'. In lay terms: 'We can store and facilitate your client-agent and only you can access the sensitive data'.

The setting up of these two cloud agents becomes a key event for setting up the whole scene for the stream of tri-quads about to happen. The first initial cloud-side sharing of shopper identity and intent with the store happens here. Another lay terminology way to phrase one central piece of this is: 'would you like us to walk around the store with you?' Inherent to this question is in-store location technology of any flavor, not necessarily just the RF ping/pung approaches extensively described previously by applicant. Any location technology with any level of spatial accuracy granularity sufficient to tune proffered services as a function of location will do. Consumer satisfaction with such technologies (and their cost structures for the Retailers), will separate winners from losers. The main point here gets back to the lay question: 'would you like our help walking around the store?' A 'yes' means the Retailer has permission to 'own the session' and their subsequent quality of service will witness an outcome somewhere between the two poles of a closed sale and a frustrated customer who will never return . . . game on.

The process of subsequent 'walking around the store' gets back to the core of the LBR architectural mechanisms. The two agents have formed specific cross-references to each other via LBR packet exchanges. Jane's client-agent has contacted Nordstrom's concierge-agent and both agents have flipped their 'active and running' flags. Jane's agent informed the concierge agent that, why yes, she would like to be walked around the store. And, today she really does not want to be intruded upon too much so just provide data to indicate location of the mobile device on a store map, highlight where a desired product is on the map. In general, she's only seeking pretty low levels of service. She is tuning the permission fields that will be stored in both agents' databases and will become subsequent data fields in the stream of tri-quads she generates as she paces through the store. Perhaps a bit oddly put, her tri-quad stream becomes the source of the digital and located positions from which her device issued a query that she leaves as she walks around, with her own tuning of who acts upon those queries and how much 'service activity' she wants applied to them.

As Jane interacts with, typically, the Retailer's branded smartphone application and selects the 'yes' button on the box labeled 'use our store's GPS', the act of selecting sends an LBR-formatted packet to the LBR database that the store or one of its IT supplies has set up. This packet instructs the router to pass on the packet to both the client-agent and the concierge agent. Each of these agents cross-references the other agent. These agent's then become 'aware' that the lower plumbing level determination of X-Y-[Z] locations are about to commence if they haven't already. Most of the time, these agents will want to send their own packets to theses lower level position-determining agents, letting them know that they wish to become constant consumers of the spatial solutions that those lower level processes will start to continually stream forth. The preferred embodiment of this invention is that the initial tri-quad instantiations (the literal forming of a tri-quad data structure) be performed by the X-Y-Z collective agents, and minimally populated with realtime, specific data by those agents. The permission fields would typically be very primitive, such as, 'I have permission to send these spatial solution packets to the client's personal agent' and often the related permission "I have permission to send these spatial solution packets to the Retailers anonymous smartphone tracking agent'. It is then up to the client-agent and/or the concierge-agent to begin to 'upgrade or modify' these primitive permission fields with more detailed permissions relative to what the shopper has input into their smartphone app. This is a simple example of how tri-quads grow and evolve, with various agents in charge of (and permitted to) edit, modify, extend, etc., tri-quad data fields.

Piping Tri-Quads into 'Classic' Search Engines and Query-Response Networks

This section describes the critical fork in the road where the Retailer begins to harness rather than fight 'the Cloud'. From the retailer's perspective, the cloud has both positive and negative aspects: the positive aspect enables the retailer to enhance sales and its relationship with brands of products and services offered in its store, the negative aspect is the collective competing service providers (on line retailers, and on-line shopping assistants) seeking to divert sales away from the retailer.

But interact with the cloud the Retailer must. Few Retailers if any at all will want to build a monolithic product data server tuned to just their stores and constantly being maintained to keep up with ever changing inventories, trends, prices, placements, promotions, etc. No way. Having some core server with 'some' of these elements, yes, most notably with current promotional activity, but overall, the Retailer needs the content in the cloud, sub-most-notably and preferably sourced from their Brand partners, those parties most interested in helping them ring cash registers.

We have already introduced the higher level concept that the Retailer wishes to package up and present to the market some reasonably data-populated tri-quads. They also will obviously publish a concurrent inventory of potential 'leads' that are actively shopping in their stores, alerting competing brands of imminent opportunities to help peddle their wares. We now describe an example of an agent responsible for what is really a two-sided-coin task: task one is simply a Retailer-eyes-only raw inventory of smartphones roaming about their store, replete with full knowledge of their permission states, various levels of identification, i.e. all the data items that have already been described; and task two is the filtering and presentation at a very low level of specificity that 'leads' may be imminent for fuller presentment to the market. The reader can immediately appreciate that the sheer 'public' or even 'private but large' presentment of an inventory of active shoppers presents an enormous double edged sword to the Retailer, where on the one hand the Retailer's intent is to fetch the best content possible in order to help their customer, but on the other hand do not want to give away too much information to their own competitors (including the competing service providers from the negative cloud aspect) about the realtime numbers and habits of their all-important customers. This not-so-subtle point highlights yet another innovative requirement for any interior positioning system which streams third-party content to in-store shoppers: a strict and well-managed balance, in the forms of filters and data fields, is essential between too much information (and having one's competitors exploit your own system) and not enough information resulting in garbage coming back to one's in-store customers. The LBR architecture and the highly tunable tri-quad data structures are precisely the kinds of flexibility needed to implement such a balancing act.

Back to the details of 'presentment' of tri-quads to 'the market', the description thus far in the last few sections has outlined activities by and large occurring with the so-called firewall of the Retailer. A low detail level and highly filtered inventory of possible leads being 'published' has been touched upon. The drum roll begins as shoppers shop. The seeds of what the Retailer ultimately presents to the third-party cloud is contained in the client-agent/concierge-agent pair. The negotiations that happened in the past, where the shopper either/both has a long term profile on their preferences and general interests that helped populate data fields in each of these clients, and/or, the shopper pro-actively modified at the instantiation of their current shopping session, usually if not always through the store's branded in-store smartphone app. The client-concierge agent pair then operate on this information, producing what ultimately will become the prescription for exactly what data is going to be contained in the presented tri-quads to the full cloud market. The extremes are the obvious ones: no presented tri-quads for this shopper ever, to 'throw every coupon in the book at me, my name is Jane, I make this much a year, and I'm here to buy'. Again, exaggerated extremes to make a general point. The specific point is that it is ultimately these two agent's cooperative job to first set then continue to tune the specific tri-quad data that eventually gets presented to certainly 'classic' search engines, but more importantly to query-response networks that are starting to, and will certainly evolve strongly toward, hone in on the in-store shopper and the servicing of their needs.

Thus, the 'piping to' of this section's title is essentially this queuing up and presentment of what eventually becomes streams of tri-quads from some carefully filtered list of active shoppers. One can easily envision—and this disclosure explicitly here outlines—a graphic agent assigned to making this inventory and presentment quite intuitive and natural. The Retailer has one inside-the-firewall view of its own active customer, with then a highly filtered and tri-quad-data-tuned version for the marketplace's consumption. The graphic agent can quite easily implement clickable metadata viewing of the active shoppers, again with inside-outside the firewall filtering. This graphic agent might present such realtime data for a variety of audiences: Retail Managers, IT proessionals, Service Assistants on the inside of the firewall; Brand owners, customer analytic engines, consumer service businesses on the outside of the firewall. This listing is short and exemplary and by no means exhaustive.

This section outlined how tri-quads can be packaged up and 'piped into' third party cloud processes, further sections will explain what can happen at those cloud-side destinations and how 'results' can eventually come back through the Retailer and ultimately to the shopper.

Shopping Session State and the Raw Tri-Quad Stream

This section explains further some of the various filtering mechanisms that can be applied to a shopping session once a given shopper has decided to opt in to a Retailer's location services, into their 'indoor GPS'. The grounding of this discussion begins with a continued description of how the instantiated client-agent and concierge-agent, kicked off once a shopper has opted in, represent a classic state machine where in the case of providing mobile services, that state machine now will be moving around the floor of a virtual store as the shopper themselves move around the physical store. These two agents become the virtual shoppers, and as mentioned, one of their main shared tasks will be managing the relationship between the intent of the shopper and the bewildering cacophony of latent ads, promotions, glitter and gold-dust poised to be thrust at that shopper. Almost all shoppers do not want the cacophony, they just want to buy what they are looking for.

After the shopper has entered a store and opted in to 'the store's GPS' (or alternatively opted in to the proffered 'would you like us to walk around the store with you and assist'; again, this disclosure highlights that the lay public really doesn't distinguish technical subtleties such as 'hey people, this really isn't GPS'; tell that to Kleenex users reaching for a Sysco tissue!), the LBR mediated message packet sent to the Client-agent and the Concierge-agent have of course created a new database entry representing the initial 'state' of this shopper's opt in or initiation event. Clear cloud-side flurry activities that should be associated with this shopping session instantiation should be the most obvious first step: correlate this particular shopper with any information available on the Retailer's databases. Is this person a loyalty shopper with an existing ID? In most cases they will be. Other less obvious cloud-side flurry events should involve the refinement of the permission fields that will eventually be placed into both internal-firewall tri-quads as well as marketplace presented tri-quads. These 'flurries' are merely LBR-formatted packet exchanges between LBR agents and the existing databases maintained by the Retailer.

It is at this shopping session initiation point where other classic security protocols, privacy management and realtime interaction protocols are also established. This last phrase means that some form of communication interaction between the customer's smartphone and the Retailer's service can generically be specified at session initiation. An example would be that a shopper may pro-actively request aisle by aisle directions right away, where upon both the store and the shopper's smartphone are effectively agreeing to have second-by-second packet interchanges facilitating this realtime tracking, especially if the specific underlying locating methods call out for such constant communications (others, such as RF (wi fi Access Point signal) fingerprinting/Received Signal Strength methods, may not, though the price paid is usually spatial resolution of knowing where on is at).

As mentioned earlier, a shopper's personalized client-agent, privy to that shopper's more private intentions, likes, preferences and whatnot, needs to 'negotiate' with the Retailer's concierge agent on what exactly is going to be allowed to happen in the upcoming shopping session. The customer might easily say 'same as the last 20 times' either explicitly or implicitly (be having default settings they created the very first time they opted in to the store's GPS). This negotiation can be as simple as a translation of human choices selected by the customer through their smartphone interface, to being as complicated as a generic permission from the customer for the store to 'analyze my last 20 shopping sessions and by all means serve up to me offers which you think I will be most interested in". Again, this is phrased as an English 'command' where those practiced in the arts of database management can readily see that this involves a series of cross-correlations often reaching out to several databases, all with the intent of fulfilling what the customer is expecting. The results of these cross-correlations begin to be stored in the ever-growing query-field database entries within both the client-agents and the concierge-agents for this particular shopping session. So not only are permission fields of tri-quads starting to populate data entries in these two agents, but query-field data as well.

At this point in the description we are still at the agent-instantiation point and we see that these flurries can be quite involved. All of this happens in the blink of an eye of course. The other 'process' that of course now begins to fire up is the core process of locating the customer! Whether it is the RF-packet based location methods outlined in immediately prior sections or not, the opting in of a customer into using the store's GPS obviously kicks off this creation process of the X-Y-[Z] raw values themselves (this can, in particular, be a result of opting in to a store's wi fi service, which also provides opt in to using the mobile device location, as determined by the wi-fi packets or other means accessible via the mobile device's location Application Programming Interface). This disclosure then states emphatically: These raw location datum can immediately be much more—they can be minimally populated tri-quad structures instead, being populated by certainly the core X-Y-[Z] values but also with ever-changeable metadata fields as mediated by the client- and concierge-agents. To be very specific, instead of a location service just cranking out position data, that service produces tri-quads instead, with typical rates being one per second. Going back to the graphic-agents discussed above, one might imagine that the realtime floor-displayed dots on the store's floor plans depicted on the display screen of the mobile device now 'blink' once per second almost like a heartbeat. The blink would intuitively represent a newly minted tri-quad associated with a particular shopper, almost always having new X-Y-[Z] updates as they move around, and often having changes to the surrounding metadata fields as they proceed with their shopping, e.g., they just pushed a button that they want to comparison shop the four brands of dog food sitting right in front of them whereby tri-quad n−1 had no such indication in the query field, but tri-quad n now does have such an indication. The tri-quads are now a raw stream of query events inherently being produced by all shoppers who have opted into the store's GPS.

That transition from 'initiation' to 'now shopping' is reflected by the heartbeat of the raw spatial solutions firing up, producing tri-quad structures in the process, then populated by the client and concierge agents as defined by the initiation negotiation. A properly designed myShopper user interface will obviously include both high level menu choices as well as buried 'preferences' choices whereby the shopper can alter the client-concierge interactions at any time during their shopping session. A simple example here is that the shopper may have chosen to be amenable to seeing advertisements and offers as they start to shop, then after a few dozen poorly targeted advertisements and promotions show up, they realize most of it is garbage and they do a quick tuning of their settings. These coarser time scale events (as compared to the once per second X-Y-[Z] heartbeat) are the maintenance and constant updating of 'state' in the agents. A reflection of this cloud-side state can of course be communicated to the customer's smartphone itself, such that the User Interface (UI) of the smartphone can always be aware of the state of the cloud agents, often for the purpose of display to, audio presentation to, or change by the customer. So the overall 'shopping state' can be represented in numerous locations, often with pro-active communications going on between those locations so that the singular overall state for that shopper is kept synchronized and mutually up to date. So long as not too many agents are in the cloud all trying to service this one particular shopper, the bandwidth of these communications should be manageable. In cases where hundreds and thousands of shoppers are expected to start inundating some store, all expecting myShopper services, then backbone data traffic issues become a 'good problem' to have, where one of the core LBR innovations is then the replicability and arbitrary scalability of agents, including multiple cloudside instances of one particular type of agent. The store's specific data bandwidth backbone then needs to concentrate only on the AP to client smartphone traffic, largely driven by each smartphone's interactivity with their client-agents. For example, one shopper may be constantly interacting with their UI and always explicitly changing their interests and intentions, while others may do very little of that. The former will represent a higher draw on the store's baseline wifi packet traffic, while the later will represent very little. The cloud-side cross-agent flurries can all happen cloud-side, as it were, not impacting the Retailer's in-store IT systems.

Competition: Market-Making Agents, Information Brokers and Virtual Real Estate

The descriptions of the creation of raw streams of tri-quads, along with the descriptions of how such streams can be viewed both inside a firewall or their filtered versions presented to a third-party world outside of a firewall, all set the stage for the simple question 'so what?'. This section answers one aspect of that question.

Well before the time when Google dominated the search universe, becoming the Kleenex of search as it were, back when there was a simpler need for many technology developers to at least agree on some core functional elements of data exchange between arbitrary parties, a variety of well-known ad hoc and eventually de jure standards were developed all for the purpose of growing a global capability and industry now represented by that heavily overloaded term 'the Internet'. That's a mouthful, but the Kindergarten issue that this section wishes to explore and describe is that for this barely visible new industry (in 2012, anyhow), let's call it 'smartphone assisted shopping' for lack of a more elegant phrase, ad hoc 'standards' are the natural starting point for first building functionality, later to be followed by sink-or-swim usage and then IF 'swim' becomes the case, i.e. it is succeeding in the marketplace, de jure standards follow in the wake.

The raw tri-quads behind the Retailer firewalls and the filtered tri-quads presented by the Retailers to 'the cloud' are a simple and humble step in that standardization direction. It has to start somewhere. No doubt as more entities begin to eye then enter the indoor positioning and services market, they will develop the core notions of tri-quads using familiar earlier non-location-specific programming constructs, this is absolutely inevitable. As such, X-Y-[Z]information, and specifically the time-evolution of X-Y-[Z] as a shopper moves around a store, become a new exotic data field in both the packets and the databases of the tried-and-true baseline Internet and now 'Mobile' technical infrastructures.

This disclosure argues through design principles, however, with only 2030 hindsight as the ultimate arbitrator and judge, that the heartbeat-like production of X-Y-[Z] solutions emplaced in what is quite literally the mimicked virtual real estate of a store, becomes a new animal in the internet/mobile infrastructure zoo. Yes, XML packaging constructs should be used, realtime service requests from smartphone users with interrupt driven cloud-side service engines responding to those requests should be used, this list of existing technology is as big and complicated as today's mobile/internet merged industries. But the core point remains that this new animal has new dietary needs as well, should be recognized as a new animal, and maybe someday it will garner its own whole zoo section just like the primates and the reptiles do, once the wild families and genera of indoor GPS services are further fleshed out and implemented.

Enter the picture now what this disclosure will refer to as market-making agents, information brokers and the generic notion of virtual real estate, with the mélange of these things trying to evolve the quaint settlement of geo-fencing one-story homes to the Manhattan of unfathomable interconnected commerce. How can the LBR architecture, the tri-quad corpuscles and the already crowded cage of agents start to spark this rather ambitious transformation?

For starters, the primordial elements of commerce still contain the critical notions of scalability as well as arbitrary third party interaction. Trust levels, marketable entities, matching buyers with sellers, how long could this sentence go on? Some of the deeper motivations behind the somewhat labored introduction of LBR, tri-quads and agents might be better appreciated as we ponder what a fuller indoor shopping Manhattan should look like. 'Ownership' has to force its way to the core topic of this section that keys in of these deeply cultural notions. Who owns the virtual real estate, who is allowed to build markets in and/or around that real estate, how complicated will that market become? This disclosure's answer so far, expressed in LBR/Tri-quad/Agent terms is: as far as the mobile industry has come in just a short decade, open that whole world up to fully serviced physical commerce and get ready for, and most importantly facilitate, some crazier-still chapters ahead. Let's start by looking at what some simple agents might entail.

Market-Making and the Market-Making-Agent

This section introduces the Market-Making-Agent along with clear extensions of the core approach. This agent and related ones aim to cut to the bone of the challenge facing Retailers encapsulated in the 'harness' versus 'hate' commentary relative to a Retailer co-opting those vast Internet resources rather than being killed by them. Retailers such as Target, J.C. Penney and Saks Fifth Avenue are jumping on the free wifi bandwagon in late 2012. They are following other Retailers such as Macy's and Sam's Club, who themselves were later to the free wifi game than Nordstrom. What is the presumed (and verifiable if executives at these stores are to be believed) force behind allowing their customers access to the big devil in the cloud?: increased sales, what else. Apparently current studies are showing that customers who are provided high quality internet connections for their personal devices have meaningfully higher likelihoods of making a purchase. This despite the 'showrooming' problem as it has been termed, the earlier discussed phenomena where shoppers find better prices for an item on-line and simply purchase it from an online supplier instead of from the store.

So the investments are being made into the Retailer's own signaling environment. The proffering up of internet access to customers is happening. And as with Macy's very recently, the technically inaccurate "offering interior GPS" is also starting to happen, much as ~5 year ago early filings predicted and described. The next step needs to be taken whereby a Retailer walks that fine line between servicing their in-store customers and trying to 'hoard' or 'walled garden' service their needs (all quite understandable, hugely expensive and very often resulting in poor service), versus packaging their customers' needs up into filtered marketplace triquads and letting the Internet marketplace have at them, may the highest bidder win the Goodies response to their customers.

These are fine high level marketing concepts, but they are steeped in challenging technical and business problems to implement.

Enter the market-making-agent as either a Retailer-controlled packet processing agent, or, more preferred, a trusted third party company specializing in matching sellers of 'live' prospects to brand owner buyers of those prospects. Possibly the most important business role this agent plays is the active filtering and obfuscation of competitively-sensitive data necessarily disclosed by the Retailer (how many shoppers, exactly, are in aisle 7 right now, talk about the family jewels), vis a vis the many brand owners (as well as competitors of a given Retailer) who necessarily need to know something about the quantity of sales prospects and the success rates of fulfilled sales based on what they have paid for (or plan to pay for) goodies-wise.

This description above is deliberately at a business level not a technical one. The technical point is, there needs to be some kind of trusted service buffering the presentment of tri-quads, along with their valuable gross and fine statistical information associated with dozens if not hundreds of active shoppers, to the eager bidders for servicing those triquads and attaching bid-won Goodies to them.

Again, the preferred approach is for a Retailer to find and contract with a third party who specializes in this activity, hence the old phrase 'market making' is used for the agent. As with all examples of market making in the past, of all types and flavors, challenges abound in the best way to set up markets, have them operate efficiently, monitor them for 'cheating' and internal/external corruption, secure them at least at the transactional level, etc. and so forth. All these challenges remain in setting up a market-making-agent using LBR/triquad principles, but the hope is that the LBR/triquad approach is possibly the most robust possible in terms of dealing with these 100% expected real market challenges. The reason why a 'third party' entity is preferred in this invention is itself a function of competition: certain companies will become better and more trusted at providing these buyer-seller-matching services, and may the most excellent companies win, there is not too much more reason that this is the preferred approach than that. A second reason is of course that the Retailer should be aimed at servicing their customers, not at becoming an expert in millions-of-transactions-per-second market-making software operating in the cloud.

Previous sections have explained how shoppers walking around a Retailer's store produce a stream of individualized triquads unique to each shopper. The client-agent and the concierge agent are cooperatively managing this stream. As explained, some of these triquad streams will explicitly NOT want anything to do with the outside-the-firewall internet, as decided by the customer/shopper. These triquads may never have a need for a 'marker-maker' attaching unsolicited goodies. Perhaps the Retailer just accesses a 'walled garden' promotion agent inside their own firewall and just serves up location-specific coupons or whatnot. This will no doubt become a highly nuanced art and business.

But other 'permission states' chosen by individual shoppers will effectively 'bring on the Goodies' market activity. The Retailer is now in the position to control the presentment of those tri-quad streams to the market.

The setting up of market-making-agents deserves some attention. The first obvious step is for a Retailer to make the business decision to either set up their own home-grown service or to choose a preferred supplier of such, then enter some kind of annual contract with such a service. Whether built internally (by IT departments or captured-IT-services), or whether implemented by a third party, basic rules need to be established on how the extreme details of tri-quad information, their sheer numbers, and the quality control on their flow and response is handled. These negotiated business rules become a guiding technical matter for how the internal registries of market-making agents will be initially populated, maintained, modified and very importantly, deleted as dictated by all these business rules. Example business terms, stated as business instructions from a Retailer to a Market-Maker might include: maintain and publish to successful bidders only the daily totals of shoppers who received Goodies packet 1 through N along with specific fulfilled sales percentages, then send back to us that the successful bidder acknowledged receipt of this report. There will be dozens if not hundreds of more nuanced business rules than this one humble example, but the point of this paragraph is that such instructions need to be translated into the operative registries of the market-making-agent, generally following standard LBR-packet protocols described extensively already.

Once the basic relationship between a Retailer's concierge agent and a market-making agent has been thus established, the same initiation and population of data fields has to happen on the buyer-side of the market. As per FIG. 1 of this disclosure, we come back to the 'flip-flop' notion presented in that figure whereby even though it 'looks' like the shoppers are the buyers and the Stores are the sellers, by the time a shoppers triquads show up at a market-maker, it is indeed the shopper/Retailer combination that are now 'selling a qualified sales lead request' (the appropriately populated triquad) to the buyers wishing to own the servicing of the request. Not to put too fine a point on it: Google customers 'buy' the rights to steer presented results to Google-search-initiators, where those initiators are the 'sellers' of their 'qualified request'; the same philosophical deal happens as the shopper walks around the store with the inherent 'sale' of their qualified requests. And as with Google searches, the customer will be the ultimate arbiter on who wins and who loses in terms of best serving their needs, where in a physical store setting the final purchase of a product is the immediate answer to who has won and who hasn't. In this profound sense, one of the oldest advertising problems in the book is hugely mitigated in that direct spend-and-measure economic loops, inside stores and within a specific shopping session, become possible.

The setting up of a relationship between brand owners wanting to purchase vast batches of 'statistical buys' against very finely tuned demographics also deserves some attention. The level of attention that brand owners will eventually put toward this area is radically beyond the capabilities of this disclosure to even attempt to describe, so we must do with describing the basic plumbing steps needed to facilitate what will obviously become a complicated market. An emphasis on this point is needed as well: this whole disclosure revolves around 'location", and inherently then 'paths in time', so these buyers must start tuning their business thinking well beyond 'text keywords' in the Google search paradigm. Alpo's marketing team and their advertiser teammates now need to outsmart Purina's like team, thinking through the psychology of the in-store sell and how the demographics of their customers affect the exact criteria whereby they 'buy the rights' to attaching Goodies to shoppers at Retailer X, store Y and Chain Z. Geo-fencing constructs overlaid on store maps is certainly a starting point, but dynamism of shopping and overlays of shopper intent mixed with permissions become, again, the life blood of what is being purchased by the brand owners. Which batches of tri-quads will they bid on and which will they pass on.

Thus, this same 'setting up' of a relationship between the market-making agent and the brand buyers is a process of contacting the market-making agent through LBR-packet protocols. Only from the buy-side, new fields are generated in the market-making agent on the buy-side of the market, expressing intent of purchase in much more complicated ways that 'these many shares are no more than such-n-such a price' (a common stock-market example). Graphic and Map-making agents may come into play here, but more typical of 'batch purchases' will be higher level criteria on 'distance from my product' not needing too specific store-to-store differences in physical lay-outs or the need for buyers to become map and GIS experts in the process. Again, the complexity of these matters will be ludicrously more than this disclosure might attempt to describe, the plumbing level point is that just as the sell-side criteria for tri-quads to the market involved setting up registry fields inside the market-making agent, so does the buy-side initiation kick off creation of market-maker relationship identity fields, state fields, buy-order fields and the like. Inventor's view is that once the 'virtual real estate' angle and its GIS/Geofence overlay is applied to the buy-side of a market-maker, complexity and evolution will be the new rule not an exception. And the smart virtual real estate buyers will of course become the new winners.

The realtime operation of the market-maker is also simple in its plumbing but downright expected to be complicated in the nuanced interactions of matching buyers and sellers (brand owners or others being buyers, Retailer triquad suppliers as the sellers). The plumbing simplicity is that Retailers send LBR-packets loaded with 'as best as possible filled-out triquads to the Market-Maker-Agent, that Agent then accesses its vast list of buyers and does its magic (its proprietary buy-sell matching algorithms) and determines the best bid for either each and every triquad packet, or, some batch of triquads with a 'counter' which attempts to count up until a given batch size has been met. The simplicity of this description is emphatic. Its complexity will be a function of how precisely a Market-Making-Agent decides to implement the matching, where bits and pieces of this disclosure and previous disclosures have provided 'recommended practices', certainly as mediated by now well-known geo-fencing constructs.

Evolution of a Tri-Quad from when a Customer Enters a Store to Post-Market-Maker-Processed Purchases Much of the invention description contained in the last many sections has centered around the various agents and their interactions as mediated by an LBR core agent and packet-exchanges. This section takes an orthogonal view form this previous 'who's doing the work' to more of a 'what does the work look like along the way'. This section will follow an exemplary case of a customer/shopper getting out of their car outside of a store, all the way through to purchasing some small set of products—some of which they intended to buy and others closer to impulse purchases but with an important twist to the classic notion of 'impulse purchases'. One might imagine this whole section as describing one example of how a shopper's triquad stream initiates and evolves in the virtual real estate of the LBR cloud, driven by the physical path of the shopper as they walk through the physical store.

Following the triquad format set out in FIG. 3, that archetypical format is first repeated verbatim:

```
TriQuad_ID = TriQuadStruct{
    who
        .data
        .links
    search
        .data
        .links
    permissions
        .data
        .links
    where
        .data
        .links
    LBR
        .data
        .links
}
```

Modern programming practices (e.g. XML, JSON, etc.) will of course utilize very particular programming constructs rather than this didactic form of the classic data structure. Nevertheless, this disclosure will continue with a 'pseudo-code' approach to describing how this generic yet archetypal structure has 'an instance' formed then utilized. The ultimate usage of this structure is very simple: every time a discrete X-Y-[Z] solution is calculated for a shopper, whether it be through approaches such as those described by FIG. 7 and its associated text, or, any other technology whereby a customer's location is specified at any granularity finer than 'inside the store', this discrete solution will be 'wrapped' by the TriQuadStruct from the start. Briefly and blanking out all the fields, we have the rawest level of an instance-data-populated triquad:

```
Instance123454321 = TriQuadStruct{
    who
        .data
            Shopper = 'unknown';
    .
    .
    where
        .data
            X = 321;
            Y = 123;
            Z=null;
    .
    .
    .
}
```

One subtle point to this first 'populated' pseudo code structure is that any given data-packet-active device that is inside a store and transmits packets of any form will be inherently locatable by a store's owner simply through so-called 'public domain' packet transmissions. This absolutely includes the very photons reflected off a shopper generated by the store's lighting and picked up by a store's cameras, itself a very active technical approach to 'locating' shoppers at some level of granularity. Likewise, any store which has devices transmitting 'public domain' signals can have those signals received by a shopper's own personal device, with a variety of technological approaches to locating themselves to a granularity finer than just 'inside the store', and thus a shopper's device can also create this basic form of populated triquad, with the who.data.Shopper field replaced by who.data.Store='Macy's'. Of course, several steps need to occur before this baseline triquad can even be produced, but highlighting this lowest level form here was felt to be appropriate for setting up the ensuing vignette. In short: the raw location technology approach is immediately up-leveled to become a latent location-based query by wrapping location solutions inside a TriQuadStruct. Whereas much of this disclosure has concentrated on how a Retailer implements the processes which tee up and 'fill with X-Y-[Z] solutions' these triquads, we can see that a customer's local device (i.e. a smartphone, ipad, etc.) can also be the processing unit which forms a triquad each and every time it calculates a location for itself.

The natural starting point for the vignette of a customer departing their car then entering the store will center on the customer's device of choice sensing that the store is broadcasting the availability of a communication link, most often wifi. This vignette will follow the track where this particular customer is already an opted-in member of a 'loyalty program' with the Retailer whose store they are entering. They also have downloaded that Retailer's branded device 'app', an app which in the past has not offered them 'in-store GPS', but now when they walk into the store this time, the latest version of the Retailer's application includes this new feature and the very first thing the customer is asked, via that Retailer's app, is effectively "would you like to try the new indoor GPS", click here if so. This disclosure has already described how critical permissions get negotiated and invoked at this point. Here we will look deeper at what exactly is being done at the client-agent and concierge agent so that they can begin to set up the tri-quad stream for this new shopping session for an established customer.

So the customer begins to walk toward the store entrance and their device, in this case a smartphone, picks up the wifi availability of the store, associates with that wifi, and automatically kicks off the Retailer's branded app on that smartphone, resulting in the typical screen showing up on the smartphone welcoming the person to the store. Behind the scenes during this process, now that the store has decided to set up 'GPS on steroids' as the employees of the store like to call it, additional steps have occurred. During the step where the customer's smartphone sensed the store's wifi and requested association with that wifi, whereupon the store accepted that association and via MAC address identification or other such identification method determined that this device belongs to a 'loyalty customer' with a database entry associated with that existing customer, there is the additional step that a call is made to the main LBR network that the store has also set up via practices described earlier essentially indicating to the LBR network that there is now a new RF-active agent showing up that may or may not wish to be directly serviced via LBR activities (the 'GPS on steroids'). Thus at the most baseline level, now that the store has set up for interior positioning services, that servicing network needs to be at lease alerted that a new RF-active agent has shown up on the premises and due to the 'opt-in' agreement that said customer signed up for many shopping sessions before, the 'permission state' initially associated with that new customer smartphone is upgraded from 'unknown' to 'basic loyalty customer agreement'. In other words, somewhere along the line the Retailer has built in some form of explicit opt-in between that customer and themselves, which may or may not include the explicit permission to 'track' that customer in their store. By referencing the previous loyalty agreement, a baseline permission state is referencing whatever any given Retailer has already procured. This permission state is recorded in the appropriate LBR agent and registry, as chosen by the Retailer to either be fully controlled by the Retailer or administered by some third party, but in both cases fully behind so-called firewalls. This is clearly proprietarily sensitive information and should follow all appropriate security protocols accordingly.

The Retailer, by setting up an LBR network in the first place, has also set up a procedure of promotion for that "indoor GPS" service. One way or another their customers need to hear about this new service and how they can play with it if they want to. In the vignette here, the Retailer has set up a concierge agent with an associated registry and database. Generally speaking this is fully separate from the loyalty customer database they are already accustomed to, but a deeper relationship between the two can certainly be formed, e.g., the same supplier of the hardware and software basis for the loyalty data services can also supply the LBR services and these new concierge agent services, and certain aspects of the loyalty customer database can become 'mapped fields' into the concierge agent. This is an early example of what is referred to as 'links' wherein data may not necessarily be copied from one database to another, but, a simple link to that data is recorded in one database pointing to data in the other. As these link connections get further described, it will become clear that not only are links an economical tool but they also play a key role in security of information and the gating of which agents can have access to what information.

So back to the vignette, once the store recognizes the customer and has made the proper loyalty program associations, there is now an active agent registry entry of this particular shopper inside the store's concierge agent, with an initial 'state' entry of 'pending opt-in verification' or something to that effect. 'LBS opt-in status needed' might be an even more pro-active state, indicating that the concierge agent needs to search its own records or re-contact the loyalty database to inquire if this particular customer has been presented with the option to opt-in to the interior GPS capability. A branching of options occur at this juncture but nothing too complicated, e.g.: the concierge agent may find that this customer has never before been offered this service and the concierge then initiates a communication with the customer to alert them to its presence and follow whatever promotional sequence the Retailer has laid out, all with the design of convincing the customer to 'opt-in' to the service and probably to 'bias them' toward broader levels of permissions, harkening explanations in this disclosure on the various levels of permissions that are possible; the concierge agent may also find the opposite case, not only has this customer opted-in to whatever level of interior LBS services they may have chosen, but they have permitted a recurring population of their permission fields to 'go live' every time they walk into the Retailer's store. These permission states may be located at the loyalty database or may be in a separate longer-term storage at the concierge agent. Another branch is that a given customer has been offered interior positioning services in the past yet they declined, and the concierge may then be programmed to 'try again' and still ask the customer if they wish to reconsider. At the end of the day, all of these branching activities have at least one common goal which is to establish that, at least for the initiation of this particular customer's shopping session right now, what is the initial 'who' and 'permission' field data that will be stored inside the concierge agent as that customer begins their shopping session. The general goal is to fill these fields out as much as one can, all as regulated by the explicit opt-in interactions with the customer. So the vignette now witnesses the concierge agent creating new data fields in its database associated with this customer and filled in with the best possible 'who' and 'permissions' fields that will eventually go into the stream of tri-quads associated with this shopper. One might think of it as a cast for the ensuing tri-quad stamper, stamped out every time an X-Y-[Z] solution will be generated as the shopper begins to shop.

So a newly evolved virtual tri-quad, stored in the concierge agent for starters, might look like:

```
FutureInstance = TriQuadStruct{
    who
        .data
            Shopper = 'Loyalty XYZ123';
            Age Range = 30-40; ** permitted by loyalty agreement
            Opt-in State= Initializing;
            etc.
        .links
            http:loyalty-server/ Loyalty XYZ123'
    . permissions
        .data
            BaseState= "Loyalty Only"
            LBR Services="Enquiring"; *indicating an explicit opt-in
            session is taking place
        .links
            http:loyalty-server/'basic_license.html'
            //local:Concierge-LBR-rules-base-loyalty.dat *stores
            translation of loyalty
agreement into baseline 'public tracking' rules for anonymous interior
tracking
    .
    where
        .data
            X = exterior/unknown; *indicating public domain
knowledge but no explicit opt-in yet
            Y = exterior/unknown; *ditto
            Z=null;
    .
    .
    .
;
}
```

The vertical ellipses indicate there might be many more fields of course, but we highlight here just the fields being discussed as part of this sections vignette. Notice that this last example of a populated TriQuad has the word 'FutureInstance', where this is meant to clearly show that these fields are being set up inside the concierge agent's registry and database fields, and are not yet 'live tri-quads' as it were. As X-Y-[Z] solutions begin to fire up and start streaming, the tri-quads actually formed in these streams will access this stored information and become part of populated tri-quad data packets later.

Further rich branching of options can occur at this point in the vignette but for explanatory and 'initiation' purposes, we will concentrate on the case where a given customer has not yet been exposed to the full indoor-LBS opt-in choices, and now need to be so exposed.

Enter to the vignette, then, the client agent. As the concierge agent initiates the Retailer-directed promotion session with the customer, the concierge agent contacts the client-agent (with the litany of choices on where that agent physically lives and operates) and indicates that a loyalty customer has entered the store and that the client agent so instantiate a shopping instance for this customer and begin its own search for 'past sessions' or 'past permissions' based on at least the information contained in the tri-quad fields listed above 'FutureInstance'.

In this vignette, the client agent finds no previous opt-in in its records, thus it responds to the concierge agent that it found no previous record but that it has dutifully entered a new active shopper in its registry, along with baseline populated data fields.

An important two-branch point comes here in further describing what the combination of the concierge agent and the client agent do next. Branch one involves a client agent which is designed and operated by the Retailer, and branch two involves a client agent which is completely 'third party' relative to the Retailer's concierge agent. This disclosure presumes that one over the other implementation is 'preferred' but instead wishes to state that both branches should be supported, where the marketplace will ultimately determine some ratio of preference between one and the other approach.

The option branch which posits that the client-agent is provided by the Retailer is the simpler case. Best practices might be to have such an agent be closely related to the loyalty programs and databases already in place surrounding repeat customers and the highly developed prior art. To the extent customers already trust a Retailer enough to keep their credit card on file and/or details about who they are, what they have bought in the past, their implicit and explicit product preferences, etc., they will often be willing to trust that Retailer to perform detailed tracking of their shopping, shopping path histories, realtime serving of their location-tuned requests to the broader internet, etc. The client-agent in this case is an instantiated process in the LBR network which becomes assigned to that individual shopper for that individual shopping session, generally privy to all information that a customer considers sensitive or even fully private. Trusted encryption of communication with this agent is mandatory, and is part of the assumption made by the customer relative to their trust of the Retailer to keep that information private. Even the concierge agent is not allowed to see inside the client agent's data cache, where it is only customer-chosen information which is allowed to transfer from the client agent to the concierge-agent for some given shopping session. Again, for the option branch of the client agent being provided by the Retailer's network, a close association with the loyalty programs and database is highly encouraged, replete with following the same best practices for secure storage and secure communications with the customer that loyalty programs already have in place.

The option branch where some third party instantiates a geographically-savvy client-agent, outside of the Retailer's firewall, can be conceptually as simple as the previous branch, but its implementation and richer set of further options is more complicated. To begin with, data format compatibility and associated communications protocols all should be simple to understand but often are a source of implementation challenge especially in early ad hoc standard days. But the basic idea of a third party client agent is that some given individual shopper may not want to be that tuned in to the differences of how their individual floor-plan shopping assistants behave when they decide to shop at Target today as opposed to Walmart like they did the day before. They want to deal with one and only one 'client agent', their own personal shopping assistant. This agent can then adapt to the particular store (retailer) they choose for some given shopping session, generally as an interchange between that third party agent and the concierge agent of the current chosen store. Importantly, this involves access to varying floor-plans and 'virtual maps' and virtual real estate, as obviously each and every store will have their own. Indeed, the quality of service surrounding these virtual maps of stores will be a key differentiator from one Retailer to the next in terms of a customer's ultimate satisfaction of one Retailer's GPS experience versus another's. The winning Retailer will be the one that has paid a great deal of attention to their interior GIS system and its ability to be maintained and presented to the customer and their client agent.

The implementation of both branches of the client agent should ideally be quite similar if not exactly the same. This is one way to allow a customer to choose to have both forms of client agent, one session using the store's process and the next their own third-party generic one. This formalizes the necessity of the client agent and the concierge agent to have explicit 'negotiations', both when a customer enters a store then continuing as the customer shops, with the client agent always privy to the extreme details of the shoppers interests and sensitive data, and then selectively sharing (via a 'push' to the concierge agent, and/or via a 'pull' from the concierge agent making queries to the client agent on their current interests and permissions) that data with the concierge agent. The initialization of interchange in the vignette, only as but one example, is that the concierge agent is charged with initially finding out which type of client agent the customer wishes to use and then to initiate a shared shopping session to be co-managed by both agents. Intuitively, the situation is no different than a live shopping assistant generally being the one to first ask the question 'may I assist'. In the LBR context, this initial 'may I assist' question includes a back-and-forth determination of the customer's client agent with subsequent 'firing up' of that agent. From that point forward, the client agent is ultimately taking lead on the co-management of the shopping session. But even here it is instructive to liken the whole process to the live shopping assistant: a client agent can be bossy and very direct in looking for assistance, all the way to the client agent saying 'hey, show me around your store, I have no clue what I'm looking for, so, you concierge-agent generally have lead on this shopping session'. The broader point is that the customer chooses these intuitive modalities, including choosing which of the two companion agents initiates ongoing interactions between the two agents and ultimately the communications with the customer's device.

So back to the explicit vignette, we can keep things simple and describe how the Retailer has offered client-agent services to the customer and the customer has accepted those services. One immediate result of this choice will be the contacting of the Retailer's client-agent-server (usually closely associated with the loyalty program processes), that client agent acknowledging the instantiation and its implication of a subsequent co-management of a shopping session, and a copying of any and all pertinent data from the concierge agent to the client agent. This data transfer will include the proto-tri-quad data already described above.

The client agent now becomes in charge of interacting with the customer in order to fully configure and plan, to the fullest extent allowed by the customer, the shopping session ahead. The number of options for implementation of this step mushroom quite readily, but the main point is that the client agent is in charge of filling out at least their own version of the proto-tri-quad structure. How much information does the customer want to put into at least the client-agent-private 'who' fields? the permission fields? and ultimately, the never-ending possibilities for filling out the 'search' fields. As stated several times already, these are not yet the data items that will necessarily populated instant-by-instant tri-quad packets, this is the tri-quad template maintained by that customer's client agent. An important data item to fetch from the customer—by the client agent—is what permission state they wish to have even between that client agent and the concierge agent assigned to assist the client/customer device pair. After the client agent fills out its own tri-quad fields accordingly, it then uses this 'permission to pass X tri-quad data to the concierge agent', where $X<=Y$, the full tri-quad data kept in the client agent. So, already permissions are being read and followed even at this very early stage. An example of what the client's tri-quad template might look like, and what the triquad template looks like AFTER the permissions on transfer have been followed, might be:

```
FutureInstance_Client = TriQuadStruct{
    who
        .data
            Shopper = 'Loyalty XYZ123';
            Name='Jane Doe';
            Age Range = 34;
            Sex = F;
            Zip Code=12345;
            Credit Card= MasterVisa 1111 1111 1111;
            Opt-in State= link_57 *points to database of evolving descriptions of opt-in
    levels
            MAC='12345678766';
        .links
            http:loyalty-server/ Loyalty XYZ123'
            http:LBRXX/opt_in_tablesv2012_4
            http:myAgent:client32543245
            http:StoresAgentProcess:SWGD2145224894FRS * throw away session link to
            this client process; intended for other agents to be able to directly contact this
            active agent
    search
        .data
            State='Initializing- Location Engine Contacted';
            myList = StoresAgentProcess:SWGD2145224894FRS * indicates a null list
            pointer to a complicated set of searches has been created by this process, later to
            be populated with further interactions between the client agent, the concierges
            agent, and the customer's device
```

-continued

```
            myHistory='link: client32543245'; * see below
        .links
            http: myAgent:client32543245; * pan-Retailer link to the customer's broadly
            defined preferences, history, etc.; maintained by third party client-agent
    . permissions
        .data
            BaseState= "Baseline Indoor GPS + Navigation"
            SearchState = "Level 3 Publishing Permission" * e.g. of 10 levels
            LBR Services="Standard + Allowed Tracking"
            ConciergeLevel="StandardPersonal+PointOfSaleStandard"
            InternetAccess = "Standard" * indicates expectation of non-LBR normal
        services
        .links
            http:loyalty-server/'basic_license.html'
            //local:Concierge-LBR-rules-base-loyalty.dat
            //local:Session- SWGD2145224894FRS * 'publicized' permission states for any
            agent having this session key; different keys can be given to different clients,
            e.g. concierge vs. external firewall third parties
    where
        .data
            Status - Contacting Location Agent
            X = exterior/unknown;
            Y = exterior/unknown;
            Z=null;
    LBR
        .data
            MainLBR="server 7";
            LocationAgent='secureserver_3';
        .links
            //local:server_addresses
}
```

Then, based on the rules of transfer contained in the permission fields and their associated links, the client agent might then send the following triquad template back to the concierge agent for its storage:

```
FutureInstance_Concierge = TriQuadStruct{
    who
        .data
            Shopper = 'Loyalty XYZ123';
            MAC='12345678766';
            Age Range = 30-40;
            Sex = F;
            Zip Code=12345;
            Credit Card= 'Available at POS';
            Opt-in State= link_57 *points to database of evolving descriptions of opt-in
    levels
            LBR-Experience-Level: 'First Time User'
        .links
            http:loyalty-server/ Loyalty XYZ123'
            http:LBRXX/opt_in_tablesv2012_4
            http:StoresAgentProcess:SWGD2145224894FRS * throw away session link to
            this client process; intended for other agents to be able to directly contact this
            active agent
    search
        .data
            State='Initializing- Location Engine Contacted';
            ConciergeState="Concierge to Initiate Search Session"
        .links
            //local Session- SWGD2145224894FRS * link to initial null table
    . permissions
        .data
            BaseState= "Baseline Indoor GPS + Navigation"
            SearchState = "Level 3 Publishing Permission" * e.g. of 10 levels
            LBR Services="Standard + Allowed Tracking"
            ConciergeLevel="StandardPersonal+PointOfSaleStandard"
            InternetAccess = "Standard" * indicates expectation of non-LBR normal
        services
        .links
            http:loyalty-server/'basic_license.html'
            //local:Concierge-LBR-rules-base-loyalty.dat
            //local:Session- SWGD2145224894FRS * 'publicized' permission states for any
            agent having this session key; different keys can be given to different clients,
            e.g. concierge vs. external firewall third parties
    where
        .data
            Status - Contacting Location Agent
```

```
            X = exterior/unknown;
            Y = exterior/unknown;
            Z=null;
    LBR
        .data
            MainLBR="server 7";
            LocationAgent='secureserver_3';
        .links
            //local:server_addresses
}
```

These two previous triquad templates walked a very fine line between being detailed enough to illustrate the basic job of the client agent to start to populate the proto-triquads with appropriate data, but not so detailed as eventual implementations will inevitably become (overwhelming the reader as well as applicant). Many key aspects of what has been called 'flurries' heretofore now find expression in these resultant tri-quad templates. Likewise, the process separation between an agent fully controlled by the customer and an agent representing the Retailer is highlighted. As indicated often, these interchanges would be using standard secure communications and storage in their execution, with 'open channel' publishing of data even to the concierge agent carefully managed.

Of many items to note in these triquad templates, a separation of the specificity of 'search' is already apparent between the view that the client agent has and the one the client agent shared with the concierge agent. Of equal note is the simple field within the concierge agent which is a direct way for the customer to indicate to the concierge agent that, at least for this particular pending shopping session, "I will be looking to initiate the query process on what exactly I'm interested in." The client agent could have equally just sent very detailed search instructions and data fields, which will often be the case in practice, but for our vignette where a patent application must necessarily describe implementation steps in the best discrete manner possible, this filling out of the co-managed 'search' fields will commence shortly.

These examples should also further explain why the 'data' and 'links' distinction were made very early on in the triquad disclosure sections. In short, certain types of information is best explicitly stored in active triquads and their templates, while other often equally important is best accessed through standard intranet and/or internet reference, especially data which changes often or 'evolves' as an LBR network evolves.

Back to the specific vignette, we can see that the customer hasn't even gotten to the door yet (indicated by 'exterior' and the fact that no location solutions have fired up yet, only an association between the customer's device and the store's wifi system, which subsequently contacted the store's LBR network as described.

It is now time to contact the location agent and announce to it that a new customer has shown up and wishes to have interior location services activated for them. Most but not all location technologies, and certainly those of previous sections of this application, will have generic MAC address (or similar public domain identifications) identification and parsing routines such that probably even before the customer's device and the store finish their association ritual as described earlier, the location engine will already have noticed that a new MAC device was showing up on one or more access points or ''listeners'. This will be the case where lists of received countstamps from ANY transmitting device, on the channel of the given listener, is routinely sent to the location engine without filtering by the listener. Each Retailer will choose their own policies on whether or not new, unknown devices will begin to be 'tracked' or not. For location technologies which do not key in on MAC addresses, similar types of 'early indications' that some client device has shown up on premises is possible. Yet other location technologies such as GPS itself will of course be occurring on the client's device itself, where this device-side formulation of location solutions represents an option branch to this particular vignette, where the following discussion would need to replace 'location agent' with 'customer device's location determination process' with most of the explanation still applicable.

In any event, the concierge agent contacts the location engine, informing that engine that MAC such and such should be showing up within the purview of its active clients, and the steps and processes that the location agent follows has previously been described. For the case of this vignette, we can leave it that the location agent can indeed begin to locate the new customer and sends back to the concierge agent an acknowledgement of such. The concierge agent has also sent a further filtered template of the triquad to the location agent, asking that agent to wrap a first spatial solution for the new customer inside this triquad structure:

```
Instance = TriQuadStruct{
    who
        .data
            MAC='12345678766';
            Opt-in State= 'track';
        .links
            http:StoresAgentProcess:SWGD2145224894FRS
    search
        .data
            State: 'X Y [Z]
        .links
    .   permissions
        .data
            State: 'track';
            Publish: 'stream to Concierge Agent
            SWGD2145224894FRS only'
        .links
    where
        .data
            Status - Calculating
            X = to be filled;
            Y = to be filled;
            Z= [to be filled];
    LBR
        .data
            MainLBR="server 7";
            LocationAgent='secureserver_3';
        .links
            //local:server_addresses
}
```

This basic triquad structure can be stored locally in the location agent so long as that MAC address keeps showing up in its active lists (and deleted if given an active delete message from the concierge agent, or if it looks inactive for some preset length of time, or it queries permission from some agent to delete, etc. The 'publish' data item in the permission field now indicates to the location engine that one some predetermined regularity, say once every two seconds, every time the location is determined for that MAC address, the location engine will send a packet to the Concierge agent, only these packets will finally be 'live triquads' and their initial audience will only be the concierge agent. The audience for this new stream of triquads can become much broader than just the concierge agent, but again, this vignette is attempting step-wise description of the various options.

Thus, in the vignette, the location agent responds to the concierge agent either with a packet essentially saying 'sorry, don't see it' or much more likely 'yes, got it, and here is the first low-level populated triquad I have produced' and it sends back the following active triquad to the concierge agent, wrapped in the broader LBR packet structure described in earlier sections:

```
MAC12345678766_1= TriQuadStruct{
    who
        .data
            MAC='12345678766';
            Opt-in State= 'track';
        .links
            http:StoresAgentProcess:SWGD2145224894FRS
    search
        .data
            State: 'X Y [Z]
        .links
    .   permissions
            State: 'track';
            Publish: 'stream to Concierge Agent
            SWGD2145224894FRS only'
        .links
    where
        .data
            Status - Calculated
            X = 123.4;
            Y = 12.34;
            Z= null;
            ZulutimeLocal: 597687649685093862
            TimeOfDay(GPS): Jan1, 2013, 00:01:01.462
    LBR
        .data
            MainLBR="server 7";
            LocationAgent='secureserver_3';
        .links
            //local:server_addresses
}
```

It is more than a philosophical question on whether or not the location agent or the concierge agent actually 'creates' the first and subsequent live triquad and the triquad stream. Both are technically possible of course, where the concierge agent simply can ask the location agent for the current location of device with MAC address 12345678766 and then 'wrap' the answer in its own triquad template then 'ship it' somewhere. But the preferred embodiment is that the baseline act of creating triquads then filling them with the rawest levels of information—most definitely including X-Y-[Z]—should be performed by the location engine. The location engine, through the act of discretely determining the location of some given device, becomes the simple source of the stream. Never mind that this stream will be processed and filtered and cloned and broadcast and whatnot, it is best that the location engine simply begins best practices by wrapping X-Y-[Z] location data within appropriately populated ID structure and most critically permissions. Far too many market-fears have been expressed on the privacy and security aspects of the burgeoning location-services industry, so bring in privacy and security practices right at the same point where location is determined. In the case where the customer's device is the 'locating engine', the same practice should be followed even in the simplest case where a GPS process on a device sends a location message to a mapping GUI app on that very same device. Why? Because it is clear as day that the evolution of device-side processing will continue to equivocate as CPU's become more complicated and multi-threaded, and parallel cloud-side processing utilizing wireless channels continues on its swift pace. So even at the device level, this disclosure makes the argument to GPS hardware and software manufacturers that they should be wrapping X-Y-[Z] solution data inside a triquad like synthesis before shipping the results to anything outside of the core GPS solutions core.

Back to the vignette, the location agent has dutifully sent back its first triquad populated LBR packet back to the concierge agent and all is well. The location engine will continue to ship these packets to the concierge agent until told otherwise, incrementing the triquad label accordingly (1, 2, 3, etc.). This point in the vignette moves more strongly toward the all-important 'search' aspects of the invention and gives by way of example an explanation on how the past 20 years of prior art on text-based 'search' can be co-opted and expanded for the interior positioning evolution of the keyboard/text search form.

The concierge agent, upon receiving an apparently valid and 'accurate' (to some level of granularity/resolution/accuracy associated with the actual location technology being employed) spatial solution from the location engine, can now switch gears from the plumbing level shopping initiation activities and begin the real 'services' aspect of the shopping session. A natural first question for it to ask, already alluded to many paragraphs ago, is: how may I help?

The first answer has already been transmitted by the client agent in the simple line: ConciergeState="Concierge to Initiate Search Session". The basic idea here is that the client agent has already provided the first clue to the concierge agent via the formatting of this 'state' for the concierge agent . . . to with, you tell me how you can help!

For the very first time user of the Retailer's indoor GPS network, no doubt the concierge agent will first look to its new-user tutorial sub-agents to figure out what to do next. For veteran users, a whole different set of 'next steps' will no doubt occur. A core point of the LBR/agent is: the branching of options is fully expected to mushroom at this juncture, that is the whole point of LBR packets and agents. The vignette here will follow the tutorial branch and attempt to sprinkle in various aspects and choices encountered on other more 'normal experienced user' branches. The combination of the ConciergeState message and the LBR-Experience-Level: 'First Time User' data field indicates to the concierge agent that it is time to fire up the promotional and tutorial scripting agents that each Retailer will no doubt spend a fair amount of time and money creating, especially if those Retailers are so-called early adopters and pioneers in the creation and development of indoor positioning technology. This paragraph calls these 'scripting agents' but to the Retailer's marketing executives and advertising professionals, these will be the usual bewildering mélange of pre-visit advertisements, in-store signs, additional 'screens and functions' built in to the update for the mobile application program that the customer has already downloaded, as well as cloud-side processes/threads that can access some large cache of graphics, video clips, music . . . all the typical multimedia fare, hyper-charged now by mobile interaction and constant streaming of content to the customer's mobile device. Whatever that mélange may look like, our vignette posits that is the concierge's initial job to light the fire under this display of fireworks otherwise known as 'Welcome Jane to our new Indoor GPS on steroids!"

The concierge agent 'lights this fire' by simply embellishing then sending back to the client agent the initially received triquad. It might look like this, where many of the data fields of the earlier listed 'FutureInstance_Concierge' triquad template are removed for clarity of the explanation and the reader should assume they are still present as well:

```
TriQuad_1 = TriQuadStruct{
    who
        .data
            Shopper = 'Loyalty XYZ123';
    .
    .
    search
        .data
            State='Location Determined Only'
            ConciergeState="Concierge Initiating Newbie Script"
        .links
            //local Session- SWGD2145224894FRS
            //local:NewbieScriptMelange:Jan1_2013
    . permissions
        .data
        .links
    where
        .data
            Status - Calculated
            X = 123.4;
            Y = 12.34;
            Z= null;
            ZulutimeLocal: 597687649685093862
            TimeOfDay(GPS): Jan1, 2013, 00:01:01.462
    LBR
        .data
        .links
}
```

This abridged version of the triquad sent from the concierge agent back to the client agent (and not yet back to the client's device) tries to boil the items down to the next step imperatives, namely, the actual location of the device so that the client agent can locate it within its stored virtual map/ virtual real estate, and a pointer to the vast array of suggested 'getting started' items located at //local:NewbieScriptMelange:Jan1_2013 on the Retailer's databases (which may have some being LBR service agents, but others that are standard resources for device apps to eventually access). The client agent's simple next job is to evaluate the private permission states it maintains and double check that the customer has allowed and is even expecting the Retailer's branded app to 'do something' after they have asked to opt-in to the store's GPS network. Finding those permissions present, the client agent now sends an LBR-formatted packet to the Retailer's wifi session process that the Retailer needed to invoke in order to establish a wifi session with the customer in the first place. This message packet which needs to initially route through the Retailer's existing wifi network duly gets passed on to the customer's device, where a very rudimentary 'LBR awareness' and certainly 'triquad awareness' has now been programmed in to the latest GUI/app on that device. Just as the triquad sent to the location engine can be a highly stripped down version of the full triquad template sitting at the client agent, so too can the triquad sent to the client's device be stripped down to just what the client's device needs to operate on, for example:

```
TriQuad_Device1 = TriQuadStruct{
    who
        .data
            Shopper = 'Loyalty XYZ123';
    search
        .data
            State='Location Determined Only'
            ConciergeState="Concierge Initiating Newbie Script"
        .links
            //local Session- SWGD2145224894FRS
            //local:NewbieScriptMelange:Jan1_2013
    . permissions
        .data
            State: 'Request Newbie Launch'
        .links
    where
        .data
            Status - Calculated
            X = 123.4;
            Y = 12.34;
            Z= null;
            ZulutimeLocal: 597687649685093862
            TimeOfDay(GPS): Jan1, 2013, 00:01:01.462
    LBR
        .data
        .links
}
```

Again, some basic fields are left out of this example but by and large the client agent simply needs to ask the customer if they want to fire off the first-time-user tutorial experience, which is mainly a command to the Retailer GUI/app to present the user with this choice while at the same time instructing the GUI/app to bring up a display of the store's floor map (if it has not done so already) and to then display the customer's current location on that displayed map. Making it blink and then move with the customer as the customer moves is clearly a desirable initial part of the Newbie orientation, BUT, again for the purpose of linear explication of an inherently parallel activity, this vignette sticks with linear narrative on 'Firing up the Newbie Interactive flurry'. [Which means, among other things, by all means the location engine will keep sending newly filled low level triquads to the concierge agent, who will send them to the client agent, who will send them to the client's device through the Retailer's wifi session server so that the blinky light on the map can move around while the customer decides what to do. In other words, a form of parallel background process of feeding current location to the customer's device is effectively fired up during this Newbie flurry about to happen]. The Retailer's GUI/app duly presents the option to the new customer-user to 'test out and try' their Indoor navigator/assistant, their GPS, their whatever-they-wan-to-brand-it-as. The customer in our vignette perforce answers surely, hitting whatever button or dial the Retailer has put onto their GUI/app.

The vignette therefore proceeds rather directly through this 'soup to nuts' tutorial mélange that the customer will go through, because, it nicely illustrates the proper setting up of a more populated and explicitly permitted 'search' capability, culminating in product purchase decision making and eventual purchase. The store wishes to teach the customer how this can work, and applicant wishes to teach the reader how this can work, adding in the commentary on what is happening at various agents, routers, triquad data structures and the like. The evolving triquad structures and their various instantiations will remain the backbone of the vignette.

The Retailer has determined that the best way to teach their customers how to use their new GPS services happens to be centered around helping them find, choose and buy some specific product or products that they are interested in for this very shopping session. Via standard prior art mobile interactive procedures, the Retailer presents the customer with the scenario summarized by "Great, let's go buy something you are planning to buy today". The customer indicates surely. This last 'surely' by the customer kicks off an LBR message from the customer's device to the client agent thusly, again with only pertinent data fields highlighted below (not implying there won't be more, especially the 'LBR' plumbing fields) (another subtlety in this triquad is the TriQuad_DeviceN where '1' has been replaced by 'N' so that the LBR network can understand which triquad was the last one received by the customer's device):

```
TriQuad_DeviceN = TriQuadStruct{
    who
        .data
            Shopper = 'Loyalty XYZ123';
        search
            .data
                State='NewbieMelangeLaunch'
                Product="ShoppingList in Process"
            .links
                //local Session- SWGD2145224894FRS
        .   permissions
            .data
                State: NewbieLaunchAccepted
                Client-Concierge access: "Allow History Fetch"
                Device-Input: "User input in process"
            .links
        where
            .data
                Status - Location was Displayed
        LBR
            .data
            .links
}
```

Again, this triquad was wrapped into an LBR-formatted packet and sent to the LBR via the Retailer's wifi session management processes. Less convoluted pathways are eventually possible but for tutorial reasons we will keep explaining the current communication chain. The triquad shows up at the client agent, letting that agent know the customer is ready to play ball and be helped to go buy something they are interested in. The client agent notes the new field data entry of Client-Concierge access: "Allow History Fetch", along with the shopping list in process note, and therefor determines via permission rules contained in its permission links that it cannot only pass on (to the concierge agent) certain 'semi-sensitive' past shopping history data it has but the concierge agent does not have, but also that via other rules existing at those permission links, the Retailer's own loyalty program processes and databases can also be contacted to fetch information about this particular customer and their past buying patterns. In other words, one way or another the customer has been informed/educated that their past buying data will be securely fetched (kept inside the Retailer's firewalls) and then utilized in helping to create a shopping list for this shopping session. One way for the client agent to instigate these broader data fetching flurries is to just send a triquad back to the concierge agent and let it worry about loyalty program data access. For this vignette it does just this with the following triquad:

```
TriQuad_ SWGD2145224894FRS_N = TriQuadStruct{
    who
        .data
            Session = SWGD2145224894FRS;
        .links
            //local:session SWGD2145224894FRS.Participants
    search
        .data
            State='Location Determined Only'
            ConciergeInstruction="Fetch Loyalty History"
            SharedState="CreatingSharedShoppingList"
    .   permissions
        .data
            Upgrade: "allow loyalty program access"
        .links
    where
        .data
            Status - Calculated
            X = 123.4;
            Y = 12.34;
            Z= null;
            ZulutimeLocal: 5990176496850938
            TimeOfDay(GPS): Jan1, 2013, 00:01:31.999
    LBR
        .data
        .links
}
```

As with past examples, this one contains some important new data fields and values to make note of. A primary one is that what was a 'tentative' shopping session is now a full blown session and thus the primary identification schema switches to this session ID, where copies of various other identification information is obviously stored inside one or more agents. Likewise, simple notions of how a client agent instructs a concierge agent to 'do something' is illustrated, and the same protocol can be used as concierge agents make 'humble requests' back to the client agent who is ultimately in charge. The permission fields are explicitly flagged for upgrade on permission states (still referring to links for detailed rule interpretation and low level code execution). A new link field has been introduced into the 'who' category as well, this time being a link to a just-beginning-to-grow list of participants in this session, a list generally fully controlled by the client agent but that agent can publish links to sub-sets of that list. That is, the client agent may send the link: //local:session SWGD2145224894FRS.ParticipantsA to the concierge client, the link //local:session SWGD2145224894FRS.ParticipantsB to the loyalty program processes where they may not need to know (or are actively excluded from knowing about) various participants. Finally, the 'where' data is changing, which starts to address broader issues of 'latency of response' and the need for various agents to make sure they are relatively up to date in terms of servicing the mobile and realtime demands of the customer. Once triquads start flying out into marketland, these latency issues enter more of the spotlight.

The concierge agent thus receiving the above the above triquad duly contacts its sister Loyalty program processes and databases and requests abridged lists and pointers to list of that particular customer's past purchases and any further information deemed relevant to generating shopping lists (past shared preferences, demographic information, etc.), but certainly including past purchases. In the meantime, the client agent is also fetching any information that it deems appropriate to the task of generating a shopping list for this particular customer. Needless to say, while all these activities are taking place in the blink of an eye in the cloud, the customer also is interacting with the Retailer's GUI/app and may be simply typing in 'I just want dog food, that's it'. These concurrent behaviors and processes are quite normal and much of the work done behind the scenes which is aiming to assist the customer can very quickly become obsolete with a single over-ride by the customer.

The vignette concludes by taking perhaps the shortest path between a customer indicating what they want to go buy and simply buying it. This application takes this route because there is an intractable array of options and variations in the shopping experience itself, and the point of teaching technical innovation is to concentrate on the core required technical steps underpinning that vast array of options, not to try to describe them all. The vignette scenario therefore posits that 'Jane' has indicated to her device with the prompting of Retailer's in-store GUI/app that, now that she considers this new Indoor shopping navigation capability, she wants to keep things simple and just see how it does helping her buy the normal dog food she buys for her dog Rascal: Kibbles 'n Bits. So while the client agent and the concierge agent are off doing their job setting up for a more 'general' shopping session, Jane hits the pet food link and then the dog food link on her device (through the GUI/app) which then prompts a form a LBR interrupt message first sent to her client agent. In her GUI/app interaction, she also has pro-actively allowed the presentation of possible information about competing brands to Kibbles n' Bits as an adjunct operation, and indeed, has not even explicitly typed in her favorite brand. The new triquad that her device sends to the client agent might look like this, where we now have an M replace the N index since time has passed, and indeed she has moved a tiny bit:

```
TriQuad_DeviceM = TriQuadStruct{
    who
        .data
            Shopper = 'Loyalty XYZ123';
        search
        .data
            State="Take me to the dog food"
        .links
            //local Session- SWGD2145224894FRS
    . permissions
        .data
            State: Enable Market Presentation
        .links
    where
        .data
            Status - "Use last stored 'where' at client agent"
    LBR
        .data
        .links
}
```

Once again, there will be more filled data fields than this, this example just highlights some new actions. The main actions being 'take me to the dog food', and, 'enable market presentation' which is the translation of saying that she is willing to see information on various brands. The client agent receives this unexpected LBR packet with this triquad packed inside, and passes on the packet to its assigned partner concierge agent. Before this happened however, the concierge agent and loyalty program databases already 'pulled up' Jane's last 12 months of shopping records, and now that the concierge agent knows she just is looking for dog food, it is a quick operation to see that she has bought Kibbles n' Bits 7 times in the last 5 months. This is all a prelude to the concierge agent seeing the highly critical permission state 'enable market presentation': this permission state is one example, one of the main ones, that opens the floodgates to the external third party market of brands and advertisers of many types. Via rules existing at the various links on permissions, the concierge agent now knows that it has approximately a minute or so (the length of time it will take the client agent with the location agent's help to 'guide' Jane to the pet food section, even though she well knows how to get there, but she wanted to see how the indoor GPS worked in the first place) to present a highly filtered but highly qualified tri-quad out to a market making agent. That tri-quad sent could look like this:

```
MarketQuery372946 = TriQuadStruct{
    who
        .data
            Shopper = 'Female, Age 30-40';
    search
        .data
            Status: Imminent Purchase Choice
            Category: Dog Food
            Confidence: 7
            Historical: Kibbles n' Bits
        .links
            //http:ThisConciergeID; 372946
    . permissions
        .data
            Market Match: all who and search fields
            Market Publish: none
            Request: Three 1-2-3 ranked respondents
            Goodies Delivery: To Concierge
        .links
    where
        .data
            Status - Less than 1 minute until probable choice
    LBR
        .data
        .links
}
```

We must continue to emphasize that an actual triquad sent from the concierge agent to a market-making agent will have many more filled fields, we here highlight some very potent new items. Starting with the 'where' item, the criticality of 'location' and the ability of the concierge agent to formulate such an assumption about time to purchase is huge. By knowing that the customer will take a minute or so to even get to the section, the marketplace flurry about to happen can qualify the lead by time to destination and respond accordingly. The permissions fields shared at least between the concierge agent and the market—making—agent (which may or may not be passed on and 'published' to market bidders for the 'Goodies' to be delivered if a bidder 'wins one of the top Goodies presentation slots') instruct what is permitted—in this case a generic bid on dog food where it is revealed to the market-maker that this particular customer usually buys Kibbles n' bits along with the other who and search data. There is then the instruction to subject this information to the market maker's proprietary market matching algorithms (and existing 'book' of bidders for batch buys of Goodies-impressions and Goodies-offers), producing only 3 winners ranked one two and three for who paid the most to third most. The results are then only permitted to be sent back to the concierge agent, referencing the link in the 'search' field. In manners already described and also harkening the prior art of matching buying of search responses to 'searches', the Kibble's 'n Bits brand owners happen to be buy-side market participants (remember FIG. 1: the buyer's in this scenario are the brand owners wanting to feed 'Goodies' packets ultimately for impression on the customer's device, aiding them in finalizing their decision to buy their particular brand). They have set-up 'batch buy' conditions with the market-making-agent to bid X cents for up to 10,000 requests for generic dog food with Confidence levels 5-7, but Y=2× cents if their own brand is an explicit part of the history of some random customer. They may also have specified further 'bid levels' based on the sex of the lead, age ranges, etc. BUT, so have all their brand competitors set up similar batch buy criteria. A critical location oriented parameter for buying ultimately boils into the fields such as 'imminent purchase choice' and the time frames involved, possibly even navigation paths (which are not part of the explicit triquad example above due to the fact it is already rather involved; Indeed, the 'path' knowledge that can be revealed from the concierge agent to the market-maker will become a powerful bid-buy criteria for brand owners as they become more geographically aware of real-time shopper habits and how to tune bid-by criteria to those physical path habits). But still keeping things simple for explaining how triquads work in the market, let us suppose that PetSmart is experimenting this month with a promotion campaign specifically aimed at stealing away customers from their own competitors, and they have made a batch-bid-buy with the market-maker letting the market-maker see if a brand field has been filled out with some other brand's name and they are actually bidding 'more' on that condition than the Kibble's 'n Bits marketing team has decided. Jam's is also a market-bid player and has their own complicated batch-buy choices they have made with the market-maker-agent. The market maker agent churns all these variables and spins their market-matching algorithm and determines that indeed PetSmart's existing batch-bid has 'won' this particular triquad 'Goodies response', Kibble's n' Bits came in second, and Jams third, with a dozen other brands missing the bid of the top three. The market-making agent ticks off a count on the bid-win counters it has for the various batch-bid players (including ticking off counters that the other brands missed out), then sends back to the concierge agent an LBR-wrapped triquad that might look like this:

```
MarketGoodies372946 = TriQuadStruct{
    who
        .data
    search
        .data
            Winner1:
            Winner2:
            Winner3:
        .links
            //http:ThisConciergeID; 372946
            //http:petsmartGoodies:Jan2013_Dog_promotions
            //http:KibblesGoodies:Mobile_Splash_Dog_Coupon
            //http:IamsGoodies:Level3Banner_Dog
    . permissions
        .data
            Repackage Goodies for Device formatting
        .links
    where
        .data
            Status - Guaranteed Delivery By Aisle Presence
    LBR
        .data
        .links
}
```

This example is especially stripped down (abridged) to zoom in on the super-basics. Here are the three winners, and here are links to the promotional graphics, promotions, coupons, etc. . . . the link their own cache of Goodies. The Goodies term used here is quite deliberately in its vagueness: there are all kinds of data items and videos and coupons and java scripts and whatnot where each brand owner is trying to distinguish themselves from their competitors: the generic links to this cache of 'Goodies' thus will use standard and prior art methods to eventually have some instructed and filtered form of the winning Goodies show up on the customer's device, in paid-for order and prominence as expressed in the 1-2-3 winning bids.

The concierge agent receives this Goodies-laden (through links) triquad and immediately passes it on the client agent. 'Jane' has not yet reached the dog food section but as she is starting to approach the section (the Retailer has programmed third-party Goodies-responses differently as a function of path, stasis, etc. and in this case wishes to present the 3 goodies-winners as Jane walks up to the dog food. The client agent is intimately familiar with Jane's 'iPhone' and thus takes care of the job of studying the various 'proffered' Goodies at the three winning links provided, sees that all three have pre-formatted graphic specifically for the iPhone and more specifically for the screen real estate specification allowed for the 'top bidder' (a 2 inch by ½ inch area), the second winner (a 1" by 0.75" button) and the third winner (a ¾" square button), fetches these graphics and ships them to Jane's iPhone for presentment within the GUI/app as she approaches the shelves. Jane is rather surprised to see PetSmart showing up so prominently and with a non-trashy appeal to save a buck if she tries it out, prompting her attention away from the iPhone and to the PetSmart product itself, which she picks up and starts reading the label. Sure enough, she is intrigued and plops it in her basket not even noticing the Kibbles or Jams buttons, she heads to the check-out, PetSmart has one this little Geo-Battle for a new customer and even forgot about going back to her iPhone to see how the indoor GPS capability is doing, she doesn't care any more.

The vignette ends with Jane taking one more look at her iPhone as she approaches the cash register, realizes she found the in-store shopping assistance to be of some value and remarks to herself how interesting it is that she's walking out with PetSmart and not Kibbles, but other than that, she just shuts down the application as her sister is calling her.

Behind the scenes of course there are all these session agents waiting to serve, with the location agent dutifully serving up X-Y-[Z] core triquads assuming somebody wants to consume them (which is quite literally almost always going to happen with tracking agents allowed through the loyalty program and the 'loyalty discounts' shoppers enjoy by 'opting in' to these tracking and 'shopping metrics' and 'shopping analytics' engines.

At the cash register, the Retailer's loyalty programs now register that Jane has bought the Petsmart. In mature LBR networks, the Point of Sale system will know to send an LBR message to the client/concierge pair, but in early days one of the concierge agents job will be to continue to query the POS system if they've heard anything from Jane, since all the concierge agent knows is that she shut down the main GUI/app as she approached the cash register! Upon the query from the concierge agent's query, the loyalty sends to both the client agent and the concierge agent its own simple LBR-formatted triquad thusly:

```
TriQuad_POS = TriQuadStruct{
    who
        .data
            Shopper = 'Loyalty XYZ123';
    search
        .data
            State=Purchased PetSmart Sub-brand XYZ
        .links
```

-continued

```
            //local Session- SWGD2145224894FRS
        permissions
            .data
                Share sale data (success) with market-maker and brand
                    winner
                Share brand-de-labeled 'loss' to non-winners
            .links
        where
            .data
                Status - Customer presumed departed
        LBR
            .data
            .links
}
```

This concludes the baseline vignette, noting that the concierge agent duly passes on the 'success' information to the market-making agent, with then further rules attached on how the market-making agent can roll up daily, weekly and/or monthly reports to its bidding community.

Additional Inventive Features

The following provide examples of additional inventive features. They may be combined in various ways to create new and different inventions.

A1. A method of providing location based service to a mobile device in a wireless network comprising:

from the wireless device, receiving a query for location in the wireless network, the query including an opt-in level for participating in offers for location based services;

receiving location computed from packets transmitted between the mobile device and nodes in the wireless network;

providing a data structure comprising location, opt in level, and mobile device user information to a market for services, where the market for services determines an associated service based on the location, opt in level and mobile device user information and adds metadata for the associated service to the data structure to produce a response structure, enabling the user device to obtain the associated service.

A2. The method of claim A1 further comprising:

creating an extensible data structure for the query, the data structure including the opt in level, user identification and user preferences;

sharing the extensible data structure with one or more agents, the agents including an agent for providing location and adding the location to the extensible data structure, and an agent for adding metadata corresponding to an offer obtained from an electronic exchange for determining offers for location based queries.

A3. The method of claim A2 further comprising a location solution agent for determining the location of the mobile device from data gathered from packets exchanged between the mobile device and the nodes in the wireless network.

A4. The method of claim A2 further comprising an agent for executing an auction to determine the offer from the electronic exchange.

A5. The method of claim A1 further including:

executing a cloud side companion agent corresponding to the session, the cloud side companion executing remotely from the mobile device to track location of the mobile device based on packets exchanged between the mobile device and nodes in the network and obtaining location based offers for the mobile device, the cloud side companion agent exchanging location and offers when queried by a corresponding application on the mobile device.

A6. The method of claim A5 wherein the cloud side companion agent is in communication with a database of historical information about sessions of the mobile device, and operable to determine the location based offers based on the historical information about the sessions.

A7. The method of claim A1 wherein the permission indicates one of at least two opt in levels comprising permission to provide location while maintaining anonymity of the user of the mobile device, and permission to provide location and an offer based on identity of the user of the mobile device.

B1. A method of providing location based service to a mobile device in a wireless network comprising:

making a query for location to the wireless network, the query including an opt-in level for participating in offers for location based services; and receiving location computed from packets transmitted between the mobile device and nodes in the wireless network, and a market side offer associated with the location.

B2. The method of claim B1 further comprising:

creating an extensible data structure for the query, the data structure including the opt in level, user identification and user preferences;

sharing the extensible data structure with one or more agents, the agents including an agent for providing location and adding the location to the extensible data structure, and an agent for adding metadata corresponding to an offer obtained from an electronic exchange for determining offers for location based queries.

B3. The method of claim B2 further comprising a location solution agent for determining the location of the mobile device from data gathered from packets exchanged between the mobile device and the nodes in the wireless network.

B4. The method of claim B2 further comprising an agent for executing an auction to determine the offer from the electronic exchange.

B5. The method of claim B1 further including:

executing a cloud side companion agent corresponding to the session, the cloud side companion executing remotely from the mobile device to track location of the mobile device based on packets exchanged between the mobile device and nodes in the network and obtaining location based offers for the mobile device, the cloud side companion agent exchanging location and offers when queried by a corresponding application on the mobile device.

B6. The method of claim B5 wherein the cloud side companion agent is in communication with a database of historical information about sessions of the mobile device, and operable to determine the location based offers based on the historical information about the sessions.

B7. The method of claim B1 wherein the permission indicates one of at least two opt in levels comprising permission to provide location while maintaining anonymity of the user of the mobile device, and permission to provide location and an offer based on identity of the user of the mobile device.

C1. A method of providing location based service to a mobile device comprising:

issuing a request to connect to a wireless network;

initiating a network session with the wireless network providing a permission to the wireless network, the permission defining an opt-in level for participating in market side offers of location based services, communicating with nodes in the wireless network;

making a query for location to the wireless network;

receiving location computed from packets transmitted between the mobile device and the nodes in the wireless network, the location being associated with an offer obtained from a location based service exchange in response to the location query and permission.

C2. The method of claim C1 further comprising:
creating an extensible data structure for the query, the data structure including the opt in level, user identification and user preferences;
sharing the extensible data structure with one or more agents, the agents including an agent for providing location and adding the location to the extensible data structure, and an agent for adding metadata corresponding to an offer obtained from an electronic exchange for determining offers for location based queries.

C3. The method of claim C2 further comprising a location solution agent for determining the location of the mobile device from data gathered from packets exchanged between the mobile device and the nodes in the wireless network.

C4. The method of claim C2 further comprising an agent for executing an auction to determine the offer from the electronic exchange.

C5. The method of claim C1 further including:
executing a cloud side companion agent corresponding to the session, the cloud side companion executing remotely from the mobile device to track location of the mobile device based on packets exchanged between the mobile device and nodes in the network and obtaining location based offers for the mobile device, the cloud side companion agent exchanging location and offers when queried by a corresponding application on the mobile device.

C6. The method of claim C5 wherein the cloud side companion agent is in communication with a database of historical information about sessions of the mobile device, and operable to determine the location based offers based on the historical information about the sessions.

C7. The method of claim C1 wherein the permission indicates one of at least two opt in levels comprising permission to provide location while maintaining anonymity of the user of the mobile device, and permission to provide location and an offer based on identity of the user of the mobile device.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the LBR and associated agent processes may be implemented in programmable computers, processing units or special purpose digital circuits, employing combinations of software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

I claim:

1. A method of providing location based service to a mobile device in a wireless network of an indoor venue comprising:
from the mobile device, receiving a query for location in the wireless network;
in a computer in communication with the wireless network, instantiating a first cloud side agent to manage a location based service session for the mobile device through the wireless network;
in a computer in communication with the mobile device through the wireless network, instantiating a client agent to manage permissions of a user of the mobile device;
receiving location solutions of the mobile device, the location solutions computed from packets transmitted between the mobile device and nodes in the wireless network in the indoor venue;
for the location solutions, forming data structures comprising location solutions of the mobile device in the indoor venue;
with the permissions provided by the client agent, updating the data structures with a first permission by modifying a permission field of the data structures with the first permission;
in the first cloud side agent, receiving the updated data structures and providing updated data structures with location solutions for the mobile device in the indoor venue to the client agent according to the first permission;
for a search request for a product in the indoor venue requested by the mobile device, the client agent determining that a second permission is to be included in the search request;
from the first cloud side agent, receiving the search request, adapting the search request based on the second permission and a location solution of the mobile device and providing the adapted search request to a process for matching the adapted search request to a bid;
constructing a response data structure with one or more matched responses from the process for matching; and
transferring the response data structure to the client agent, which in turn, prepares the responses for presentment to the user on a user interface of the mobile device.

2. The method of claim 1 further comprising:
with the client agent, creating a first extensible data structure for the search request, the data structure including opt in level, user identification and user preferences;
receiving the extensible data structure in the first cloud side agent, determining proximity to the product in the search request, populating a second extensible data structure with the proximity, and providing the second extensible data structure as the updated search request to the process for matching.

3. The method of claim 2 further comprising a location solution agent in the wireless network, remote from the mobile device, the location solution agent determining the location solutions of the mobile device from data gathered from packets exchanged between the mobile device and the nodes in the wireless network, the location solution agent populating extensible data structures with the locations solutions.

4. The method of claim 2 further comprising an agent for executing an auction to determine the offer from the electronic exchange.

5. The method of claim 1 further including:
executing the client side agent and the first cloud side agent concurrently as a pair of agents for managing the location based service session, the pair of agents executing remotely from the mobile device to track location of the mobile device based on packets exchanged between the mobile device and nodes in the network and obtaining location based offers for the mobile device, the pair of agents exchanging location and offers when queried by a corresponding application on the mobile device.

6. The method of claim 5 wherein the client agent is in communication with a database of historical information about sessions of the mobile device, and operable to determine location based offers based on the historical information about the sessions.

7. The method of claim 1 wherein the first permission indicates one of at least two opt in levels comprising permission to provide location while maintaining anonymity of the user of the mobile device, and permission to provide location and an offer based on identity of the user of the mobile device.

8. A method of providing location based service to a mobile device comprising:
issuing a request to connect to a wireless network;
initiating a network session with the wireless network;
establishing a secure connection with a client agent executing in a computer in communication with the mobile device through the wireless network, the client agent being instantiated in the computer to manage permissions of a user of the mobile device, the permissions controlling use of a stream of location solutions determined for the mobile device during a location based service session;
from the mobile device, communicating with nodes in the wireless network to produce RF packet communication from which location of the mobile device is derived, the location being computed remotely from packets transmitted between the mobile device and the nodes in the wireless network and providing the stream of location solutions as the mobile device moves during the network session, wherein the stream of location solutions are formed into extensible data structures in the wireless network, and the extensible data structures are updated with a permission state of the permissions provided by the client agent on behalf of the mobile device;
from the mobile device, making a search query to the wireless network, the search query being populated into an extensible data structure including a location solution and provided to a process for matching the search query with a response; and
receiving a matching response to the search query and presenting the response on a display of the mobile device.

9. The method of claim 8 further comprising:
creating an extensible data structure for the query, the data structure including the opt in level, user identification and user preferences;
sharing the extensible data structure with one or more agents, the agents including an agent for providing location and adding the location to the extensible data structure, and an agent for adding metadata corresponding to an offer obtained from an electronic exchange for determining offers for location based queries.

10. The method of claim 9 further comprising a location solution agent in the wireless network, the location agent determining the location of the mobile device from data gathered from packets exchanged between the mobile device and the nodes in the wireless network, and providing the stream of location solutions.

11. The method of claim 9 further comprising an agent for executing an auction to determine the offer from the electronic exchange.

12. The method of claim 8 further including:
executing a cloud side companion agent corresponding to the session, the cloud side companion agent executing remotely from the mobile device to track location of the mobile device based on packets exchanged between the mobile device and nodes in the network and obtaining location based offers for the mobile device, the cloud side companion agent exchanging location and offers when queried by a corresponding application on the mobile device.

13. The method of claim 12 wherein the cloud side companion agent comprises the client agent, and the client agent is in communication with a database of historical information about sessions of the mobile device, and operable to determine the location based offers based on the historical information about the sessions.

14. The method of claim 8 wherein the permissions control use of location solutions and include one of at least two opt in levels comprising a first permission to provide location while maintaining anonymity of the user of the mobile device, and a second permission to provide location and an offer based on identity of the user of the mobile device.

* * * * *